United States Patent [19]

Terada et al.

[11] Patent Number: 4,881,196

[45] Date of Patent: Nov. 14, 1989

[54] DATA TRANSMISSION LINE BRANCHING SYSTEM

[75] Inventors: Hiroaki Terada, Suita; Katsuhiko Asada, Amagasaki; Hiroaki Nishikawa, Suita; Shinji Komori, Itami; Kenji Shima, Nishinomiya; Souichi Miyata; Satoshi Matsumoto, both of Nara; Hajime Asano, Toyonaka; Masahisa Shimizu, Kadoma; Hiroki Miura, Hirakata, all of Japan

[73] Assignees: Mitsubishi Denki Kabushiki Kaisha, Tokyo; Sharp Kabushiki Kaisha, Osaka; Matsushita Electric Industrial Co., Ltd., Kadoma; Sanyo Electric Co., Ltd., Moriguchi, all of Japan

[21] Appl. No.: 830,750

[22] Filed: Feb. 19, 1986

[30] Foreign Application Priority Data

| Feb. 19, 1985 | [JP] | Japan | 60-33035 |
| Feb. 19, 1985 | [JP] | Japan | 60-33036 |
| May 17, 1985 | [JP] | Japan | 60-106672 |
| May 17, 1985 | [JP] | Japan | 60-106669 |
| May 17, 1985 | [JP] | Japan | 60-106670 |
| May 17, 1985 | [JP] | Japan | 60-106671 |
| Jun. 21, 1985 | [JP] | Japan | 60-136610 |
| Jun. 21, 1985 | [JP] | Japan | 60-136608 |
| Jun. 21, 1985 | [JP] | Japan | 60-136609 |
| Jul. 5, 1985 | [JP] | Japan | 60-148597 |
| Jul. 5, 1985 | [JP] | Japan | 60-148593 |
| Jul. 5, 1985 | [JP] | Japan | 60-148594 |
| Jul. 5, 1985 | [JP] | Japan | 60-148595 |
| Jul. 5, 1985 | [JP] | Japan | 60-148596 |

[51] Int. Cl.$^4$ .............................. G06F 13/40
[52] U.S. Cl. .................................... 364/900
[58] Field of Search ............ 377/64, 66, 67, 81; 364/200 MS File

[56] References Cited

U.S. PATENT DOCUMENTS

| 3,341,819 | 9/1967 | Emerson | 364/200 |
| 3,404,377 | 10/1968 | Frankel | 364/200 |
| 3,492,658 | 1/1970 | Klett | 364/200 |
| 3,516,069 | 6/1970 | Bray et al. | 364/200 |
| 3,641,508 | 2/1972 | Saltini | 364/200 |
| 4,034,301 | 7/1977 | Kashio | 377/54 |
| 4,468,789 | 8/1984 | Gromen | 377/64 X |
| 4,542,527 | 9/1985 | Tsunekawa | 382/27 X |
| 4,574,345 | 3/1986 | Konesky | 364/200 |
| 4,721,958 | 1/1988 | Jenkin | 377/54 X |

Primary Examiner—David L. Clark
Attorney, Agent, or Firm—Staas & Halsey

[57] ABSTRACT

A data transmission system comprises an input data transmission line (1), an output data transmission line (4), a branching data transmission line (5) and a jointing data transmission line (7) formed respectively by asynchronous free-running shift registers using a plurality of data latches (101 to 106, 401 & 402, 501 & 502, 701 & 702) and, C elements (111 to 116, 411 & 412, 511 & 512, 711 & 712) respectively. A branching control circuit 3 supplies data to be branched to the branching data transmission line (5) in response to the decision by a branching decision circuit (2) as to the fact that the data to be branched is transmitted on the input data transmission line (1). A jointing control circuit (6) supplies data to be joined to the output data transmission line (4) in response to the decision by an empty buffer verifier (8) as to the nonexistence of data in the input data transmission line (1) and the output data transmission line (4) when the data to be jointed is transmitted on the jointing data transmission line (7). Thus, the data transmission system has branching and jointing functions and if it is used as a constituent of a network, data can be transmitted among asynchronous systems.

31 Claims, 40 Drawing Sheets

DATA TRANSMISSION LINE BRANCHING SYSTEM

BACKGROUND OF THE INVENTION

1. Field of the Invention

The present invention relates to a data transmission system. More particularly, the present invention relates to a data transmission system to be used as a constituent of a network making it possible to transmit data among a plurality of asynchronous systems.

2. Description of the Related Art

As a conventional method for transmitting data among asynchronous system, first-in first-out (FIFO) memories are generally used as buffers among the systems. Such a transmission system is described for example in "Interface" Aug. 1984 pages 268 to 270.

FIGS. 1 and 2 are schematic block diagrams of conventional asynchronous data transmission systems. First referring to FIGS. 1 and 2, a conventional asynchronous data transmission system using FIFO memories will be described. As shown in FIG. 1, in the case of transmitting data from a system 11 operating asynchronously to a system 13 operating also asynchronously, a FIFO memory 12 is connected therebetween and this FIFO memory 12 is used as a buffer.

In addition, as shown in FIG. 2, in the case of connecting a plurality of asynchronous systems 14, 16, 18 and 20, FIFO memories 15, 17 and 19 are connected between the respective systems.

It is to be noted that a conventional FIFO memory has only a buffer function for data. As a result, if such FIFO memories are used to connect asynchronous systems, the asynchronous systems can only be connected serially as shown in FIGS. 1 and 2. Accordingly, the whole network system connected by such FIFO memories only forms a pipelining mechanism by simple cascade connection as shown in FIG. 2 and its flexibility is extremely limited.

SUMMARY OF THE INVENTION

Therefore, a principal object of the present invention is to provide a data transmission system which gives broad flexibility in forming a network system by connecting asynchronous systems.

Briefly stated, the present invention comprises an input data transmission line, an output data transmission line and a branching data transmission line connected to branching control means; so that data transmitted to the input data transmission line is transmitted to the output data transmission line. If the data transmitted to the input data transmission line is data to be branched, the branching control means branches to the branching data transmission line, transmitted to the input data transmission line.

Consequently, according to the present invention, data can be branched in an arbitrary manner, which makes it possible to form freely a network having distributed functions.

In a preferred embodiment of the present invention, the input data transmission line, the output data transmission line and the branching data transmission line are formed respectively by asynchronous free-running shift registers. Each asynchronous free-running shift register transfers data to a register in the next stage without using a clock pulse on condition that no data is stored in the register in the next stage.

Accordingly, in this preferred embodiment of the invention, since an asynchronous free-running shift register is used in each data transmission line, data can be rapidly transmitted with a transmission delay time corresponding only to the delay by the register as compared with the case in which buffer means is formed by using a memory such as a RAM. Using such asynchronous free-running shift registers, data transmission control similar to the push operation and pop operation in conventional FIFO memories can be performed in a simpler method.

In addition, in a preferred embodiment of the invention, a predetermined plural number of branching conditions are given and one of the plural branching conditions is selected according to the input data so that data is branched by the selected branching condition.

Thus, in this preferred embodiment of the invention, branching conditions can be selected according to the content of data and it becomes possible to change branching conditions according to the operation mode and as a result, flexibility in processing of data can be improved.

In a more preferred embodiment of the present invention, data is branched to the branching data transmission line in response to the decision of the nonexistence of data at the branching end of the branching data transmission line. In order to decide the nonexistence of data at the branching end of the branching data transmission line, open collector elements are provided corresponding respectively to the plurality of transfer control means included in the branching data transmission line. These open collector elements are connected by wired-OR connection and the outputs thereof serve to detect the state empty of data.

Accordingly, in the above described more preferred embodiment, data is branched only when the branching data transmission line is empty, and thus, fullness of data can be easily avoided.

Furthermore, in a more preferred embodiment of the present invention, when specific data including a predetermined identifier is transmitted to the input data transmission line, the branching condition of the branching decision means is changed and in response to the change of the branching condition, the specific data is erased.

Thus, even when data is being transmitted, the branching condition can be changed by transmission of specific data and in consequence, flexibility in processing can be remarkably improved.

In addition, in another system utilizing the invention, a main data transmission line and a jointing data transmission line are connected to the jointing control means and when data to be jointed reaches the jointing data transmission line, the data to be jointed is jointed to the main data transmission line.

Thus, in the above described another system, data can be jointed to the main data transmission line in an arbitrary manner and consequently, in the case of forming a network having distributed functions, such a network can be easily formed.

In a preferred embodiment of the above described system, data is jointed to the main data transmission line only when there is no data at the jointing end of the main data transmission line and there is no data at the input end of the main data transmission line.

Thus, in this preferred embodiment, data is jointed only when there is no data at the jointing end and at the inpute end of the main data transmission line, fullness of data can be avoided.

Furthermore, in a more preferred embodiment of the above described system, when data is transmitted to the jointing end of the main data transmission line, transmission of the data is stopped and the data to be jointed is supplied to the main data transmission line.

Accordingly, in the above described more preferred embodiment, the data throughput in the main data transmission line will never be deteriorated and the buffer capacity can be substantially increased.

In addition, in a more preferred embodiment of the system, data to be jointed is jointed to the main data transmission line when the last word of the data to be jointed attains the position of the predetermined word number counted from the jointing end of the jointing data transmission line and when the jointing end of the main data transmission line is in an empty state.

Consequently, in the above described more preferred embodiment, jointing of data is permitted when the last word of the data to be jointed reaches the prescribed position, and thus, the jointing operation can be performed rapidly and obstruction of data flow in the main data transmission line can be prevented at the time of jointing.

In addition, in a more preferred embodiment of the system, detection is made as to the nonexistence of the data having a predetermined word number at the input end of the main data transmission line and detection is also made as to the arrival of the first word to the last word of the data having the predetermined word number in the jointing data transmission line. In response to these detections, the data to be jointed is jointed to the main data transmission line.

Thus, in the above described preferred embodiment, the data to be jointed is supplied to the main data transmission line after the determination of the arrival of all the data to be jointed. As a result, the jointing operation can be performed rapidly and at the time of jointing of data, the flow of data in the main data transmission line can be prevented from being obstructed.

Further, in another system, when data to be branched is transmitted to the main data transmission line structured in a loop form, the data is transmitted to the branching data transmission line, and when data to be jointed is transmitted to the jointing data transmission line and is not transmitted to the jointing end of the main data transmission line, the data to be jointed is jointed to the main data transmission line.

Thus, in this system, data can be branched and jointed in an arbitrary manner and accordingly, in forming a network, flow of data can be set in an arbitrary manner.

In a further system, a by-pass line is provided in a predetermined portion of a ring-like data transmission line and the density of the data transmitted to the ring-like data transmission line is detected. When the density is lower than a predetermined value and an empty state is found in a predetermined portion of the ring-like data transmission line, the data transmitted to the ring-like data transmission line is branched to the by-pass line and the branched data is jointed again to the ring-like data transmission line.

Accordingly, in this system, data can be bypassed if the amount of data transmitted to the ring-like data transmission line is small and as a result, unnecessary delay can be avoided and the time required for data to circulate through the ring-like data transmission line can be shortened.

In a still further system, processing for decision of the content to be processed in a specified pipeline stage is performed simultaneously and in parallel with the signal for pipeline processing and the result thereof is supplied to the specified pipeline stage before the data is supplied thereto.

Consequently, in this system, the execution delay time in one pipeline stage can be shortened and without disturbing the smooth flow of data, data processing can be performed with flexibility and the throughput of the system can be maintained with high efficiency.

In additiion, in a still further system, there are provided a first input data transmission line and a second input data transmission line each comprising a plurality of data storing means and transfer control means provided corresponding to the respective data storing means. At the time of transmitting data to the first or the second input data transmission line, if the second or the first input data transmission line on the other side is not empty, the data from this second or first input data transmission line is then provided as output so that the data from the first and second input data transmission lines are jointed as equal flows.

Consequently, in this system, the data transmitted to the two input data transmission lines can be jointed as equal flows and the jointing data can flow smoothly.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 16 is an illustration showing a construction of a data packet used in the embodiment shown in FIG. 13.

DESCRIPTION OF THE PREFERRED EMBODIMENTS

Figure 1:
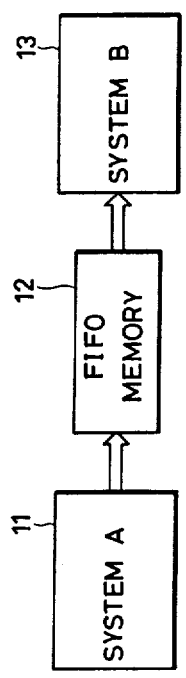
FIGS. 1 and 2 are schematic block diagrams of conventional asynchronous data transmission systems.
Figure 2:
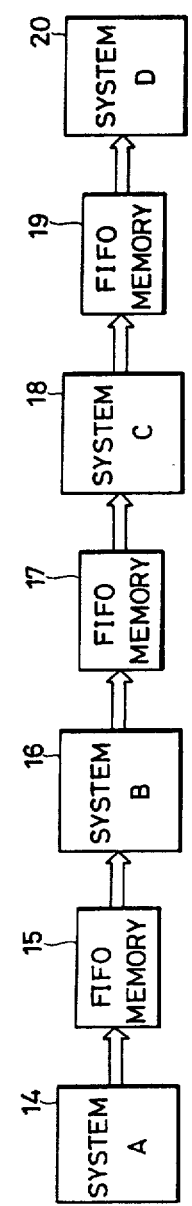
Figure 3:
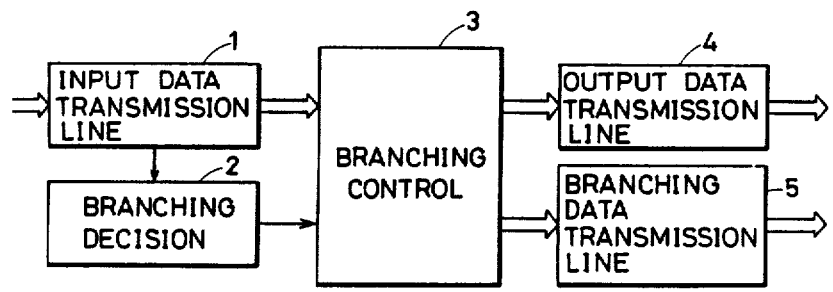
FIG. 3 is a schematic block diagram showing an example of a data transmission system having a branching function in accordance with the present invention.

FIG. 3 is a schematic block diagram showing a data transmission system having a branching function in accordance with an embodiment of the present invention. First referring to FIG. 3, a general construction and an operation of the data transmission system having a branching function will be described.

An input data transmission line 1 transmits the data received from the exterior to a branching control portion 3. A branching decision circuit 2 decides whether or not the data transmitted to the input data transmission line 1 is data to be branched. A branching condition is preset in the branching decision circuit 2. If the preset condition and the condition of the transmitted data are coincident, the branching decision circuit 2 decides that the data is to be branched and applies a decision signal to the branching control circuit 3.

The branching control circuit 3 transmits the data from the input data transmission line 1 to an output data transmission line 4. In response to a decision that the data is to be branched by the branching decision circuit 2, the branching control circuit 3 branches the data from the input data transmission line 1 to a branching data transmission line 5.

The input data transmission line 1, the output data transmission line 4 and the branching data transmission line 5 are, as described in detail afterwards, formed by asynchronous free-running shift registers and have a buffer function for data.

Figure 4:
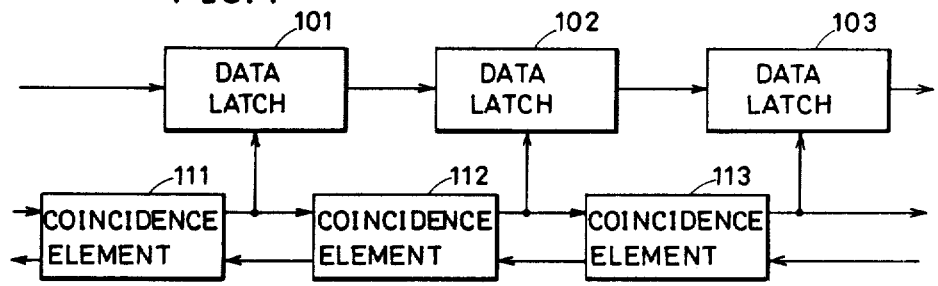
FIG. 4 is a block diagram showing an example of asynchronous free-running shift registers used in the input data transmission line, the output data transmission line and the branchig data transmission line shown in FIG. 3.
Figure 5:
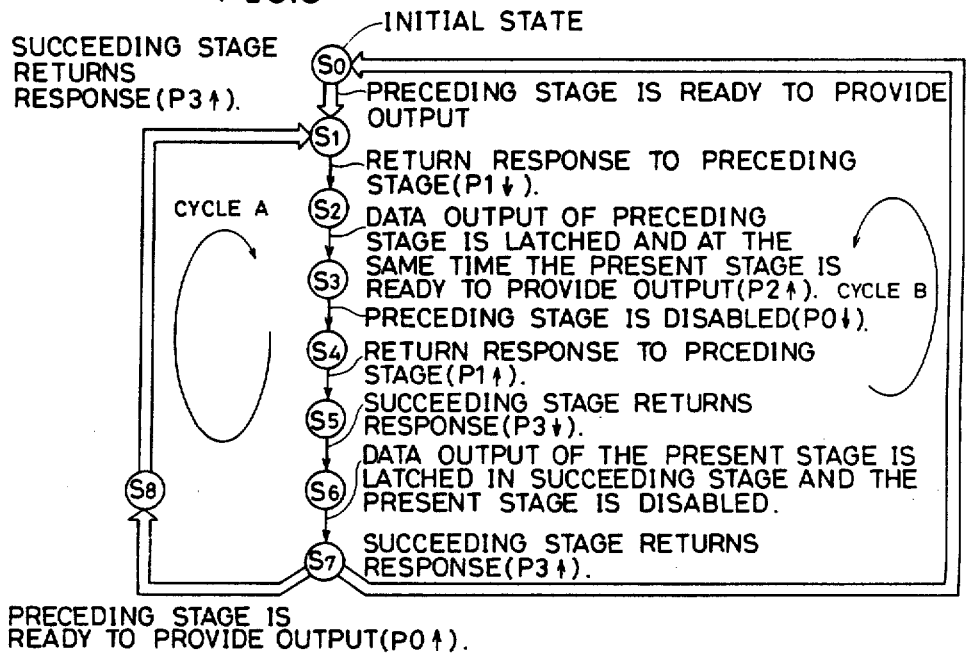
FIG. 5 is state diagram showing transistion of the state of the coincidence elements shown in FIG. 4.
Figure 6:
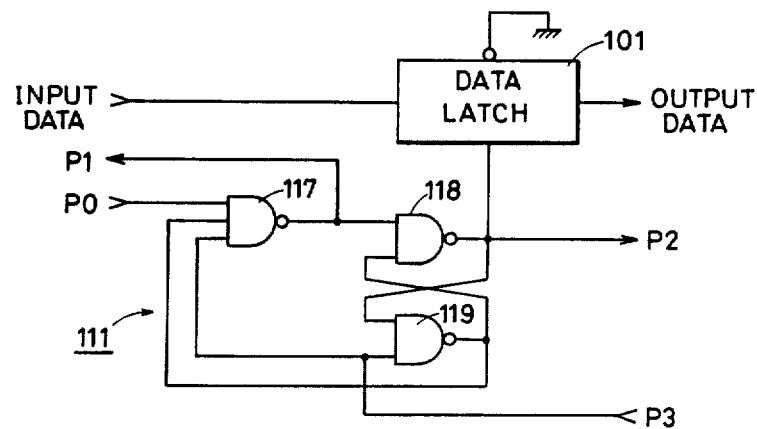
FIG. 6 is a circuit diagram of a coincidence element shown in FIG. 4.
Figure 7A:
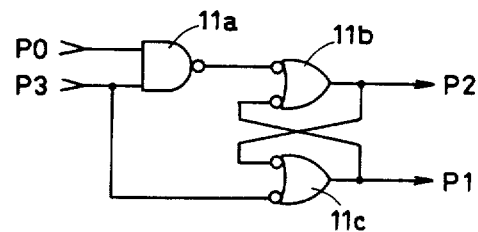
FIGS. 7A to 7C are circuit diagrams showing other examples of coincidence elements.
Figure 7B:
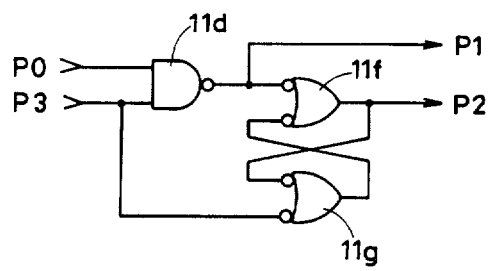
Figure 7C:
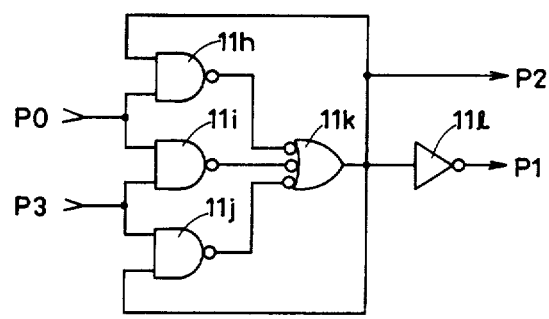

FIG. 4 is a concrete block diagram showing an example of an asynchronous free-running shift register used for the input data transmission line, the output data transmission line and the branching data transmission line; FIG. 5 is an illustration showing transition of the state of the C elements shown in FIG. 4; FIG. 6 is a concrete electrical circuit diagram of a C element shown in FIG. 4; and FIGS. 7A to 7C are electrical circuit diagrams showing other examples of C elements.

Now referring to FIGS. 4 to 7C, an asynchronous free-running shift register will be described. The asynchronous free-running shift register has a buffer function for data, that is, it is a register which shifts successively the input data to a register in the next state without using a shift clock pulse on condition that the register in the next stage is empty.

For this purpose, the asynchronous free-running shift register comprises, as shown in FIG. 4, a plurality of data latches 101, 102 and 103 and transfer control circuits 111, 112 and 113 (referred to hereinafter as coincidence or C elements) provided corresponding to the data latches 101, 102 and 103 respectively. The data latches 101, 102 and 103 are connected by cascade connection and the respective C elements 111, 112 and 113 supply rising edge trigger signals to the associated data latches 101, 102 and 103.

The C elements 111, 112 and 113 each receive two control signals P0 and P3 and provide two control signals P1 and P2. The internal states of the C elements 111, 112 and 113 are determined by these four signals P0 to P3 and have nine possible states S0 to S8 as shown in Table 1 below. In the following description, the logics "0" and "1" correspond respectively to the low level and the high level of a signal value.

TABLE 1

| $S_n = (P0, P1, P2, P3)$ |
|---|
| $S_0 = (0, 1, 0, 1)$ |
| $S_1 = (1, 1, 0, 1)$ |
| $S_2 = (1, 0, 0, 1)$ |
| $S_3 = (1, 0, 1, 1)$ |
| $S_4 = (0, 0, 1, 1)$ |
| $S_5 = (0, 1, 1, 1)$ |
| $S_6 = (0, 1, 1, 0)$ |
| $S_7 = (0, 1, 0, 0)$ |
| $S_8 = (1, 1, 0, 0)$ |

In the chart of the state transition of the C elements shown in FIG. 5, the arrow —• indicates a state transition with condition and the arrow —→ indicate a state transition without condition. The characters P1 ↑, P ↓ etc. indicate changes of the signal value from "0" to "1" from "1" to "0" respectively. The cycle A or the cycle B shown in FIG. 5 is determined dependent on the earlier arrival of the time at which the shift register in the succeeding stage is ready to receive data or the time at which the shift register in the preceding state is ready to provide data. In either case, by circulation of the cycle A or the cycle B, the data in the preceding stage can be transmitted to the succeeding stage.

Now referring to FIG. 6, the C element 111 will be described. The C element 111 comprises NAND gates 117, 118 and 119 and the NAND gates 118 and 119 constitute an SR flip-flop. The NAND gate 117 on the input side receives the control signals P0 and P3 and the output of the SR flip-flop and also the control signal P1 sets the SR flip-flop. The output of the NAND gate 118 as the output of the SR flip-flop is provided as the control signal P2 and also a rising edge signal is provided therefrom to the data latch 101. The SR flip-flop is reset by the control signal P3.

The C elements 112 and 113 shown in FIG. 4 are constructed in the same manner as the C element 111 shown in FIG. 6.

The C element 111 may be constructed as shown in FIGS. 7A to 7C. More specifically, the C element shown in FIG. 7A comprises a NAND gate 11a having two inputs for receiving the control signals P0 and P3 and NAND gates 11b and 11c for constituting an SR flip-flop, so that the control signals P1 and P2 are provided from the SR flip-flop.

The C element shown in FIG. 7B comprises a NAND gate 11d having two inputs for receiving the control signals P0 and P3, and gates 11f and 11g for constituting an SR flip-flop, so that the control signal P1 is provided from the NAND gate 11d and the control signal P2 is provided from the output of the gate 11f as the output of the SR flip-flop.

The C element shown in FIG. 7C comprises three NAND gates 11h, 11i and 11j each having two inputs, a gate 11k having three inputs and an inverter 11l. The control signal P0 is received by one input end of each of the NAND gates 11h and 11i and the control signal P3 is received by the other input end of the NAND gate 11i and one input end of the NAND gate 11j. The outputs of the NAND gates 11h to 11j are received by the gate circuit 11k having three inputs and the output of the gate circuit k is provided as the control signal P2 and this signal is inverted by the inverter 11l so as to be provided as the control signal P1.

Figure 8:
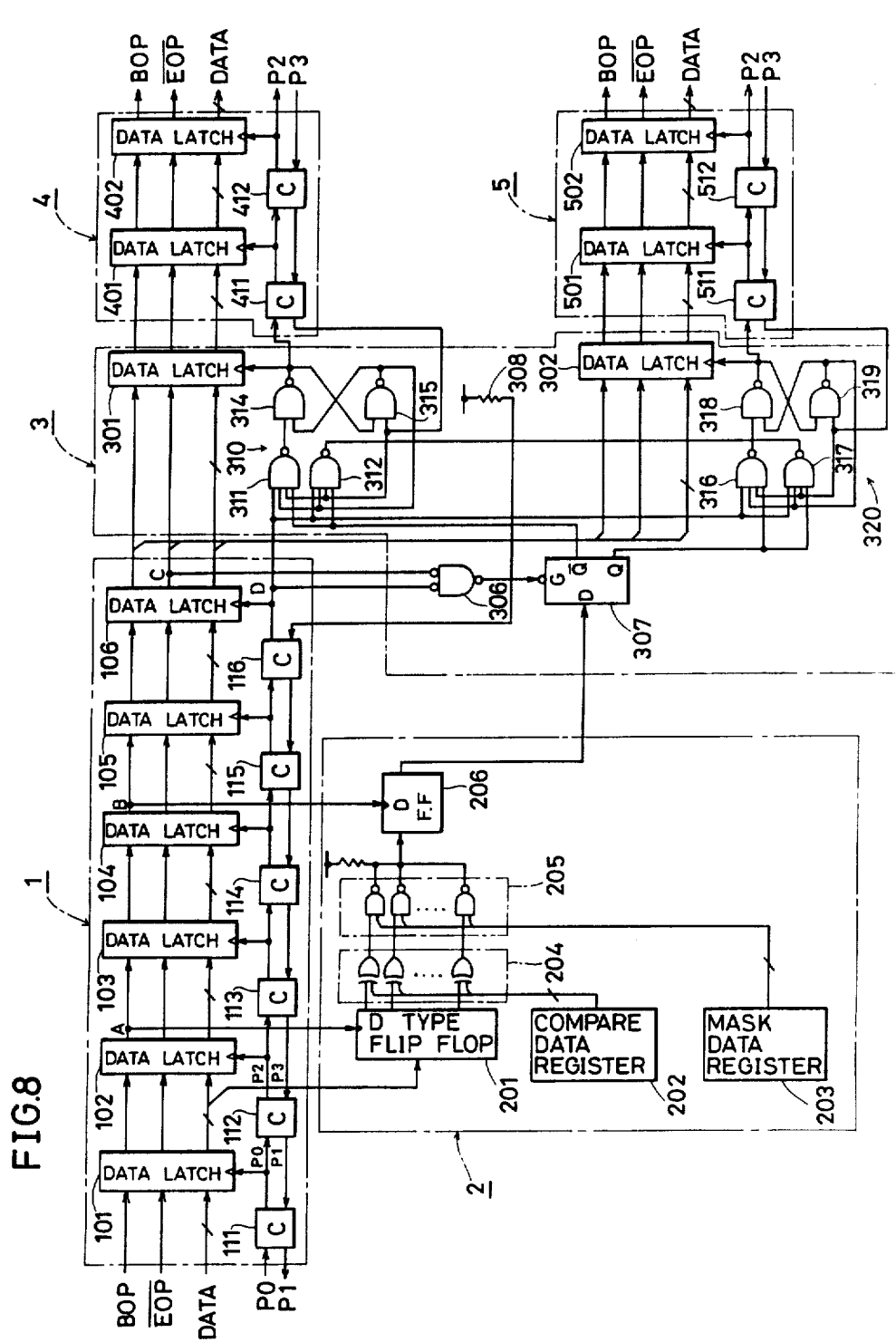
FIG. 8 is a concrete block diagram of the embodiment shown in FIG. 3.

FIG. 8 is a concrete block diagram of the data transmission system shown in FIG. 3. First referring to FIG. 8, a construction thereof will be described. The input data transmission line 1 is formed by an asynchronous free-running shift register comprising data latches 101 to 106 and C elements 111 to 116 as described above in connection with FIG. 4. The output data transmission line 4 is formed by an asynchronous free-running shift register comprising data latches 401 and 402 and C elements 411 and 412. In addition, the branching data transmission line 5 is also formed by an asynchronous free-running shift register comprising data latches 501 and 502 and C elements 511 and 512.

The branching control circuit 3 comprises data latches 301 and 302, C elements 310 and 320, a two-input OR gate 306 and a D-flip-flop 307. The C element 310 comprises a four-input NAND gate 311, an open collector type four-input NAND gate 312 and two-input NAND gates 314 and 315 for constituting an SR flip-flop. In the same manner, the C element 320 comprises a four-input NAND gate 316, an open collector type four-input NAND gate 317 and two-input NAND gates 318 and 319 for constituting an SR flip-flop.

The respective outputs of the four-input NAND gates 312 and 317 are provided by wired-OR connection and connected to a pull-up resistor 308 and to the C element 116 of the input data transmission line 1. The OR gate 306 calculates a logical sum of the control signal P2 provided from the C element 116 of the input data transmission line 1 and the signal $\overline{EOP}$ provided from the date latch 106 so that a trigger signal is supplied to the D-flip-flop 307. The D-flip-flop 307 latches a decision signal from the branching decision circuit 2 which will be described later.

The branching decision circuit 2 comprises a D-flip-flop 201, a comparison data register 202, a mask data register 203, an EXOR gate 204, an open collector type two-input NAND gate 205 and a D-flip-flop 206. The D-flip-flop 201 latches the branching condition included in the data transmitted from the input data transmission line 1. The comparison data register 202 stores in advance a branching condition. The mask data register 203 stores mask data for masking the data transmitted from the input data transmission line 1, to remove unnecessary bits after comparison of the branching conditions. The EXOR gate 204 determines the coincidence between the branching condition latched in the D-flip-flop 201 and the branching condition preset in the comparison data register 202. The NAND gate 205 serves to mask unnecessary bits, using the mask data in the mask data register 203, out of the data provided from the EXOR gate 204.

The output of the NAND gate 205 is connected by wired-OR connection and the output signal thereof is supplied to the D-flip-flop 206. The D-flip-flop 206 is set if the data transmitted from the input data transmission line 1 is data to be branched, so that the output is supplied to the D-flip-flop 307 included in the above described branching control circuit 3.

In the following, operation of a data transmission system having a branching function as shown in FIG. 8 will be specifically described. In the embodiment shown in FIG. 8, data is formed as a packet including a plurality of words, each word having besides data values, two tag bits, that is, BOP for indicating the first word and $\overline{EOP}$ for indicating the last word. The first word includes preceding data serving as the branching condition.

First, the first word including preceding data serving as the branching condition is applied to the input data transmission line 1 and latched in the data latch 101. Then, when the lead of the packet is supplied to the input data transmission line 1 and the control signal P0 is supplied to the C element 111, the control signal P2 of the C element 112 in the next stage changes from "0" to "1". As a result, the data of the first word latched in the data latch 101 is transferred to the data latch 102 in the next stage. At this time, the BOP bit changes from "0" to "1". In consequence, the D-flip-flop 201 latches the data of the first word of the packet in the same manner as in the data latch 102.

The data of the first word latched in the D-flip-flop 201 is compared by the EXOR gate 204 with the data of the branching condition preset in the comparison data register 202. Further, the NAND gate 205 masks unnecessary bits, using the mask data in the mask data register 203, out of the output of the EXOR gate 204. As a result, a branching decision result signal is provided from the output of the NAND gate 205 and supplied to the D-flip-flop 206.

In the meantime, the packet is transmitted successively through the input data transmission line 1 and when the first word arrives at the stage of the C element 114, the BOP bit changes from "0" to "1". According to this change, the D-flip-flop 206 latches the branching decision result signal and the latched decision result signal is provided to the D-flip-flop 307 included in the branching control circuit 3.

On the other hand, the D-flip-flop 307 latches the branching decision result signal from the D-flip-flop 206 after the passage of the packet preceding the above stated packet, with the timing in which the $\overline{EOP}$ bit changes to "0" and the control signal P2 of the C element 116 changes to "0". The $\overline{Q}$ output of the D-flip-flop 307 is supplied to the four-input NAND gates 311 and 312 of the C element 310 and the Q output thereof is supplied to the four-input NAND gates 316 and 317 of the C element 320. More specifically, when the branching decision result signal at the output of the D-flip-flop 307 is "0", the Q output signal of "0" is supplied to the NAND gates 316 and 317 so as not to branch and the $\overline{Q}$ output signal of "1" is supplied to the NAND gates 311 and 312 so that the packet is transmitted to the output data transmission line 4. If the branching decision result signal is "1", control is made so that the packet is transmitted to the branching data transmission line 5.

At this time, in order to return the control signal P3 to the C element if the packet is transmitted to either line, the outputs of the open collector type NAND gates 312 and 317 are connected by wired-OR connection so as to be applied to the input end for the control signal P3 of the C element 116.

With the above described construction, before certain data arrives at the branching control portion 6, the data coming several words ahead of it is extracted and detection is made in advance as to whether the data is to be branched or not, whereby the processing for branching and the flow of data proceed simultaneously and in parallel. Thus, data can be branched without disturbing the smooth flow of data. This is based on the circuit construction in which the delay time in transmission of data in the branching portion is made equal to the delay time in other portions of the transmission line. Consequently, if the transmission delay time in the branching portion is longer than that of other portions in the transmission line, the transmission delay time in the branching portion serve to regulate the flow of the whole data.

Figure 9:
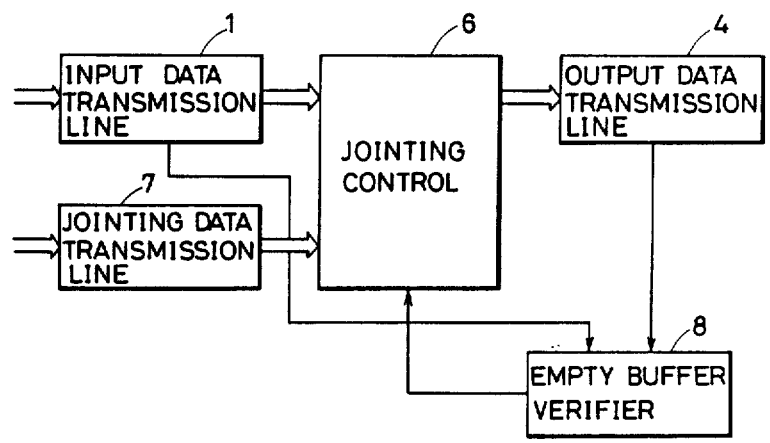
FIG. 9 is a schematic block diagram showing an example of a data transmission system having a data jointing function in accordance with the present invention.

FIG. 9 is a schematic block diagram showing an example of a data transmission system having a jointing function. In the example shown in FIG. 9, the data transmission system has a function of jointing data, while the above-described data transmission system shown in FIG. 3 has a data branching function. Referring to FIG. 9, the jointing control portion 6 is connected with the input data transmission line 1, the jointing data transmission line 7 and the output data transmission line 4. The jointing data transmission line 7 transmits the data to be jointed on the output data transmission line 4. In addition, an empty buffer verifier 8 is provided for the purpose of detecting the nonexistence of data, that is, the empty state in the input data transmission line 1 and the output data transmission line 4. The empty buffer verifier 8 supplies a decision signal to the jointing control portion 6 when it detects the empty state in both the input data transmission line 1 and the output data transmission line 4. In reponse to the decision signal from the empty buffer verifier 8, the jointing control portion 6 joints the data transmitted on the jointing data transmission line 7 to the output data transmission line 4.

The detection of the empty state of both the input data transmission line 1 and the output data transmission line 4 by the empty buffer verifier 8 is made for the purposes of not disturbing the flow of data transmitted on the input data transmission line 1 and assuring the data latch in the output data transmission line 4 for latching the data to be jointed. The input data transmission line 1, the output data transmission line 4 and the jointing data transmission line 7 shown in FIG. 9 are formed respectively by asynchronous free-running shift registers.

Figure 10:
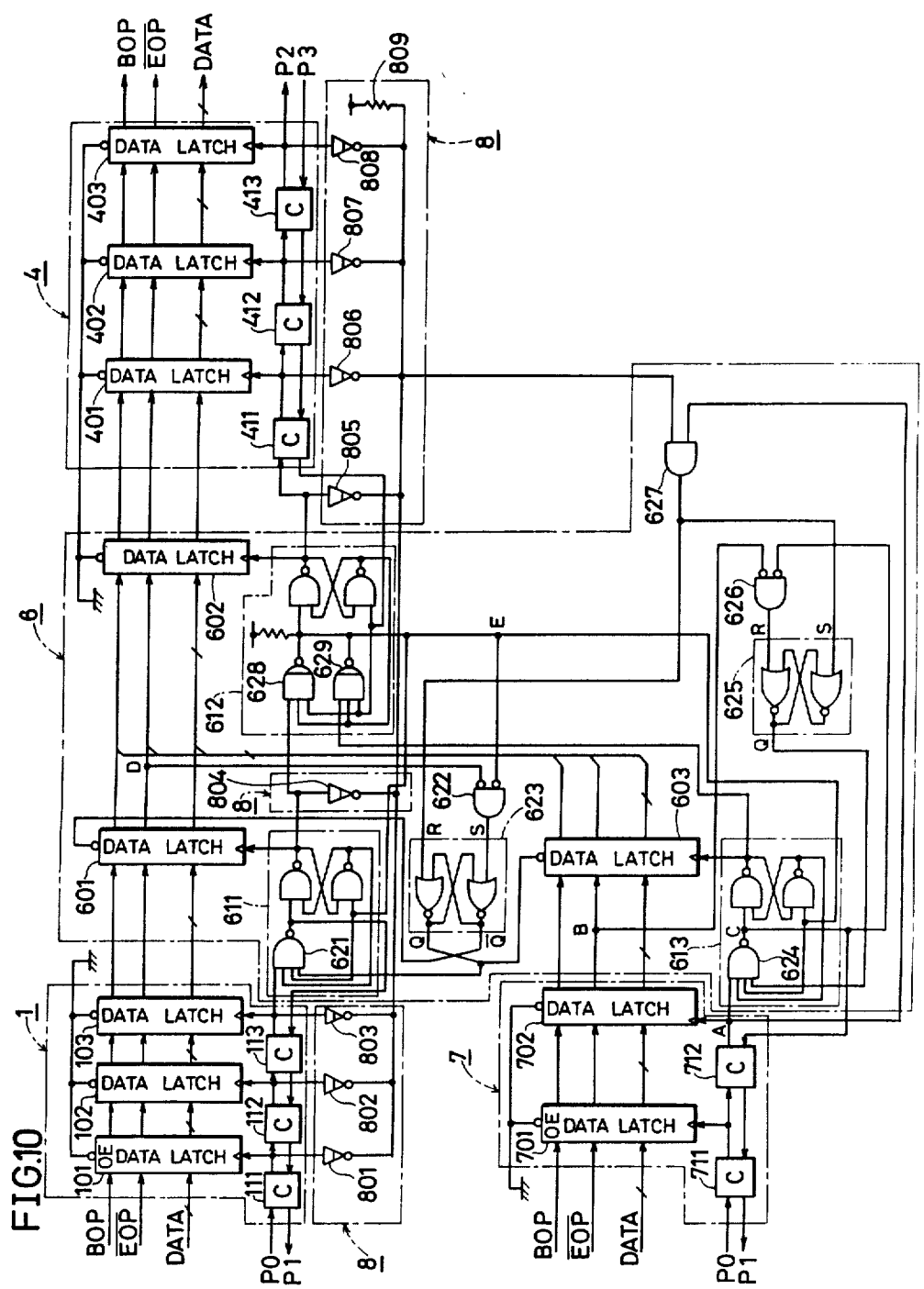
FIG. 10 is a concrete block diagram of the data transmission system shown in FIG. 9.

FIG. 10 is a concrete block diagram of the data transmission system having a jointing function shown in FIG. 9. First referring to FIG. 10, the construction thereof will be described. The input data transmission line 1 and the output data transmission line 4 are formed by asynchronous free-running shift registers in the same manner as in FIG. 8. The jointing data transmission line 7 is formed by an asynchronous free-running shift register comprising data latches 701 and 702 and C elements 711 and 712.

The jointing control portion 6 comprises data latches 601 to 603, C elements 611 to 613, SR flip-flop 623 and 625, two-input NOR gates 622 and 626 and a two-input AND gate 627. The SR flip-flop 625 is set when there is no data in the input data transmission line 1, and the SR flip-flop 623 is set when the data transmitted to the input data transmission line 1 is in a state ready to be transmitted to the output data transmission line 4. The AND gate 627 receives an empty state detection signal from the empty buffer verifier 8.

The empty buffer verifier 8 comprises: open collector type inverters 801 to 803 for receiving at the inputs thereof the control signal P2 provided from the C elements 11 to 113 included in the input data transmission line 1; open collector type inverters 804 and 805 for receiving at the inputs thereof the control signal P2 provided from the C elements 611 and 612 included in the jointing control portion 6; and open collector type inverters 806 to 808 for receiving at the inputs thereof the control signal P2 from the C elements 411 to 413 included in the output data transmission line 4. The outputs of these inverters 801 to 808 are provided by wired-OR connection and connected to a pull-up resistor 809 and to one input end of the AND gate 627 included in the above described jointing control portion 6.

Now the operation of the data transmission system having a jointing junction as shown in FIG. 10 will be described. The data transmission system shown in FIG. 10 joints the data to be jointed which is transmitted to the jointing data transmission line 7, to the main data transmission line comprising the input data transmission line 1 and the output data transmission line 4. As for the flow of data, the flow in the main data transmission line is given preference and only when an empty state exists in the main data transmission line is jointing of data permitted.

More specifically, when there is no data in the main data transmission line, the control signals P2 of the C elements 111 to 113, 611, 612 and 411 to 413 are respectively "0". As a result, the negative logic wired-OR output provided from the open collector type inverters 801 to 808 is "1". Then, when data is transmitted to the jointing data transmission line 7 and the BOP bit becomes "1", the two inputs of the AND gate 627 both become "1" and the output thereof becomes "1". By this output of the AND gate 627, the SR flip-flop 625 is set and the SR flip-flop 623 is reset. Subsequently, the Q output of the SR flip-flop 625 becomes "1" and the four-input NAND gate 624 of the C element 613 is opened, whereby the C element 613 operates in the same manner as the other C elements. At the same time, since data is ready to be latched by the data latch 603, the data transmitted on the jointing data transmission line 7 is transmitted to the output data transmission line 4 through the data latches 603 and 602 so as to be jointed to the main data transmission line.

On the other hand, in the input data transmission line 1, the C elements 611 does not enable the data latch 601 to latch the data latched in the data latch 103 in the preceding stage because the signal supplied to the four-input NAND gate 621 is "0" by resetting of the SR flip-flop 623. As a result, the input data transmission line 1 is disconnected from the output data transmission line 4. At this time, since the output of the data latch 601 is in a high impedance state, jointing of data will not be obstructed even if data arrives at the input data transmission line 1 during the jointing operation.

After jointing of data of one packet is completed, the jointing control portion 6 performs control so that data flows again in the main data transmission line. More specifically, when the C element 712 of the jointing data transmission line 7 sends out the final word of the data packet from the data latch 702, the $\overline{EOP}$ bit becomes "0", and when the C element 613 receives the control signal P2 from the C element 712, the output of the four-input NAND gate 624 becomes "0". In consequence, the output of the two-input NOR gate 626 becomes "1" and the SR flip-flop 625 is reset so that the subsequent packet may not be transmitted between the C elements 712 and 613.

When the final word of the jointed packet is received by the first stage of the output data transmission line 4, namely, when the EOP bit of the data latch 601 of the jointing control portion 6 and the outputs of the wired-OR connected four-input NAND gates 628 and 629 become all "0", the input signals of the two-input NOR gate 622 both become "0". As a result, the SR flip-flop 623 is set so that the C element 611 can transmit the data of the preceding stage. In other words, data can flow in the main data transmission line.

As the C element 612 at the jointing point, open collector type NAND gates 628 and 629 are used. Thus, the number of gate delay stages in the C element 612 is two, which is the same as in the other C elements, and the C element 612 can operate at almost the same speed as in the other C elements. Therefore, if there is no data to be jointed, the smooth flow of data in the main data transmission line is not disturbed.

As described above, the flow of data in the main data transmission line is given preference and only when an empty buffer for jointing is assured, the packet in the jointing data transmission line 7 is jointed to the output data transmission line 4 and thus, an efficient jointing mechanism can be assured.

Figure 11:
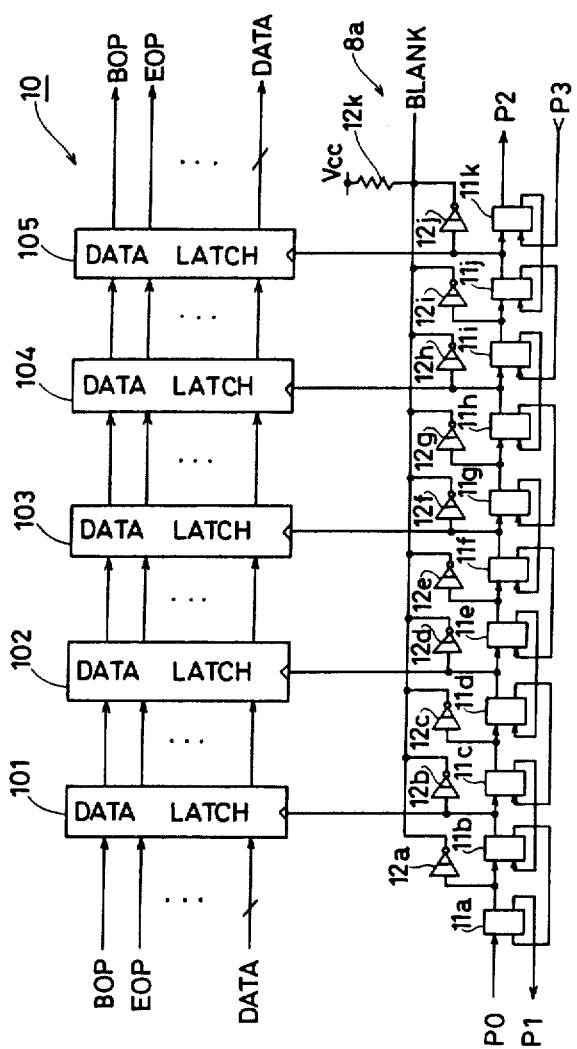
FIG. 11 is a circuit diagram showing another example of an empty buffer verifier.

FIG. 11 is a block diagram showing another example of the empty buffer verifier 8 shown in FIG. 10. In the example shown in FIG. 11, the C elements 111 to 113 of the input data transmission line 1 as shown in FIG. 10 are constructed respectively by two stages. More specifically, corresponding to the data latches 101 to 105 respectively, two-stage C elements 11a and 11k are provided so that the outputs thereof are supplied to open collector type inverters 12a and 12j respectively. These open collector type inverters 12a and 12j are connected by wired-OR connection and at the point of connection thereof, a pull-up resistor 12k is connected. Thus, the C elements 11a to 11k are constructed respectively by two stages, which is effective particularly in the case in which the control signal is applied rapidly to the flow of data.

Figure 12:
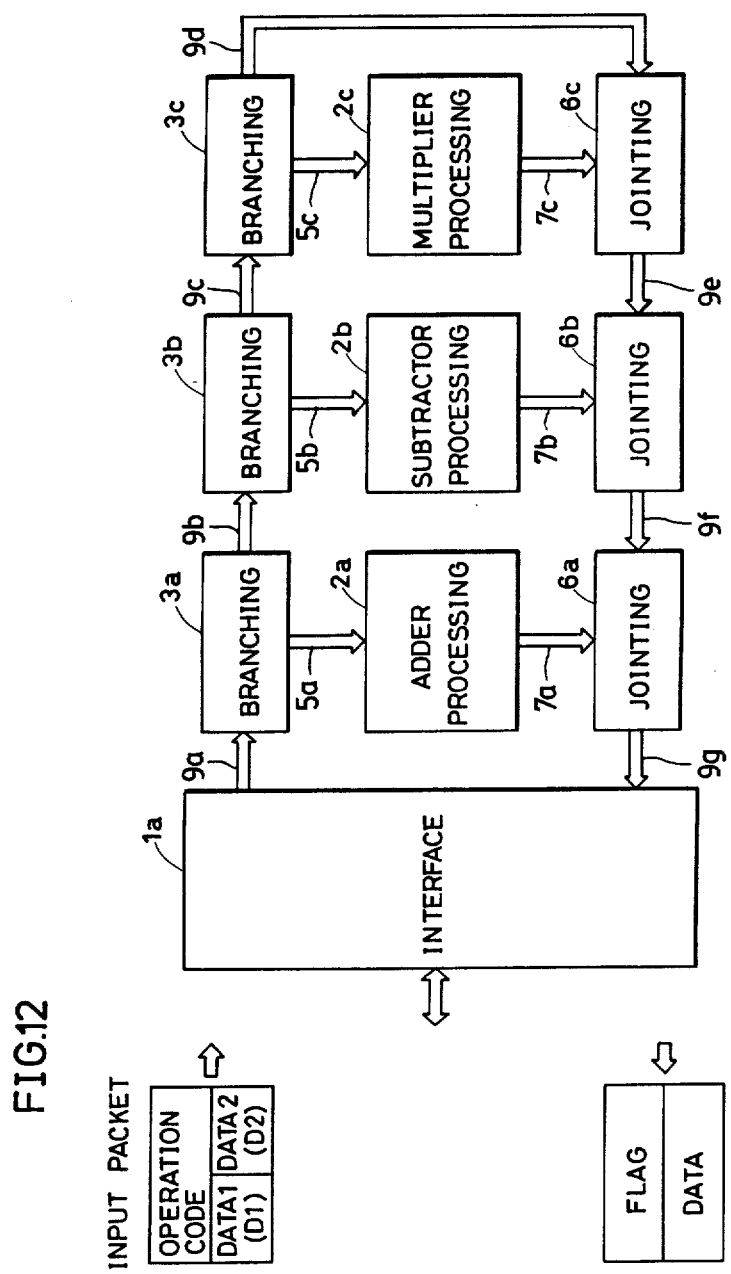
FIG. 12 is a diagram of a network system having distributed functions formed by the data transmission system shown in FIGS. 3 and 9.

FIG. 12 is a diagram showing an example of a function distributed network system formed by the data transmission system shown in FIGS. 3 and 9. In the function distributed network system shown in FIG. 12, with respect to an interface 1a, the branching portions 3a, 3b and 3c as shown in FIG. 3 are connected by cascade connection and the jointing portions 6a, 6b and 6c as shown in FIG. 9 are further provided by cascade connection to form a ring-like main data transmission line 9a–9g, an adder processing portion 2a being connected between the branching portion 3a and the jointing portion 6a by branching data transmission line 5a and jointing data transmission line 7a, a subtractor processing portion 2b being connected between the branching portion 3b and the jointing portion 6b by branching data transmission line 5b and jointing data transmission line 7b and a multiplier process portion 2c being connected between the branching portion 3c and the jointing portion 6c by branching data tranmission line 5c and jointing data transmission line 7c. The packet entered from the exterior through the interface 1a is branched by the branching portions 3a, 3b and 3c and supplied to the adder processing portions 2a, the subtractor processing portion 2b and the multiplier processing portion 2c. The thus branched packets are processed respectively in the adder processing portion 2a, subtractor processing portion 2b and the multiplier processing portion 2c and the processed packet data are jointed again to the main data transmission line 9a–9g by means of the jointing portions 6a, 6b and 6c, so as to provide to the exterior through the interface 1a.

More specifically stated, the packet data received from the exterior through the interface 1a is packet data of two words comprising an operation code and data as shown in FIG. 12. The branching portions 3a, 3b and 3c branch the packet data to the associated calculation processing portions only in the case where the first word of the input packet, that is, the operation code is coincident with the comparison data. The respective calculation processing portions 2a to 2c perform calculation of the data 1 (D1) and the data 2 (D2) of the input packet so that packets comprising a result flag and result data are provided. The output packet data are jointed to the main data transmission line 9a–9b through the jointing portions 6a to 6c so as to be provided to the exterior through the interface 1a.

In the example shown in FIG. 12, Q buffers (not shown) using asynchronous free-running shift registers are provided at the respective input and output ends of the processing portions 2a to 2c so that a dynamic load balance may be maintained among the respective functions.

In the previously described data transmission system having a branching function as shown in FIG. 3, if the data transmitted to the input data transmission line 1 is packet data including a branching condition, the packet data is branched to the branching data transmission line 5. For this reason, a branching condition is preset in the branching control portion 3. The branching condition thus preset is fixed and no consideration is taken into account as to the possibility of changing it in an operation state. However, at the time of initialization of the system, for example, sometimes it is desired to set branching conditions in an arbitrary manner. Therefore, a data transmission system having a function of changing freely data branching conditions in an operation state will be described in the following.

Figure 13:
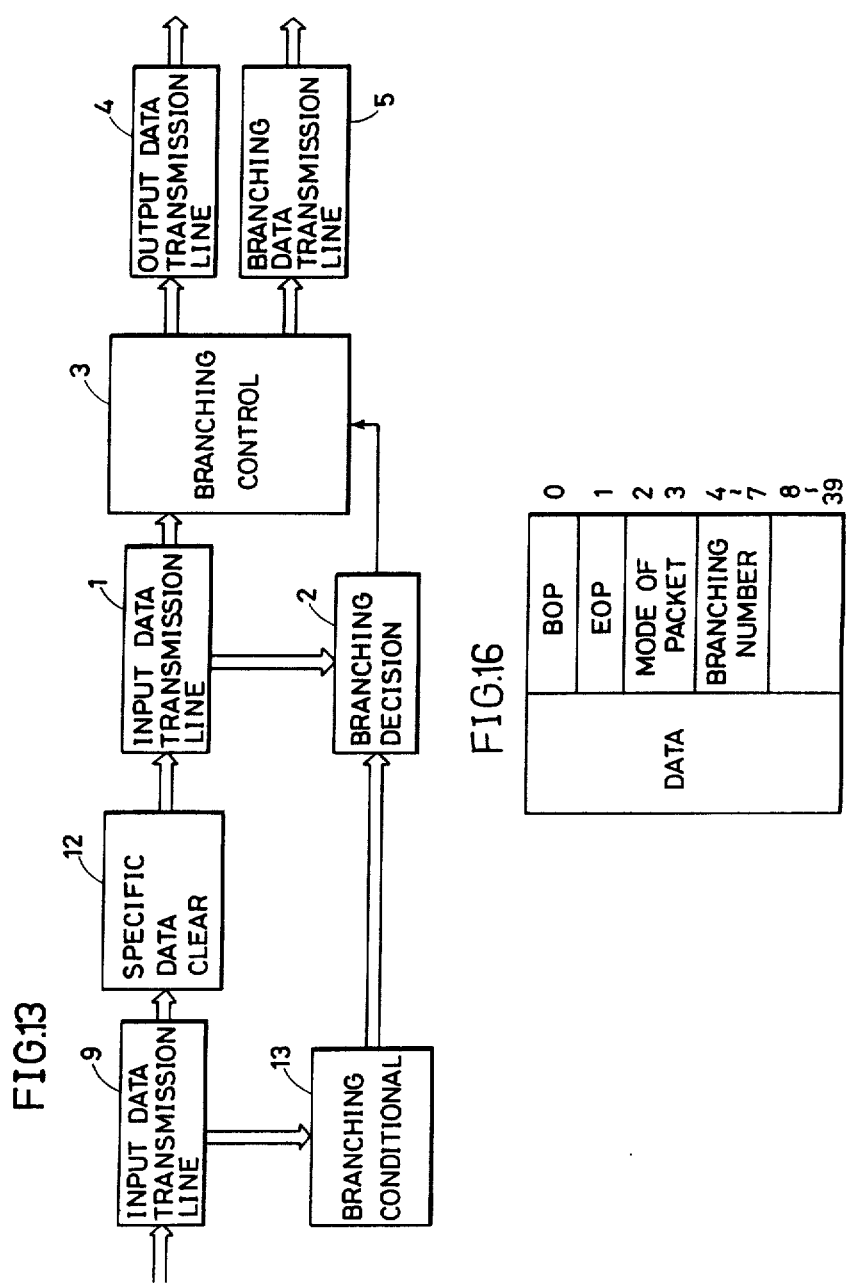
FIG. 13 is a schematic block diagram showing an example of a data transmission system having a function of changing branching conditions.

FIG. 13 is a schematic diagram showing an example of a data transmission system having a function of changing branching conditions. The data transmission system shown in FIG. 13 comprises, in addition to the input data transmission line 1, the branching decision circuit 2, the branching control portion 3, the output data transmission line 4 and the branching data transmission line 5 shown in FIG. 3, another input data transmission line 9, a specific data clear portion 12 and a branching condition changing portion 13. The input data transmission line 9 is formed by an asynchronous free-running shift register in the same manner as in the input data transmission line 1. The input data transmission line 9 receives specific data including a specific identifier for indicating a change of branching condition. The branching condition changing portion 13 detects the specific data transmitted to the input data transmission line 9 so that the branching condition of the branching decision circuit 2 is changed according to the specific data. The specific data transmitted to the input data transmission line 9 is cleared in the specific data clear portion 12 and the other data is supplied to the branching control portion 3 through the input data transmission line 1.

Figure 14:
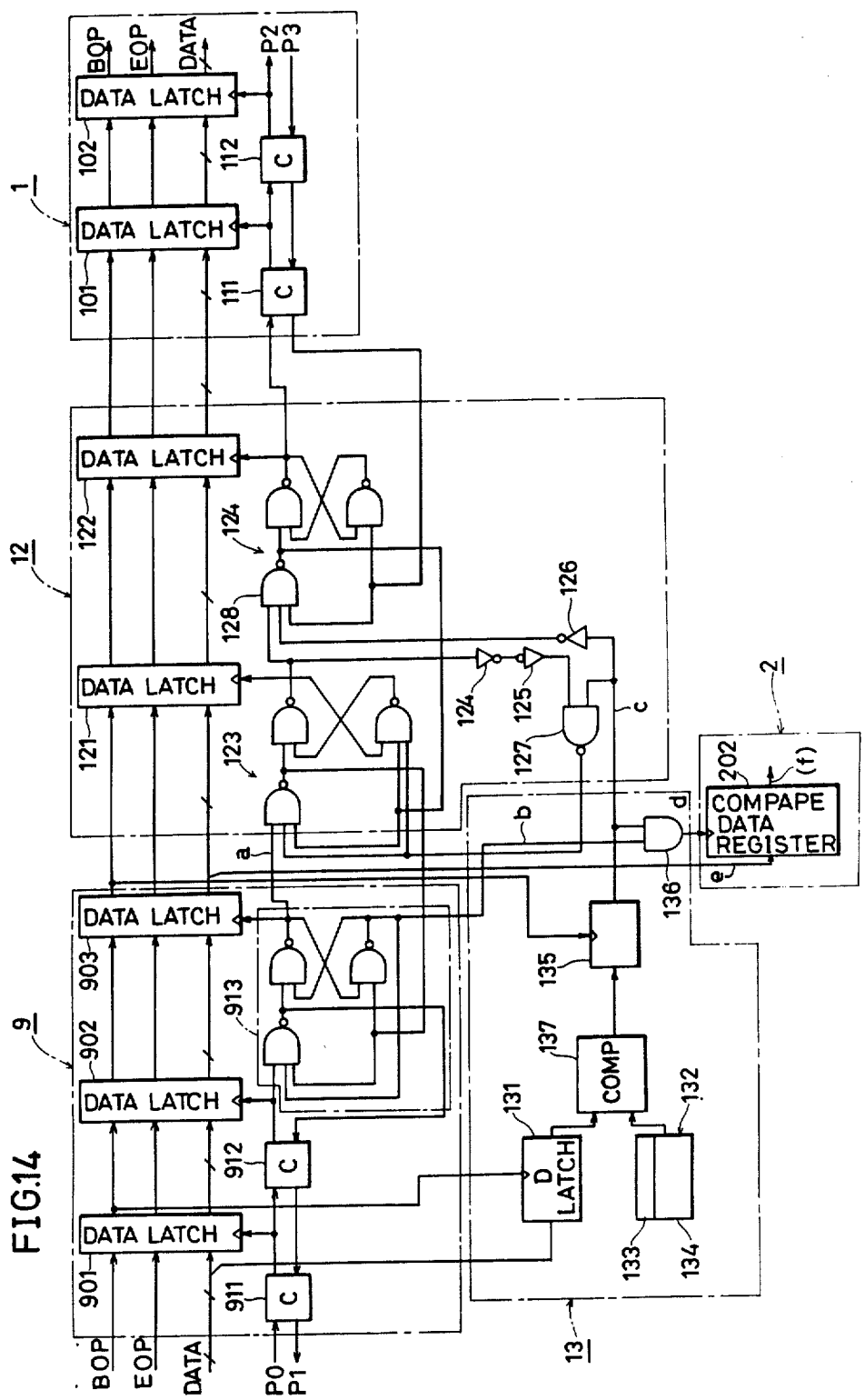
FIG. 14 is a concrete block diagram of the input data transmission line, the specific data clear portion and the branching condition changing portion shown in FIG. 13.

FIG. 14 is a concrete block diagram of the input data transmission line, the specific data clear portion and the branching condition changing portion shown in FIG. 13. Since the input data transmission line 1, the branching decision circuit 2, the branching control portion 3, the output data transmission line 4 and the branching data transmission line 5 are formed in the same manner as described previously in connection with FIG. 8, a detailed description thereof will be omitted.

Referring to FIG. 14, the input data transmission line 9 is formed by an asynchronous free-running shift register including data latches 901 to 903 and C elements 911 to 913.

The specific data clear portion 12 comprises data latches 121 and 122, C elements 123 and 124, inverters 124 to 126 and a NAND gate 127. The inverter 126 inverts the branching change decision signal supplied from the below described branching condition changing portion 13 and supplies the inverted signal to the C element 124, so that the data latched in the data latch 121 is prohibited from being latched in the data latch 122 in the subsequent stage. The inverters 43a and 43b invert respectively the control signal P2 from the C element 123 and supply the inverted signal to one input end of the NAND gate 127. The NAND gate 127 causes the control signal P2 to disappear in response to the branching change decision signal so as not to apply, to the C element 913 of the input data transmission line, the control signal P2 for transmission of data of one packet provided from the C element 123.

The branching change circuit 13 comprises a D-type latch 131, a comparison data register 132, a comparing circuit 137, a D-flip-flop 135 and an AND gate 136. The D-type latch 131 latches the specific data including an identifier received by the input data transmission line 9. The comparison data register 132 stores in advance the data 133 representing the branching rewriting mode and the branching number data 134. The comparing circuit 137 compares the specific data latched in the D-type latch 131 with the data in the comparison data register and determines whether the branching condition is to be changed or not. The D-flip-flop 135 supplies, based on the result of comparison by the comparing circuit 137, the branching change decision signal to the above described branching condition clear circuit 12 and the AND gate 136. The AND gate 136 stores the branching condition change data in the comparison data register 202 of the branching decision circuit 2 in response to the branching change decision.

Figure 15:
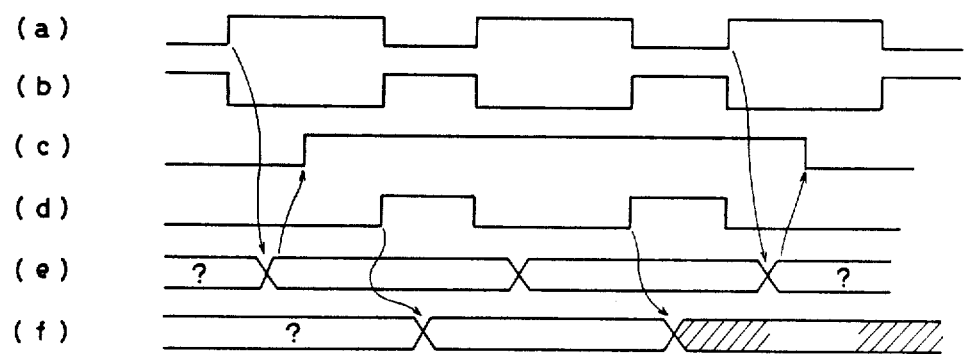
FIG. 15(a–f) is an operation timing chart of the respective portions shown in FIG. 14.

FIG. 15 is a timing chart for explaining the operation in FIG. 14, and FIG. 16 is an illustration showing an arrangement of a data packet used in this embodiment.

Now, referring to FIGS. 13 to 16, the operation for changing the branching condition will be described. The specific data packet contains in addition to the BOP bit and the EOP bit, data on the operation mode of packet in the second and third bits and data on the branching number for the branching condition change mode as the operation mode of packet in the fourth to seventh bits, as shown in FIG. 16. Specific packet data is applied from a host computer for example to the input data transmission line 9.

When the specific packet data arrives at the data latch 901 corresponding to the C element 911, first, the second to seventh bits of data of the first word are latched in the D-type latch 131. Then, the operation mode data and the branching number data individually allotted in the branching data transmission line 4 are compared respectively by the comparing circuit 137, with the branching condition rewriting mode data 133 and the branching number data 134 stored in the comparison data register 132, so that the signals representing the results of comparison are stored in the D-flip-flop 135. If the results of comparison show coincidence and the output of the D-flip-flop 135 changes from "0" to "1" as shown in FIG. 15(c), the content of the input specific data packet is stored in the comparison data register 202 as shown in FIG. 15(f).

Thus, the first word is stored in the comparison data register 202. Also, when the second word arrives, the output of the D-flip-flop 135 is "1" (as shown in FIG. 15(c)) indicating coincidence and in consequence, the second word is stored in the comparison data register 202 and the data of the first word disappears. The data of the second word is maintained until it is renewed by the subsequent data.

During a period when the output of the D-flip-flop 135 is "1", the signal is inverted by the inverter 126 and the three-input NAND gate 128 included in the C element 124 is closed, whereby the control signal P2 provided from the C element 123 in the preceding stage is prohibited from being transmitted to the C element 124. At this time, the control signal P2 is supplied to the NAND gate 127 through the inverters 124 and 125. However, since the NAND gate 127 is closed by the branching change decision signal, the control signal P2 is not supplied to the C element 913 included in the input data transmission line 9 and thus disappears. In other words, the specific data packet for change of the branching condition disappears automatically when the processing thereof is performed.

As described above, in this embodiment, the branching condition can be changed in the operation state for transmission of data by supplying specific packet data from the input data transmission line 9 to the branching condition change portion 13 and the specific data clear portion 12, and after the change of the branching condition, the specific packet data can be made to disappear automatically.

Consequently, in the embodiment shown in FIGS. 13 to 16, the branching condition can be set freely at the time of initialization of the system and as a result, the flexibility of the system can be improved and the download etc. of a program can be attained easily. In addition, during the operation of the system, the system can be checked by changing the branching condition and also, the memory function in the system can be replaced by the host computer by changing the branching condition.

In addition, at the time of stop of the system, various dumps can be applied. Furthermore, even in a case where small branching lines are further provided in the branching data transmission line 4 with each end being blocked for example, the packet data having performed the function of changing the branching condition can be made to disappear automatically and as a result, whatever the topology of the system might be, the branching condition can be set freely.

Although the specific data clear portion 12 is provided in the above described embodiment, this portion may not necessarily be provided.

In addition, although the case of changing the branching condition data of the comparison data register 202 in the branching decision circuit 2 was described in the above stated embodiment, the present invention is not limited thereto. The present invention is also applicable to the case of changing the data of the mask data register 203 shown in FIG. 8.

Figure 17:
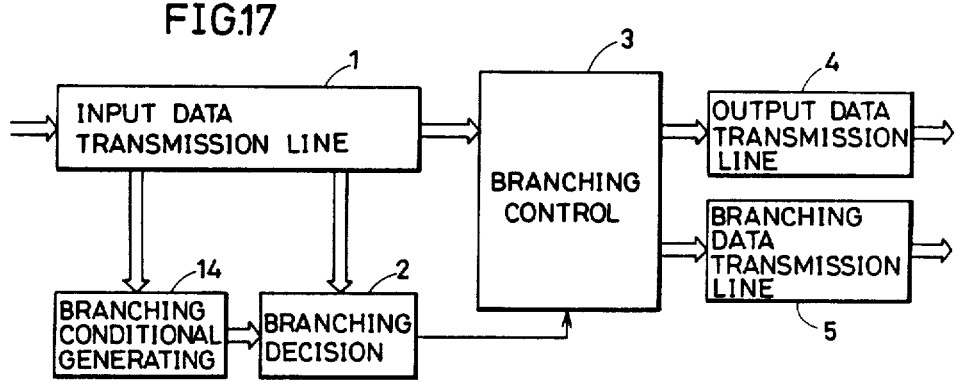
FIG. 17 is a schematic block diagram showing an example of a data transmission system having a function of generating branching conditions in accordance with the present invention.

FIG. 17 is a schematic block diagram showing an example of a data transmission system having a function of generating branching condition data in accordance with another embodiment of the present invention. The data transmission system shown in FIG. 17 comprises a branching condition generating portion 14 for generating a plurality of branching condition data, so that one of the plurality of branching condition data is selected according to the content of the data transmitted to the input data transmission line 1 and is supplied to the above described branching decision circuit 2 as shown in FIG. 3. Except for the branching condition generating portion 14, the input data transmission line 1, the branching decision portion 2, the branching control portion 3, the output data transmission line 4 and the branching data transmission line 5 are formed in the same manner as in FIG. 3.

Figure 18:
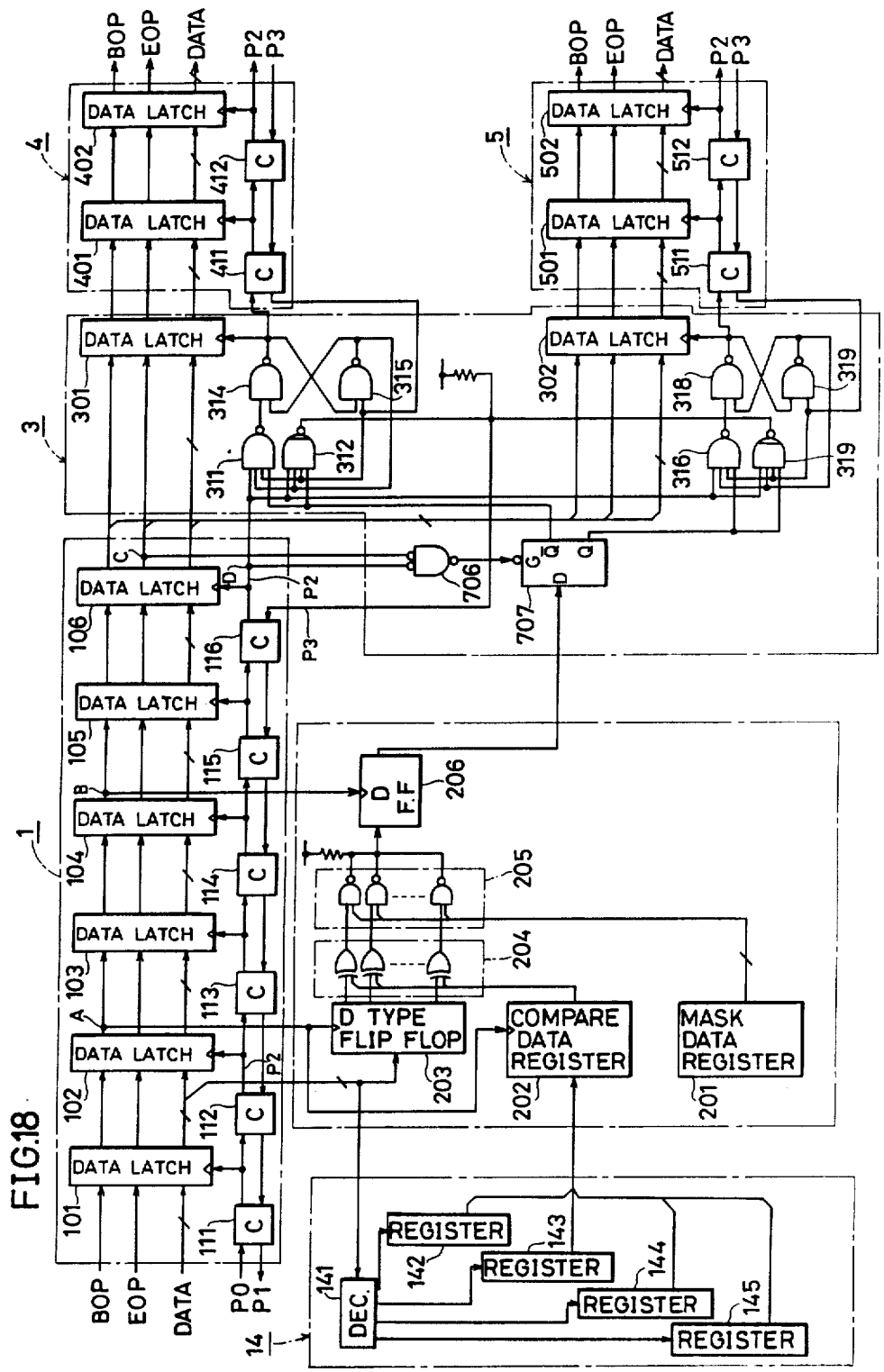
FIG. 18 is a concrete block diagram of the data transmission system shown in FIG. 17.

FIG. 18 is a concrete block diagram of the data transmission system shown in FIG. 17. The data transmission system shown in FIG. 18 is the same as the above described data transmission system having a branching function as shown in FIG. 8, except that the branching condition generating portion 14 is provided in the system in FIG. 18. Therefore, only the branching condition generating portion 14 will be described in the following. The branching condition generating portion 14 comprises a decoder 141 and registers 142 to 145. The registers 142 to 145 store in advance different branching condition data. The decoder 141 decodes the data transmitted to the input data transmission line 1 and selects any one of the registers 142 to 145. From the selected register, the branching condition data is read out so as to be stored in the comparison data register 202 included in the branching portion decision portion 2.

Now, the operation of the above described data transmission system will be described. When the first word of the packet data is transmitted to the input data transmission line 1 and latched in the data latch 101 corresponding to the C element 111, the first word of the packet data is stored in the D-flip-flop 203 of the branching decision circuit 2 and at the same time, is supplied to the decoder 141. The decoder 141 decodes a part of the content of the data and designates any one of the registers 142 to 145. For example, if the register 142 is designated, the branching condition data stored in advance therein is supplied to the comparison data register 202 so that the branching condition is set.

At the time of branching data, if there is no data in the branching data transmission line 5, that is, the line 5 is not in an empty state, branching of data cannot be performed smoothly at high speed.

Figure 19:
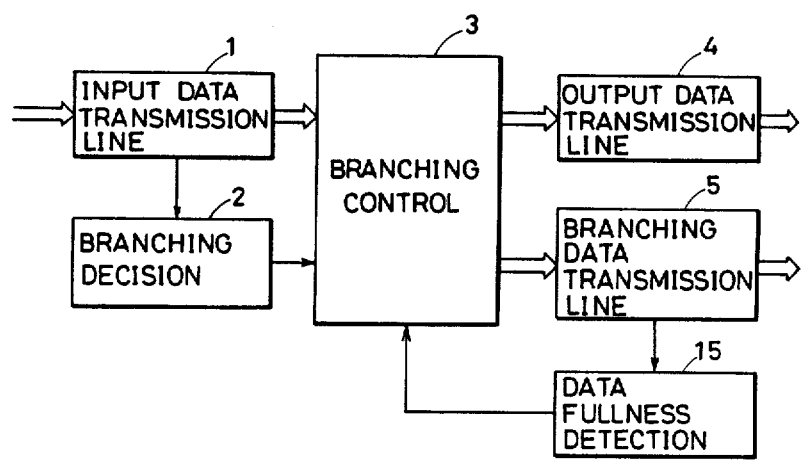
FIG. 19 is a schematic block diagram showing an example of a data transmission system comprising a data arrival verifier and a data fullness detector and having a branching function.

FIG. 19 is a schematic block diagram showing an example of a data transmission system having a branching function and comprising a data fullness detecting portion. The data transmission system shown in FIG. 19 comprises a data fullness detection circuit 15 for detecting fullness of data in the branching data transmission line 5 and the other construction is the same as in FIG. 3.

Figure 20:
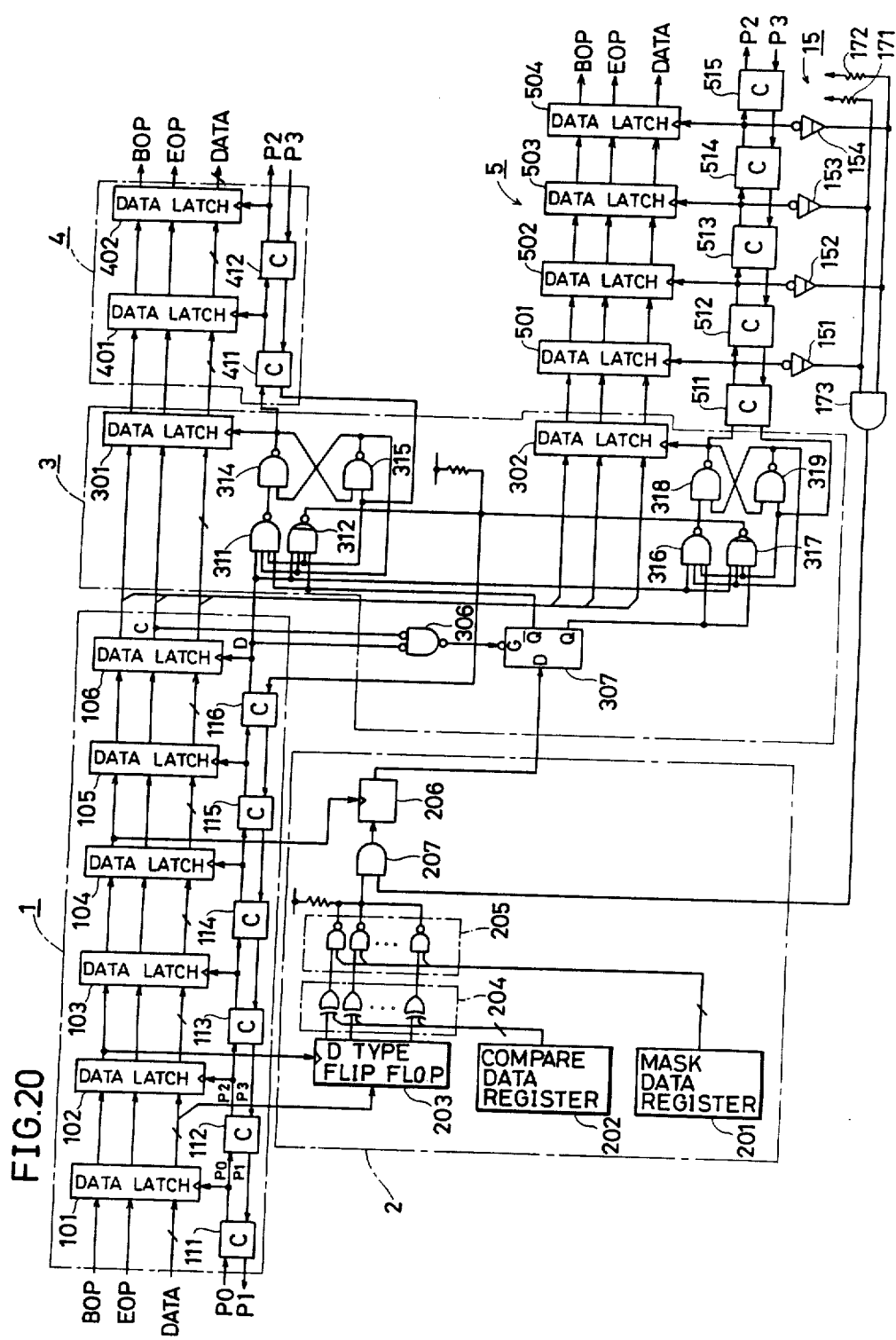
FIG. 20 is a concrete block diagram of the embodiment shown in FIG. 19.

FIG. 20 is a concrete block diagram of the data transmission system shown in FIG. 19. The data transmission system shown in FIG. 20 is the same as in FIG. 8, except that the branching data transmission line 5 comprises the data fullness detection circuit 15 and the branching decision circuit 2 comprises a two-input AND gate 207. The data fullness detection circuit 15 comprises open collector type inverters 151 to 154, pull-up resistors 171 and 172 and a two-input AND gate 173. To the input of the open collector type inverter 151, the control signal P2 is applied from the C element 511 and to the input of the inverter 153, the control signal P2 is applied from the C element 513. The respective outputs of these inverters 151 and 153 are provided by wired-OR connection and connected to one input end of the two-input AND gate 173 and to the pull-up resistor 171.

In the same manner, the input of the inverter 152 receives the control signal P2 from the C element 512 and the input of the inverter 154 receives the control signal P2 from the C element 514. The outputs of these inverters 152 and 154 are wired-OR connected and led to the other input end of the two-input AND gate 173 as well as to the pull-up resistor 172. The output of the AND gate 173 is connected to the other input end of the AND gate 207 included in branching decision circuit 2.

Now, the operation of the above described data transmission system will be described. If data is latched in any one of the data latches 501 to 504 included in the branching data transmission line 5, the control signal P2 of any one of the C elements 511 to 514 is "1" and any one of the wired-OR connected outputs of the inverters 151 to 154 is "0", so that the signal "0" is provided from the AND gate 173. As a result, the AND gate 207 of the branching decision circuit 2 is closed. Then, the branching decision signal provided from the two-input NAND gate 205 is not supplied to the D-flip-flop 206. Consequently, since the branching decision signal is not latched in the D-flip-flop 307 included in the branching control portion 3, the data transmitted to the input data transmission line 1 is not branched to the branching data transmission line 5. More specifically, in the state in which data is kept stopped as it is latched in any one of the data latches of the branching data transmission line 5, the data transmitted to the input data transmission line 1 is not branched to the branching data transmission line 5.

If data is not latched in any one of the data latches 510 to 504 of the branching data transmission line 5, in other words, in a state in which data is not stopped in the branching data transmission line 5, all the control signals P2 from the C elements 511 to 514 are "0". In consequence, the outputs of the wired-OR connected inverters 151 to 154 are all "1" and the AND gate 173 is opened. Accordingly, the output of the AND gate 173 becomes "1" and the AND gate 207 of the branching decision circuit 2 is opened. As a result, the branching decision signal provided from the NAND gate 205 is set in the D-flip-flop 206 and is also latched in the D-flip-flop 307, whereby the data transmitted to the input data transmission line 1 is branched to the branching data transmission line 5. Thus, in the state in which data is not latched in any one of the data latches of the branching data transmission line 5, the data transmitted to the input data transmission line 1 is supplied to the branching data transmission line 5 in response to the decision of branching by the branching decision circuit 2.

As described above, the data fullness detection circuit 15 provided in association with the branching data transmission line 5 enables branching of data only when there is no data in the branching data transmission line 5 and thus branching can be performed smoothly at high speed.

Figure 21:
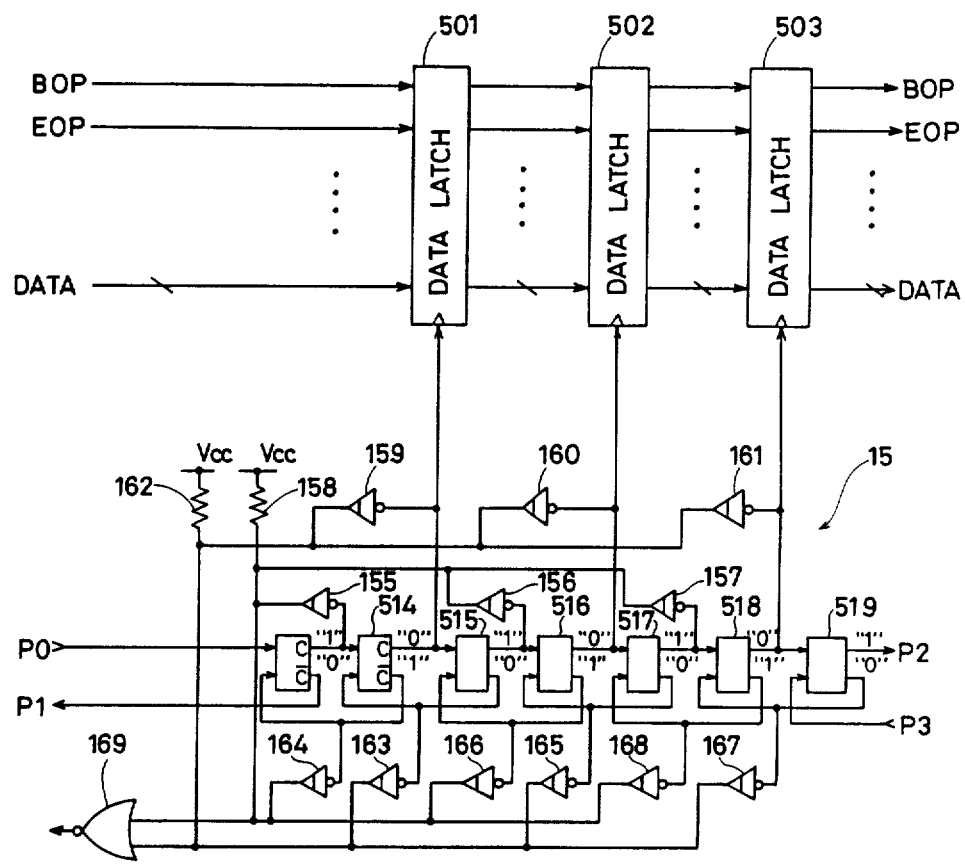
FIG. 21 is a circuit diagram showing another example of a data fullness detector.

FIG. 21 is a block diagram shown in another example of the data fullness detection circuit. In FIG. 21, C elements 514 to 520 each formed by two stages are provided corresponding respectively to the data latches 501 to 503 of the output data transmission line 5 so that a fullness state in the data latches 501 to 503 is detected based on the outputs of the C elements 514 to 520 in the respective first and second stages.

More specifically, the C element 514 in the first stage and the C element 515 in the second stage are provided forward and backward respectively in association with the data latch 501; the C element 516 in the first stage and the C element 517 in the second stage are provided forward and backward respectively in association with the data latch 502; and the C element 518 in the first stage and the C element 519 in the second stage are provided forward and backward respectively in association with the data latch 503. To the respective C output ends of the C elements 514, 516 and 518 in the first stages, the input ends of the wired-OR type inverters 159 to 161 are connected and to the respective C output ends of the C elements 515, 517 and 519 in the second stages, the open collector type inverters 155 to 157 are connected.

In addition, the $\overline{C}$ output ends of the C elements 514, 516 and 517 in the respective first stages are connected to the input ends of the open collector type inverters 164, 166 and 168 and the $\overline{C}$ output ends of the C elements 515, 517 and 519 in the respective second stages are connected to the input ends to the open collector type inverters 163, 165 and 167. The respective outputs of the open collector type inverters 155, 157, 164, 166 and 168 are connected by wired-OR connection and the respective connection ends thereof are connected to the pull-up resistor 158 and to one input end of the two-input NOR gate 169. The outputs of the inverters 159 to 161, 163, 165 and 167 are wired-OR connected and the connection ends thereof are connected to the pull-up resistor 162 and to the other input end of the NOR gate 169. The output end of the NOR gate 169 is connected to one input end of the AND gate 207 shown in FIG. 20.

The above described arrangement of the C elements each by two stages is effective particularly in a case, for example in which the transfer speed of the control signal among the elements is faster than the data transfer speed among the data latches. Thus, when the C elements 514 to 519 provide respectively signals "0, 1, 0, 1, 0, 1" and "1, 0, 1, 0, 1, 0" in order from the left as shown in FIG. 21, the NOR gate 160 provides the data fullness detection signal.

Figure 22:
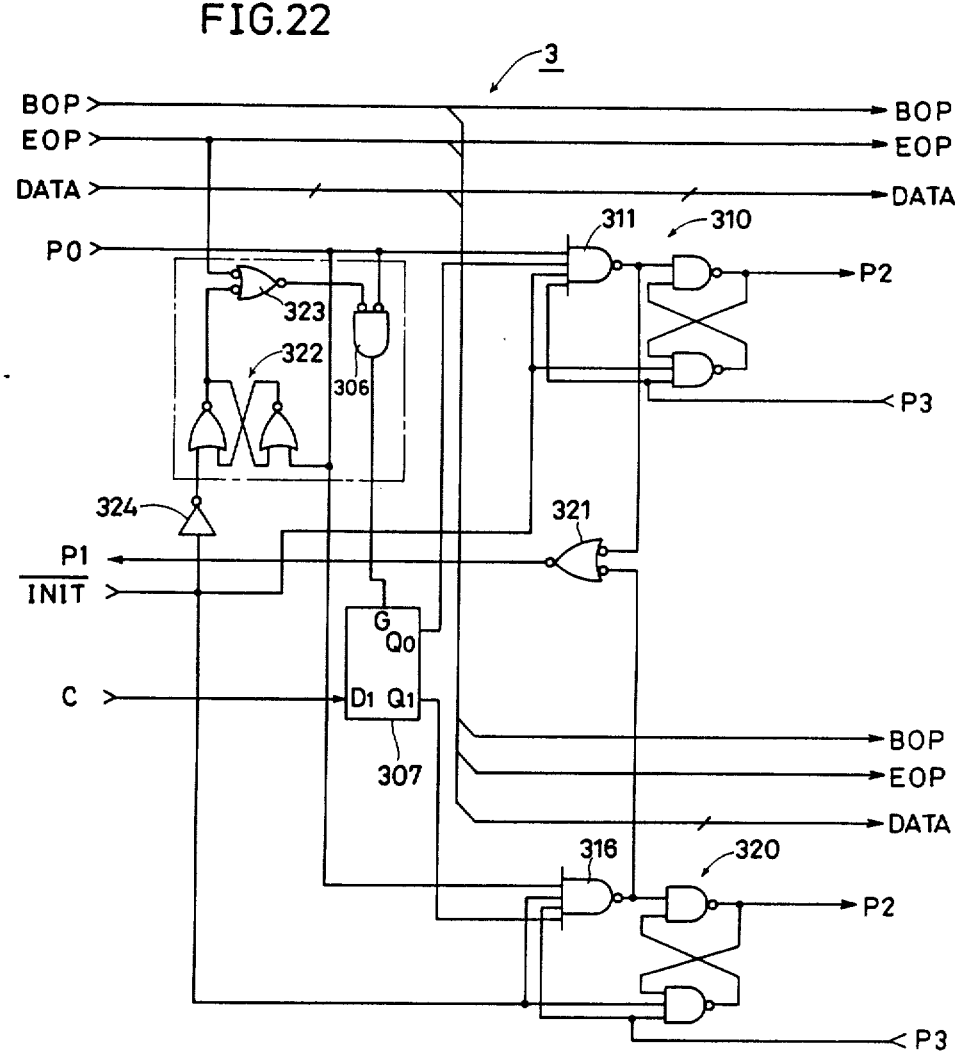
FIGS. 22 and 23 are circuit diagrams showing an essential portion of other examples of a branching control portion.

FIG. 22 is a block diagram showing an essential part of another example of the branching control portion. In the branching control portion 3 shown in FIG. 22, the manner in which the control signal is returned to the first stage of a C element is different from that in the above described branching control portion 3 shown in FIG. 8 and a circuit for initialization is further provided. More specifically, in the branching control portion shown in FIG. 8, the output ends of the open collector type four-input NAND gates 312 to 317 are wired-OR connected for the purpose of returning the control signal to the C element 116 of the input data transmission line 1. On the other hand, in the example shown in FIG. 22, the output of the four-input NAND gate 311 included in the C element 310 and the output of the NAND gate 316 included in the C element 320 are supplied to the C element 116 in the first stage through the OR gate 321.

The SR flip-flop 322 initially resets the D-flip-flop 307. More specifically, in the initial state of the system, an initialization signal is applied to the SR flip-flop 322 through the inverter 324 and the output of the SR flip-flop 322 serves to open the AND gate 306 through the OR gate 323. Then, the output of the D-flip-flop 206 of the branching decision circuit 2 at "0" in the initial state is latched in the D-flip-flop 307. Thus, in the initial state, the data applied to the input data transmission line 1 can be always transmitted to the output data transmission line 4.

Figure 23:
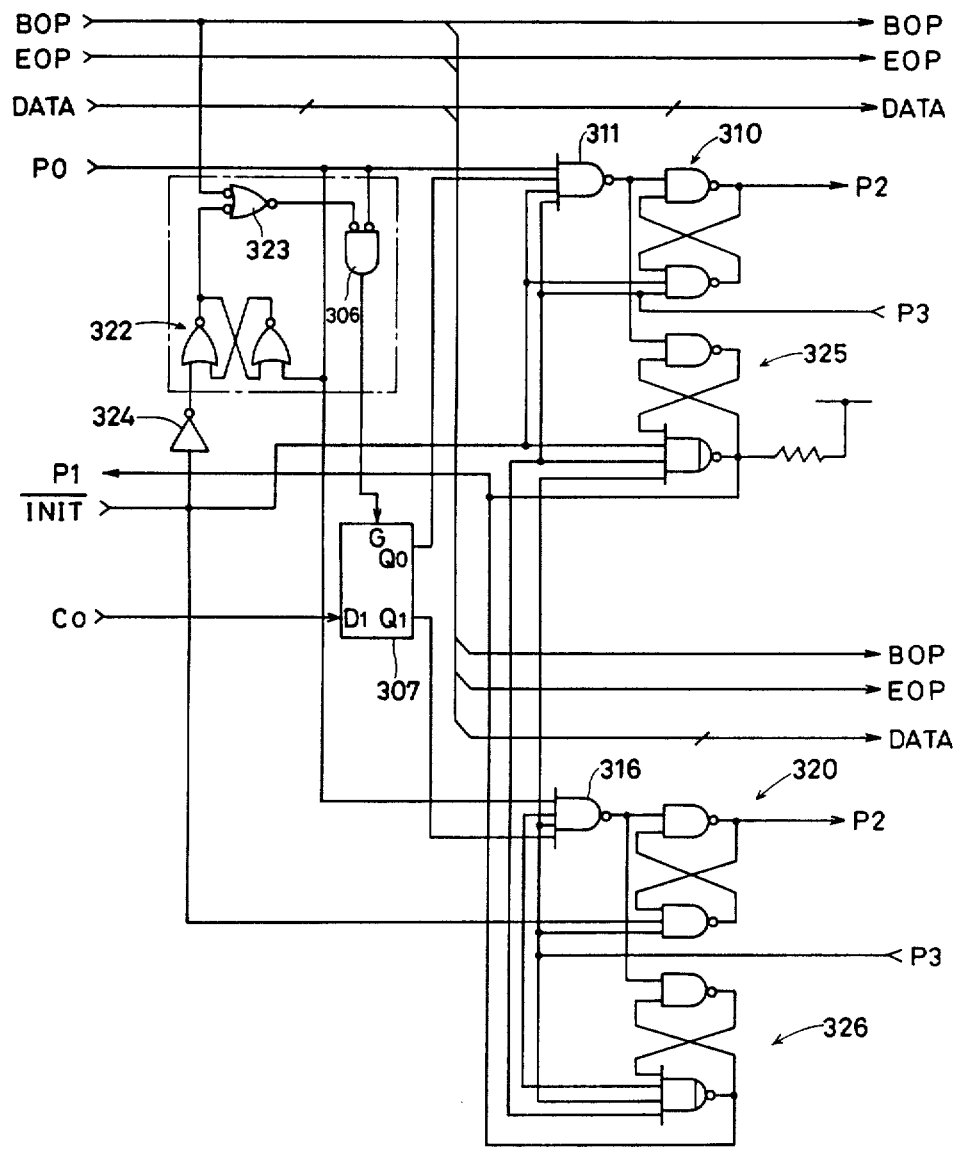

FIG. 23 is a block diagram showing an essential part of a further example of the branching control portion. In the branching control portion 3 shown in FIG. 23, the C elements 310 and 320 are provided respectively by two stages in parallel, with second C elements 325 and 326 being provided. As the NAND gates on one side of the C elements 325 and 326, open collector type gates are used and the respective outputs thereof are connected by wired-OR connection so that the control signal is returned to the C elements in the first stage. Accordingly, in the example shown in FIG. 23, as compared with the above described example shown in FIG. 22, there is no need to provide an OR gate 321 and the number of delay stages by logic gates is decreased by one. As a result, the data throughput in the branching control portion 3 can be improved.

Figure 24:
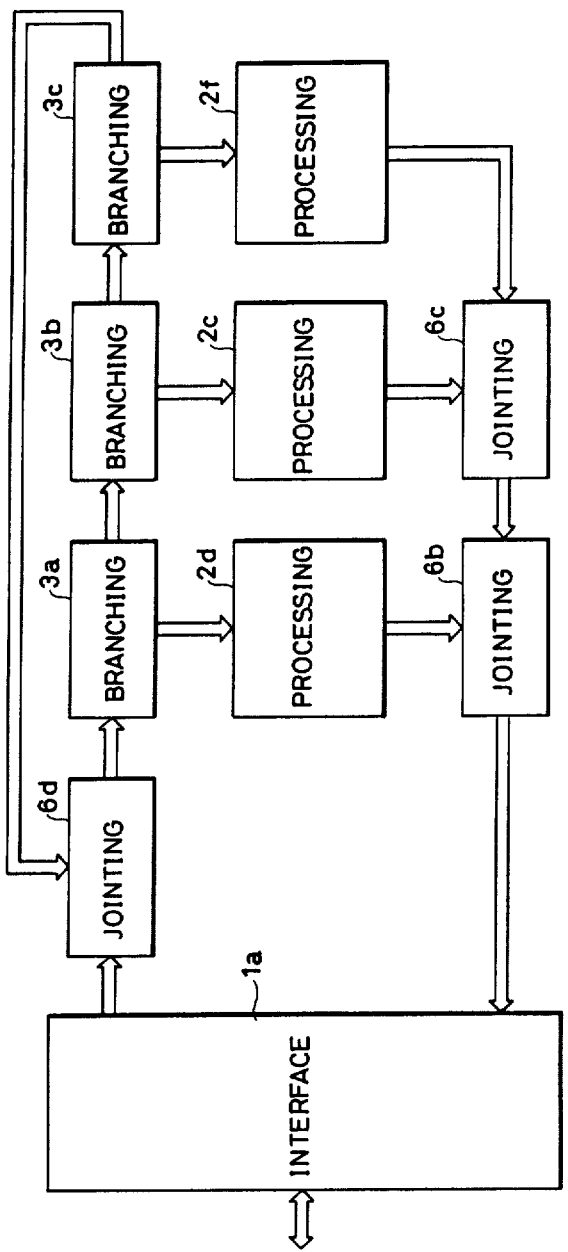
FIG. 24 is a schematic block diagram of a data processing unit formed by using a data transmission system in accordance with the present invention.

FIG. 24 is a schematic block diagram showing another example of a function distributed network system formed by a data transmission system in accordance with the present invention. In the function distributed network system shown in FIG. 24, a jointing portion 6d and branching portions 3a to 3c constitute a ring-like data transmission line and the packet data entered from the exterior through an interface 1a circulates through the ring-like data transmission line including the jointing portion 6d and the branching portions 3a to 3c so as to be branched, whereby processing is performed in processing portions 2d to 2f. Then, the result of processing is jointed by the jointing portions 6b and 6c so as to be provided to the exterior through the interface 1a.

Figure 25A:
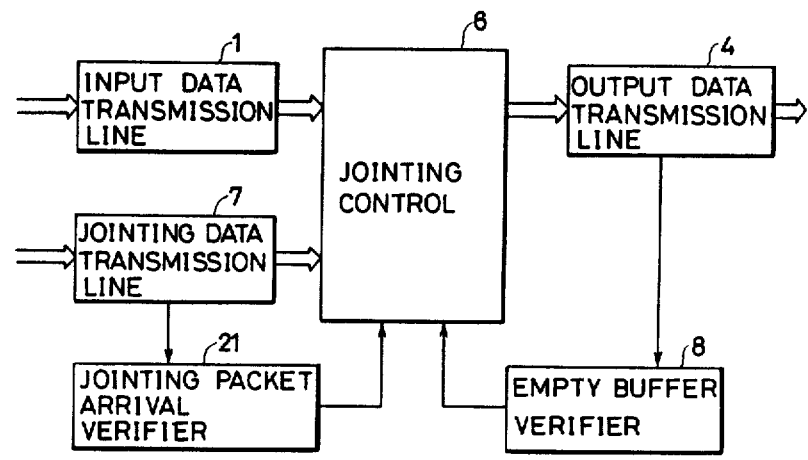
FIG. 25A is a schematic block diagram of a data transmission system comprising a jointing packet arrival verifier and an empty buffer verifier and having a jointing function.

FIG. 25A is a schematic block diagram of a data transmission system provided with a jointing portion including a jointing packet arrival verifier and an empty buffer verifier. The data transmission system shown in FIG. 25A is the same as the above described example shown in FIG. 9, except that in this system shown in FIG. 25A, a jointing packet arrival verifier 21 for verifying arrival of the data to be jointed is provided in the jointing data transmission line 7 and an empty buffer verifier 8 verifies only the empty state of the output data transmission line 4. The jointing packet arrival verifier 21 verifies whether a predetermined number of words of the jointing packet arrives at the jointing data transmission line 7. The jointing control portion 6 joints the packet data to the output data transmission line 4 when it is determined by the empty buffer verifier 8 that there is no data in the output data transmission line 4 and the arrival of the packet data of a predetermined number of words at the jointing data transmission line 7 is verified by the jointing packet arrival verifier 21.

Figure 25B:
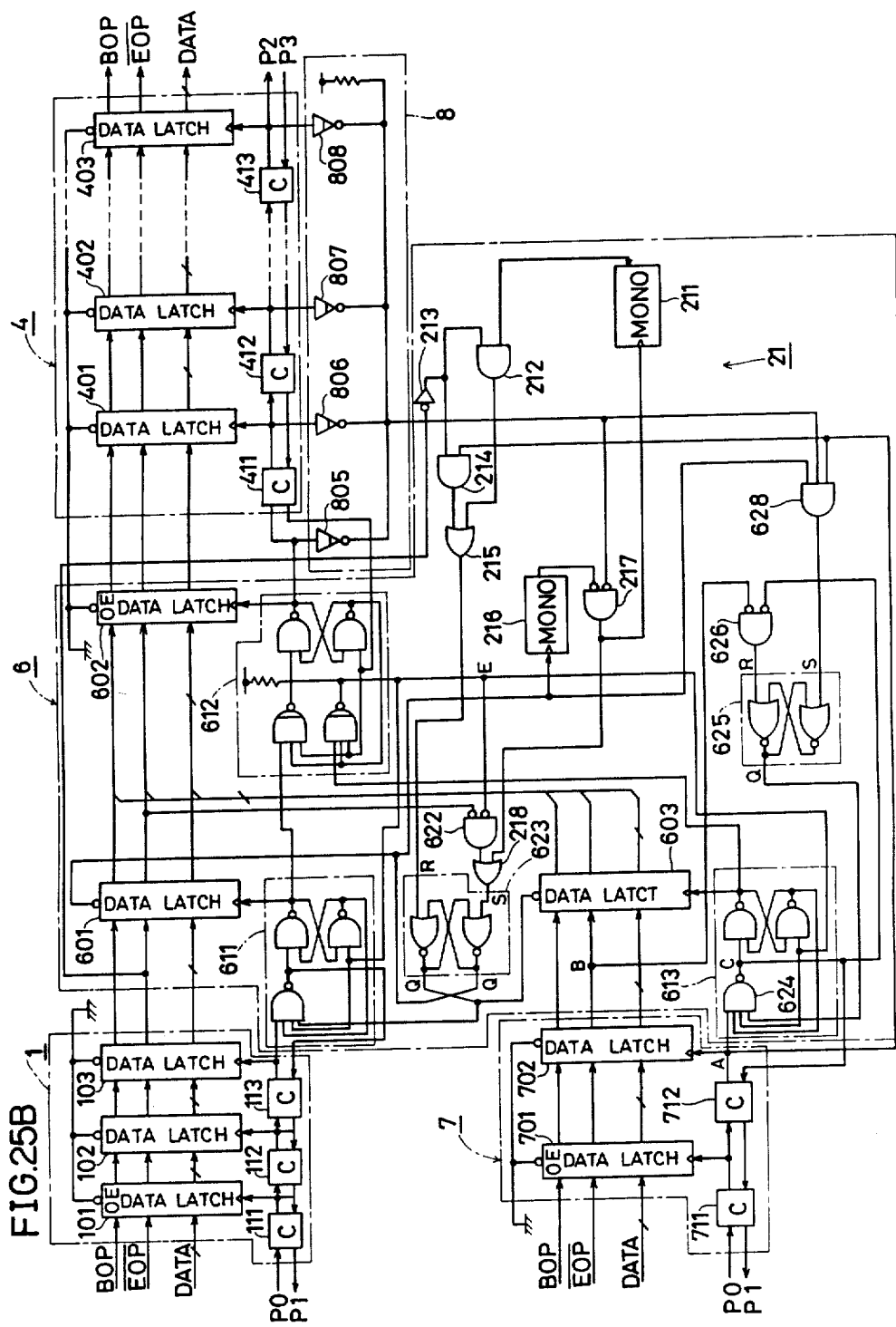
FIG. 25B is a concrete block diagram of the embodiment shown in FIG. 25A.

FIG. 25B is a concrete block diagram of the data transmission system shown in FIG. 24A. The data transmission system shown in FIG. 25B is the same as the previously described data transmission system having a jointing function shown in FIG. 10, except that in the system shown in FIG. 25B, the jointing packet arrival verifier 21 is provided in the jointing control portion 6 and the empty buffer verifier 8 verifies only the empty state of the output data transmission line 4. The jointing packet arrival verifier 21 comprises monostable multivibrators 211 and 216, AND gates 212 and 214, a NOR gate 217, OR gates 215 and 218 and an inverter 213. The AND gate 214 and the OR gate 215 detect the packet data to be jointed and stop the data transmitted to the main data transmission line.

The monostable multivibrator 216, the NOR gate 217 and the OR gate 218 transmit again the data stopped in the main data transmission line without jointing the data to be jointed, in a case where a predetermined empty buffer does not exists in the main data transmission line. The monostable multivibrator 211, the AND gate 212 and the inverter 213 stop the packet data transmitted again to the main data transmission line, after a lapse of a predetermined period of time after one or more packet data have passed through the main data transmission line.

The empty buffer verifier 8 is adapted to verify an empty buffer in the portion preceding the jointing control portion 6, namely, in the output data transmission line 4. In this case, the number of empty buffer stages to be verified by the empty buffer verifier 8 corresponds to the number of words of the jointing packet data plus some additional number of stages so as not to deteriorate the data throughput in the main data transmission line even if the jointing packet data is jointed to the main data transmission line. In other words, detection of the existence of an empty buffer is made only when there is sufficient space to prevent deteriorating the data throughput of the main data transmission line if the packet data is jointed to the main data transmission line.

Now, the operation of the above described transmission system will be described. In this embodiment, arrival of the jointing data at the end of the jointing data transmission line 7 facing the main data transmission line is detected and by this detection, the flow of data transmitted to the main data transmission line is stopped temporarily. In this state, jointing of data is permitted when a predetermined space of an empty buffer exists in the main data transmission line.

More specifically stated, when the jointing data reaches the stage of the C element 712, the control signal P2 of the C element 712 becomes "1" in this state, when the $\overline{EOP}$ of "0" is latched in the data latch 103 of the input data transmission line 1, the $\overline{EOP}$ is inverted by the inverter 213 and changed to "1", whereby the AND gates 212 and 214 are opened. As a result, the control signal P2 of the C element 712 is supplied as a reset signal to the SR flip-flop 623 through AND gate 214 and the OR gate 215. Consequently, the SR flip-flop 623 is reset. By the resetting of the SR flip-flop 623, the flow of data transmitted on the input data transmission line 1 is stopped. The above stated detection of the state of $\overline{EOP}$ in the input data transmission line 1 is made for the purpose of not interrupting the flow of data in a separated state in the input data transmission line 1.

As described above, if a predetermined space of an empty buffer exists in the output data transmission line 4 in the state in which the flow of data in the input data transmission line 1 is stopped, the empty buffer verifier 8 provides an output signal "1" to the AND gate 628. Then, the AND gate 628 sets the SR flip-flop 625 so that the jointing operation is performed in the same manner as described previously in connection with FIG. 10.

When the jointing operation is completed, the SR flip-flop 623 is set and the SR flip-flop 625 is reset, whereby the flow of data in the main data transmission line starts again. In this case, the pulse width of the monostable multivibrator 216 is set to the minimum period of time necessary for enabling the jointing packet data to pass through the empty buffer verifier 8 and accordingly, while the jointing packet data is being jointed to the main data transmission line, the main data transmission line will never be opened, in other words, the SR flip-flop 623 will never be set.

On the other hand, when a prescribed space of an empty buffer is not assured in a period of time corresponding to the pulse width set in the monostable multivibrator 216 in the state where the flow of data in the main data transmission line is stopped by the arrival of the jointing packet data, the AND gate 217 provides an output signal "1" and the SR flip-flop 623 is set with the timing of the fall of the Q output of the monostable multivibrator 216, whereby the flow of data in the main data transmission line starts. Then, after a lapse of time for setting by the monostable multivibrator 211, that is, a lapse of a period of passage of one or more packet data, it is verified again that $\overline{EOP}$ of "0" exists again in the data latch 103 of the input data transmission line 1, whereby the flow of data in the main data transmission line is stopped. Subsequently, the above described operation is repeated whereby control for the jointing of data is performed.

Thus, in this embodiment, at the time of jointing data, the flow of data in the main data transmission line is stopped temporarily to compress the data in the main data transmission line and in that state, jointing of data is permitted by verifying the existence of an empty buffer in the output data transmission line 4. As a result, a large amount of data can be made to circulate in the main data transmission line and the buffer capacity of the main data transmission line can be substantially increased. In addition, since some space of an empty buffer is still left at the time of permitting the jointing, the data throughput of the main data transmission line will never be deteriorated.

Figure 26A:
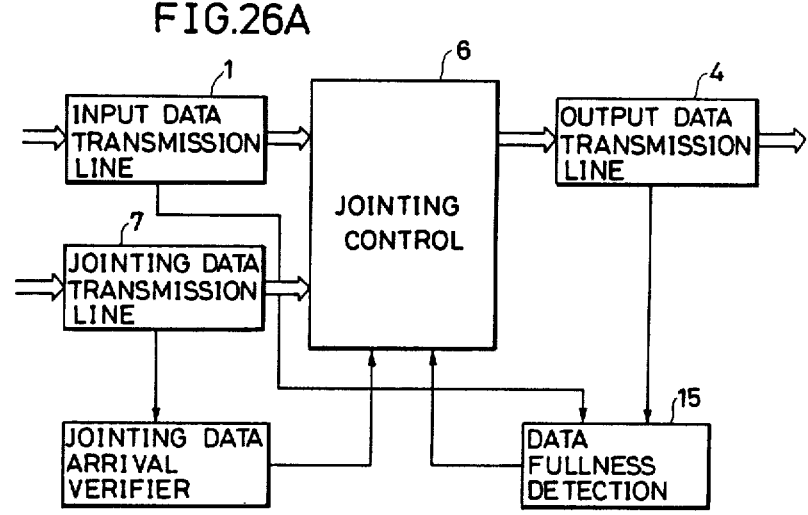
FIG. 26A is a schematic block diagram of a data transmission system comprising a jointing packet arrival verifier and a data detector and having a jointing function.

FIG. 26A is a schematic block diagram of a data transmission system provided with a jointing portion comprising a jointing packet arrival verifier and a data fullness verifier. In the example shown in FIG. 26A, a data fullness detection portion 15 is provided instead of the above described empty buffer verifier 8 shown in FIG. 25. In this embodiment, when the data fullness detection portion 15 detects nonexistence of fullness of data in the input data transmission line 1 and the output data transmission line 4, the jointing control portion 6 transmists the jointed data from the jointing data transmission line 7 to the output data transmission line 4.

Figure 26B:
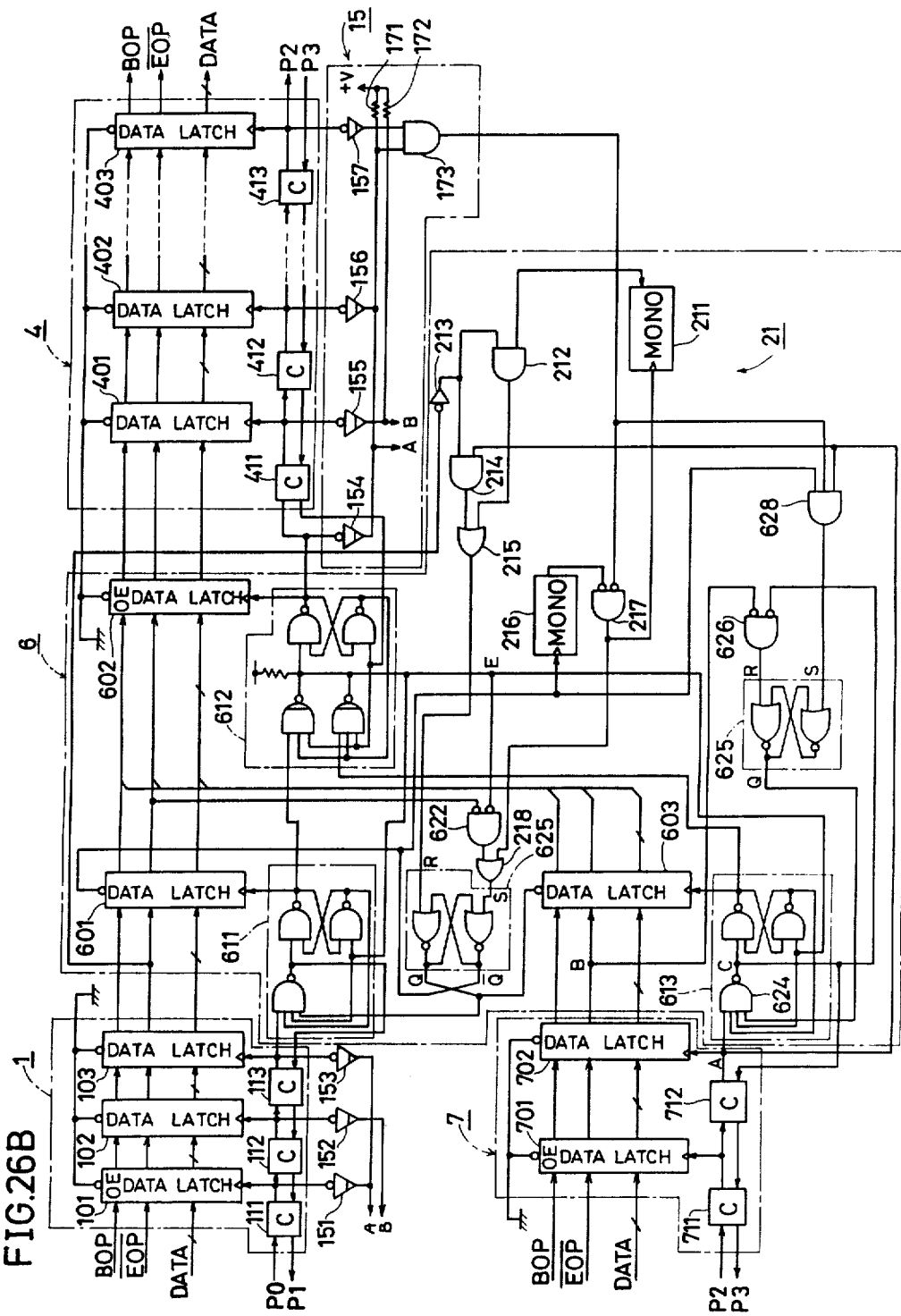
FIG. 26B is a concrete block diagram of the embodiment shown in FIG. 26A.

FIG. 26B is a concrete block diagram of the embodiment shown in FIG. 26A. This embodiment shown in FIG. 26B is only different from the embodiment of FIG. 25B in that the data fullness detection portion 15 is provided instead of the empty buffer verifier 8 shown in FIG. 25B. The data fullness detection portion 15 is the same as shown in FIG. 20. When there is no fullness of data in the input data transmission line 1 and the output data transmission line 4, a detection signal of "1" is provided from the AND gate 173 and this detection signal is supplied to the NOR gate 217 and the AND gate 628 included in the jointing control portion 6. Since the concrete operation of this embodiment is the same as that in FIG. 25B, description thereof will be omitted.

The inventors of the present invention examined the performance of transmission in a loop form of such asynchronous free-running shift registers as described above. In the following, the loop-form arrangement and the result of the examination will be described.

Figure 27:
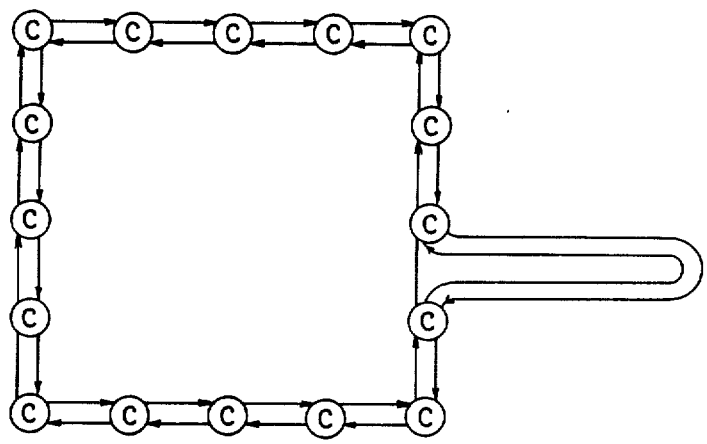
FIG. 27 is a block diagram showing a construction example of a transmission line in an experiment conducted in the process of accomplishing the present invention.
Figure 28:
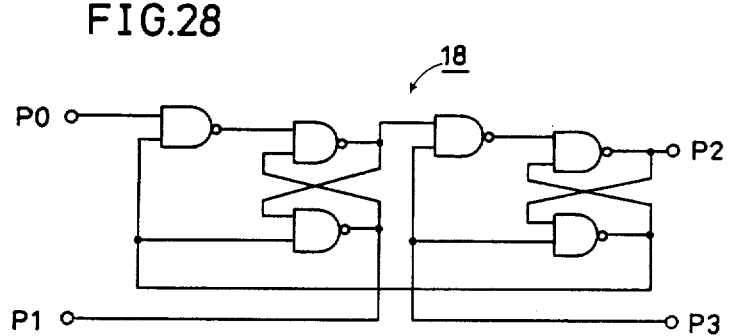
FIG. 28 is circuit diagram showing an arrangement of coincidence elements.

FIG. 27 is an illustration showing an example of a construction of a transmission line adopted in the process of accomplishing the present invention. FIG. 28 is a diagram showing an arrangement of C elements and FIGS. 29A to 29I are waveform diagrams of the data passing through the C elements.

A C element 18 of two stages as shown in FIG. 28 is connected so that 16 stages are connected in a loop as shown in FIG. 27. FIGS. 29A to 29I show waveforms of the data passing through a stage of a certain element in the case where data of one word, two words, four words, five words, six words, nine words, 12 words, 13 words and 15 words are made to circulate in the loop formed by 16 stages. The portion "H" in FIGS. 29A to 29I indicates the state in which data is transmitted in the stage of the C element concerned and the level "GND" indicates the state in which data is not transmitted. The period T in FIG. 29A indicates a cycle.

Figure 29A:
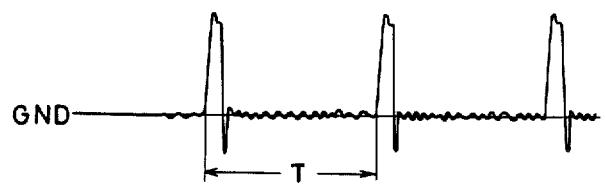
FIGS. 29A to 29I are waveform diagrams of the data passing through the coincidence elements.
Figure 29B:
Figure 29C:
Figure 29D:
Figure 29E:
Figure 29F:
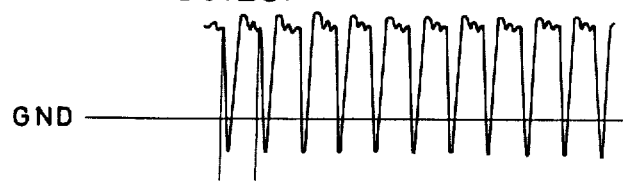
Figure 29G:
Figure 29H:
Figure 29I:
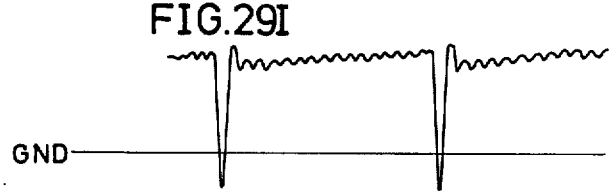

When five words of data are transmitted in the loop as shown in FIG. 29D, no empty space remains in the loop equivalently. If a word is further entered, a delay is caused in the circulation cycle as can be seen from Table 2 below. In addition, if further words continue to enter, a phenomenon which should be regarded as transmission of a hole not as transmission of words occurs from the ninth word as is clear from FIG. 29F. After the entry of the 12th word, a phenomenon of the data being held for a considerably long period occurs and accordingly the data throughput is extremely deteriorated.

Table 2 below shows in brief the results of the experiment as described above.

TABLE 2

| number of word in a loop | | word (hole) | circulation cycle | word (hole) | interval | data transmission time | word (hole) | (Unit: ns) pulse width |
|---|---|---|---|---|---|---|---|---|
| word transmission | 1 (hole 15) | word | 182.5 | word | — | 11.4 (36) | | 16 |
| | 2 (hole 14) | " | 182.5 | " | 36 | 11.4 (36) | | 16 |

TABLE 2-continued (Unit: ns)

| number of word in a loop | | word (hole) | circulation cycle | word (hole) | interval | data transmission time | word (hole) | pulse width |
|---|---|---|---|---|---|---|---|---|
| range | 3 (hole 13) | " | 182.5 | " | 38 | 11.4 (38) | | 16 |
| | 4 (hole 12) | " | 182.5 | " | 38 | 11.4 (38) | | 15 |
| | 5 (hole 11) | " | 195.0 | " | 38 | 12.2 (39) | | 16 |
| | 6 (hole 10) | " | 232.5 | " | 39 | 14.5 (38.75) | | 16 |
| | 7 (hole 9) | " | 270 | " | 39 | 16.9 (38.57) | | 16 |
| | 8 (hole 8) | " | 310 | " | 39 | 19.4 (38.75) | | 16 |
| hole | 9 (hole 7) | hole | 267.5 | hole | 40 | 21.5 (38.2) | | 9.4 |
| transmission | 10 (hole 6) | " | 232.5 | " | 41.1 | 24.2 (38.75) | | ≈9~10 |
| range | 11 (hole 5) | " | 220 | " | 42.7 | 30.3 (44) | | " |
| | 12 (hole 4) | " | 220 | " | 43.9 | 41.3 (55) | | " |
| | 13 (hole 3) | " | 225 | " | 44.4 | 60.9 (75) | | ≈9~10 |
| | 14 (hole 2) | " | 227.5 | " | 43.9 | 99.5 (113.75) | | " |
| | 15 (hole 1) | " | 227.5 | " | — | 213.3 (227.5) | | 9.7 |
| | 16 (hole 0) | | no loop | | | ∞ | | |

In Table 2, the word transmission range corresponds to a range in which the number of words in the loop is 8 or less and the hole transmission range corresponds to a range in which the number is 9 or more. Also as for the circulation cycle and the interval, those in the word transmission range are the word circulation cycle and the word interval and those in the hole transmission range are the hole circulation cycle and the hole interval. The word (hole) interval in Table 2 means the data entry interval in FIG. 29B for example. The data transmission time is the time required for one word to advance by one stage, that is, a delay time for one stage of a C element. The data transmission time is obtained as (word circulation cycle)÷(number of words) if the circulation time is determined by the word interval or as (hole circulation cycle)÷(number of holes) if the circulation time is determined by the hole interval. Till the number of words in the loop is four, the word circulation cycle is determined only by the word transmission delay. The values in parentheses indicated with the data transmission time in Table 2 indicate the data throughput, which is obtained as the transmission time for one word calculated based on the measurement of the flow amount of packet data per unit time. In other words, the data throughput indicates the period of nsec in which a word circulates once with respect to a specified stage.

From the above described experimental results, it is understood that:

(a) the data transmission time is almost fixed till the number of words in the loop is ten, and it becomes about twice as much when there are 13 words and about three to six times as much when there are 14 or 15 words;

(b) the word circulation cycle is determined only by the word transmission delay when the number of words in the loop is four or less and in this case, data is transmitted at the maximum speed;

(c) when the number of words in the loop is more than five, the word circulation cycle becomes several times as much as the word interval;

(d) when the number of words in the loop is larger than the value obtained by dividing the word circulation cycle by the word interval, words are spread in the whole loops and although the loop is not full of data yet, it appears as if the loop were in a waiting state.

Taking the above described results into consideration, it is feared that in verifying an empty state of the main data transmission line, detection of no emptiness might be made if the number of words in the loop is only five in the case of 16 stages. Regarding the data throughput, however, it cannot be said to be deteriorated with only above five words as is also clear from Table 2 and it will be still possible to enter data as far as approximately the tenth to the 13th word.

Consequently, in the above described example shown in FIG. 10, jointing of data might not be permitted, and the main data transmission line would not be effectively used in spite of the fact that a sufficient space of an empty buffer for not deteriorating the data throughput exists in the main data transmission line.

In the above described data transmission system having a jointing function as shown in FIGS. 25 and 26, data is made to be jointed to the output data transmission line 4 by the verification of the arrival of the data to be jointed at the jointing data transmission line 7. However, the packet data to be jointed is generally transmitted in a state in which the respective word data constituting the packet data are separated from each other by a predetermined number of stage and accordingly, when the first word of the packet data to be jointed attains the main data transmission line and the subsequent word of the packet data does not arrive, it might happen that control for switching between the main data transmission line and the jointing data transmission line 7 is not made for a long period, causing the flow of data in the main data transmission line to be obstructed. This problem can be solved by using a method in which jointing of data is permitted by detection of the last word of the packet data to be jointed when the last word arrives at a predetermined position in the jointing data transmission line 7. In the following, an embodiment using such method for controlling jointing of data by detecting the last word of the packet data will be described.

Figure 30:
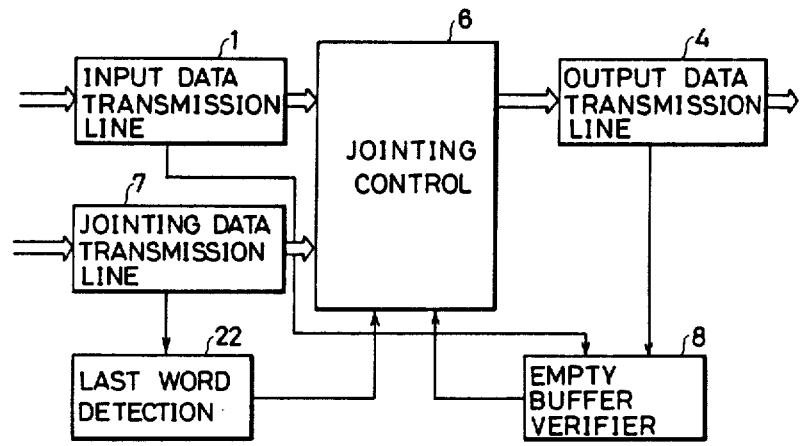
FIG. 30 is a schematic block diagram of a data transmission system comprising a last word detector and having a jointing function.

FIG. 30 is a schematic block diagram showing a data transmission system for controlling jointing of data in response to the detection of the last word of the packet data. In this example shown in FIG. 30, there is provided a last word detection circuit 222 for detecting the last word of the packet data to be jointed which is transmitted to the jointing data transmission line 7 so that the detection output of the circuit 22 is supplied to the jointing control portion 6.

Figure 31:
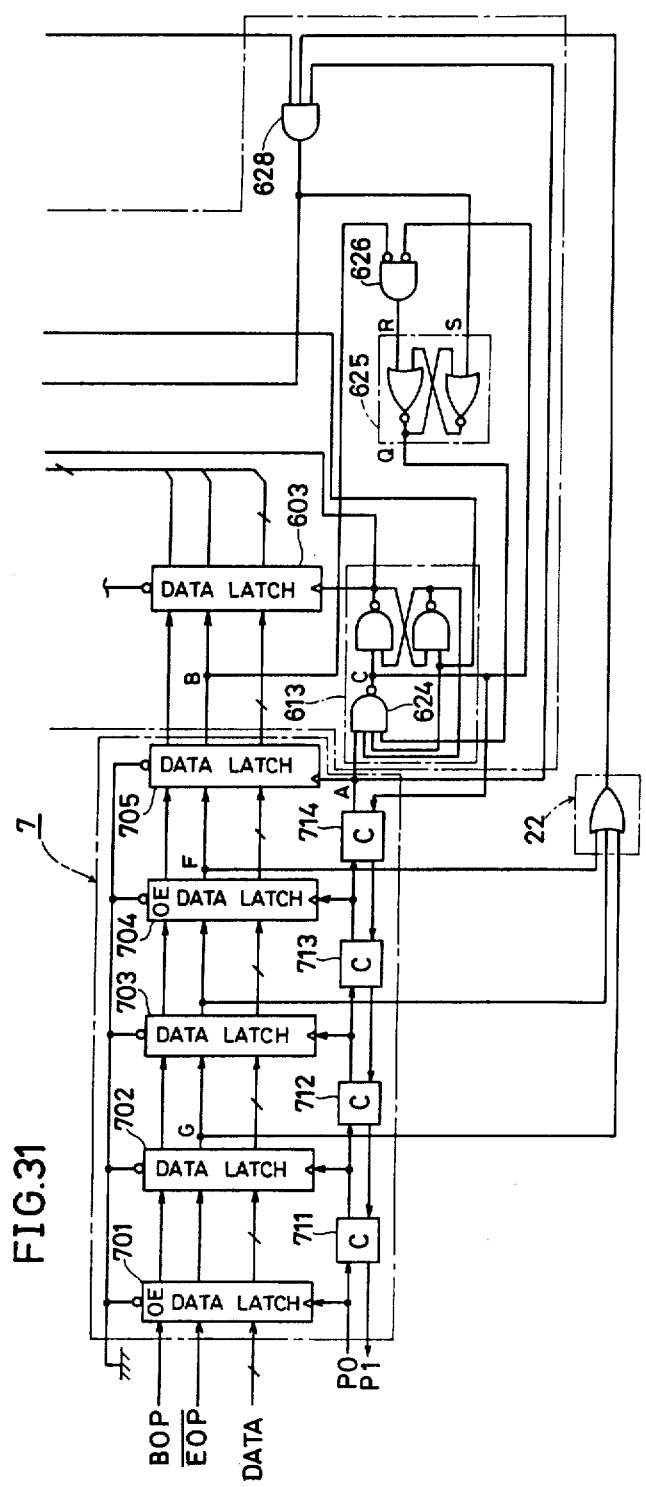
FIG. 31 is a concreate block diagram showing an essential portion of the embodiment shown in FIG. 30.

FIG. 31 is a block diagram showing an essential part of the last word detection circuit and the jointing control portion shown in FIG. 30. Referring to FIG. 31, the last word detection circuit 22 comprises a three-input OR gate 22. The inputs of the OR gate 22 are connected to the EOP outputs of the data latches 702, 703 and 704 included in the jointing data transmission line 7 respectively. In this embodiment, EOP is represented as a positive logic. The output end of the OR gate 22 is connected to the three-input AND gate 628 included in the jointing control portion 6. The construction of the other portions is the same as in the above described jointing control portion 6 shown in FIG. 10.

Now, referring to FIG. 10, 30 and 31, the operation of the above described system will be described. First, when no data exists in the main transmission line, the output of the empty buffer verifier 8 becomes "1" and when the first word of the packet data reaches the jointing data transmission line 7, the control signal P2 of the C element 714 becomes "1".

In the above described embodiment shown in FIG. 10, jointing of data is permitted immediately when the packet data to be jointed arrives, while in this embodiment shown in FIGS. 30 and 31, jointing of data is not permitted by the arrival of only the first word of the packet data to be jointed. In this embodiment, when the last word of the packet data arrives at the data latch 702 and the EOP output becomes "1", the output of the OR gate 22 also becomes "1" and as a result, all the inputs of the AND gate 628 become "1" and the output of the AND gate 628 becomes "1". In consequence, the SR flip-flop 625 is set. Since the Q output of the SR flip-flop 625 becomes "1" and the input of the four-input NAND gate 624 becomes "1", the C element 613 operates in the same manner as the other C elements. At the same time, data latch 603 is ready to provide an output and accordingly, the packet data transmitted to the jointing data transmission line 7 is jointed to the main data transmission line in a packed form. The control of the input data transmission line 1 and the operation after the completion of the jointing are the same as described above in FIG. 10.

As the position for detecting the last word of the packet data to be jointed, the data latch 702 is selected because the data being transmitted can be regarded as being almost packed if the last word arrives at that position. If the packet data to be jointed (the packet of two words) is in a completely stopped state, the last word will be detected at the stage of the date latch 704.

Although the number of words of the packet data to be jointed is two in the above described embodiment, the number is, needless to say, not limited thereto and the present invention is also applicable to packet data of three words or more.

Thus, in the above described embodiment, for jointing of data, permission is given when the arrival of the last word of the packet data at a prescribed position is detected and the existence of an empty buffer in the main data transmission line is verified. Accordingly, since the packet data is jointed in a packed state, the jointing operation can be performed at high speed and the flow of data in the main data transmission line can never be obstructed.

Figure 32:
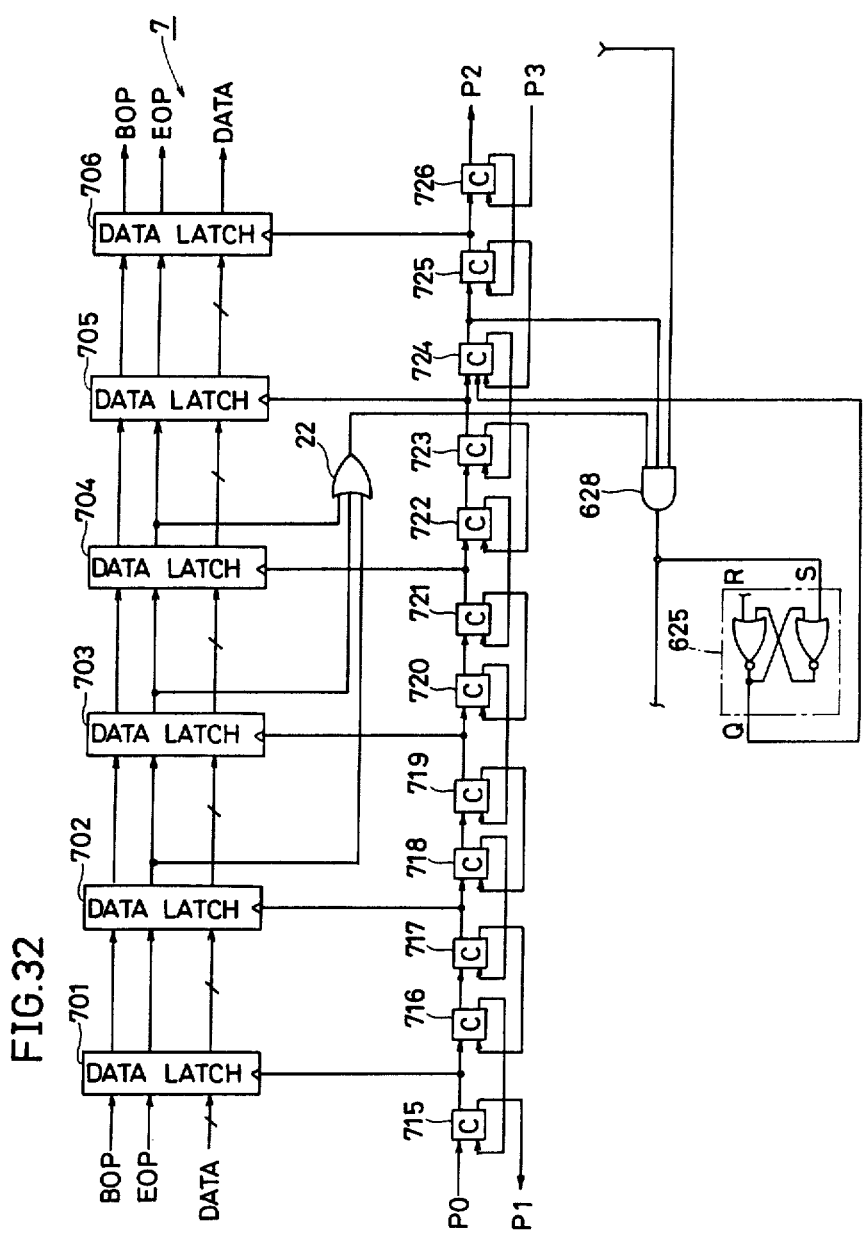
FIG. 32 is a block diagram showing another example in the embodiment shown in FIG. 30.

FIG. 32 is a circuit diagram showing an essential part of another example of the jointing portion having a last word detecting function as shown in FIG. 30. In the example shown in FIG. 32, the C elements of the jointing data transmission line 7 each comprises two stages. More specifically, corresponding to the data latches 701 to 706 respectively, C elements 715, 717, 719, 721, 723 and 725 are provided as the first stages and C elements 716, 718, 720, 722, 724 and 726 are provided as the second stages. The three-input OR gate 22 as the last word detection circuit is connected to the respective EOP outputs of the data latches 702, 703 and 704.

The above described arrangement of the C elements by two stages is effective particularly in a case, for example, in which the transfer speed of the control signal among the C elements is faster than the data transmission speed.

Figure 33:
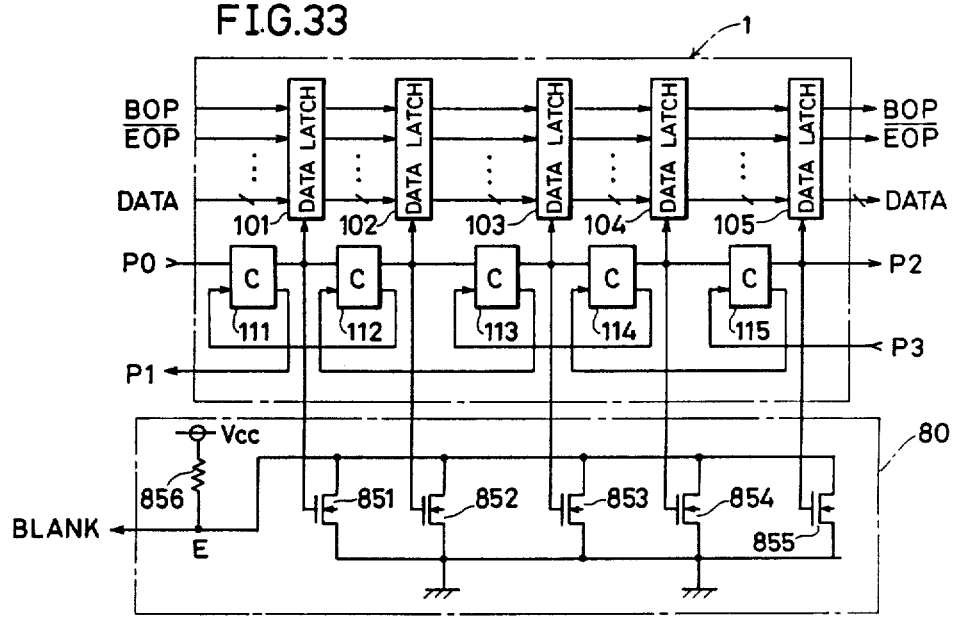
FIG. 33 is a block diagram showing another example of an empty buffer verifier.

FIG. 33 is a diagram showing another example of the empty buffer verifier. In this example shown in FIG. 33, the empty buffer verifier 80 comprises N channel MOS transistors 851 to 855 and a pull-up resistor 856. More specifically, the respective gates of the N channel MOS transistors 851 to 855 are connected to the outputs ends for the control signal P2 in the C elements 111 and 115 and the respective drains of the MOS transistors 851 to 833 are connected commonly, the pull-up resistor 856 being connected to each point of connection thereof, whereby the wired-OR output therefrom is supplied as an empty buffer detection signal.

With the above described construction, the control signals P2 of the C elements 111 to 115 are all "0" when no data is latched in the data latches 101 to 105. As a result, all the MOS transistors 851 to 855 are in a nonconductive state and consequently, the wired-OR output is at the power supply level Vcc and the empty buffer detection signal becomes "1". Thus, it can be determined that no data is latched in the data latches 101 to 105.

Figure 34:
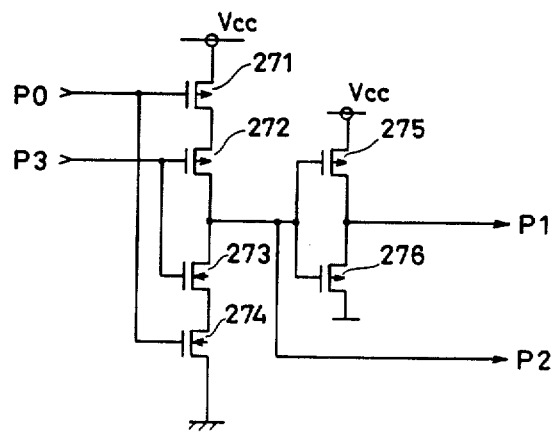
FIG. 34 is a circuit diagram of a coincidence element formed by a MOS transistor.
Figure 35:
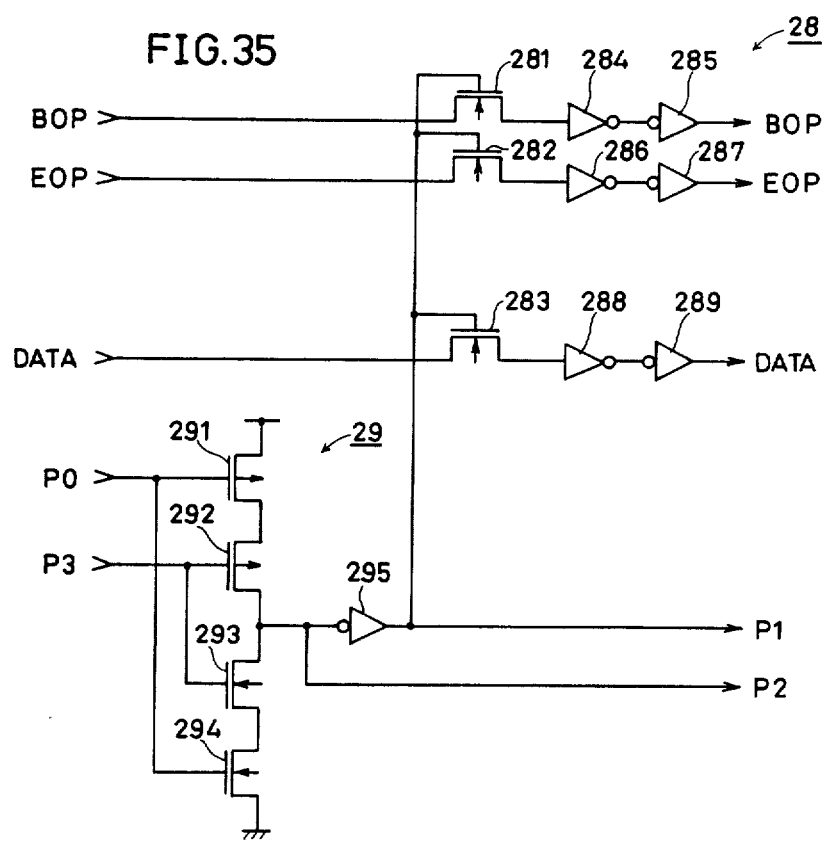
FIG. 35 is a circuit diagram showing an example of a data latch and a coincidence element formed respectively by MOS transistors.

FIG. 34 is a circuit diagram showing a C element formed by MOS transistors and FIG. 35 is a circuit diagram showing a data transmission line formed by MOS transistors.

The C element shown in FIG. 34 comprises P channel MOS transistors 271, 272 and 275 and N channel MOS transistors 273, 274 and 276, the operation thereof being that same as that of the C element shown in FIG. 7C.

The data transmission line shown in FIG. 35 comprises data latches formed by N channel MOS transistors 281 to 283, the outputs of the N channel MOS transistors 281 to 283 being connected with inverters 284 to 289 respectively. The C element 29 for latching data in the data latches comprises P channel MOS transistors 291 and 292, N channel MOS transistors 293 and 294 and an inverter 295.

Figure 36:
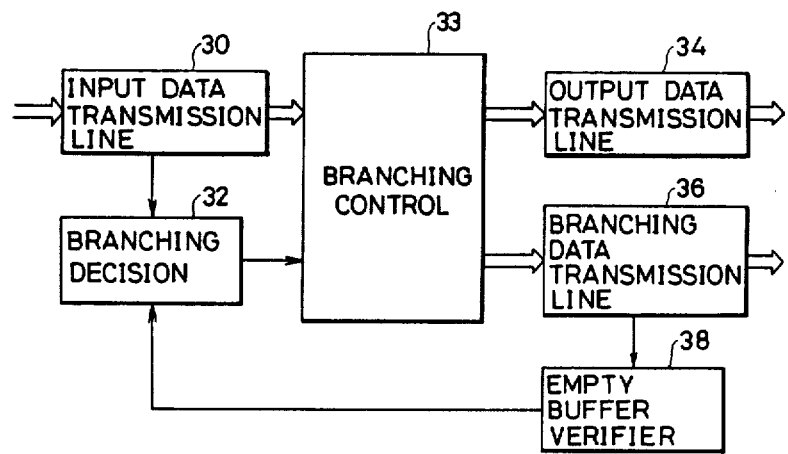
FIG. 36 is a schematic block diagram of a data transmission system having a branching function formed by the data latch and the coincidence element shown in FIG. 35.

FIG. 36 is a schematic block diagram of a data transmission system having a jointing function formed by the above described MOS transistors shown in FIG. 35 and comprising a branching decision circuit and an empty buffer verifier.

In the system shown in FIG. 36, the empty buffer verifier 38 detects nonexistence of data in the branching data transmission line 36 and the detection output is supplied to the branching decision circuit 32. When the branching decision circuit 32 receives the emptiness detection signal and detects the arrival of the data to be branched in the input data transmission line 30, data is branched by the branching control circuit 33.

Figure 37:
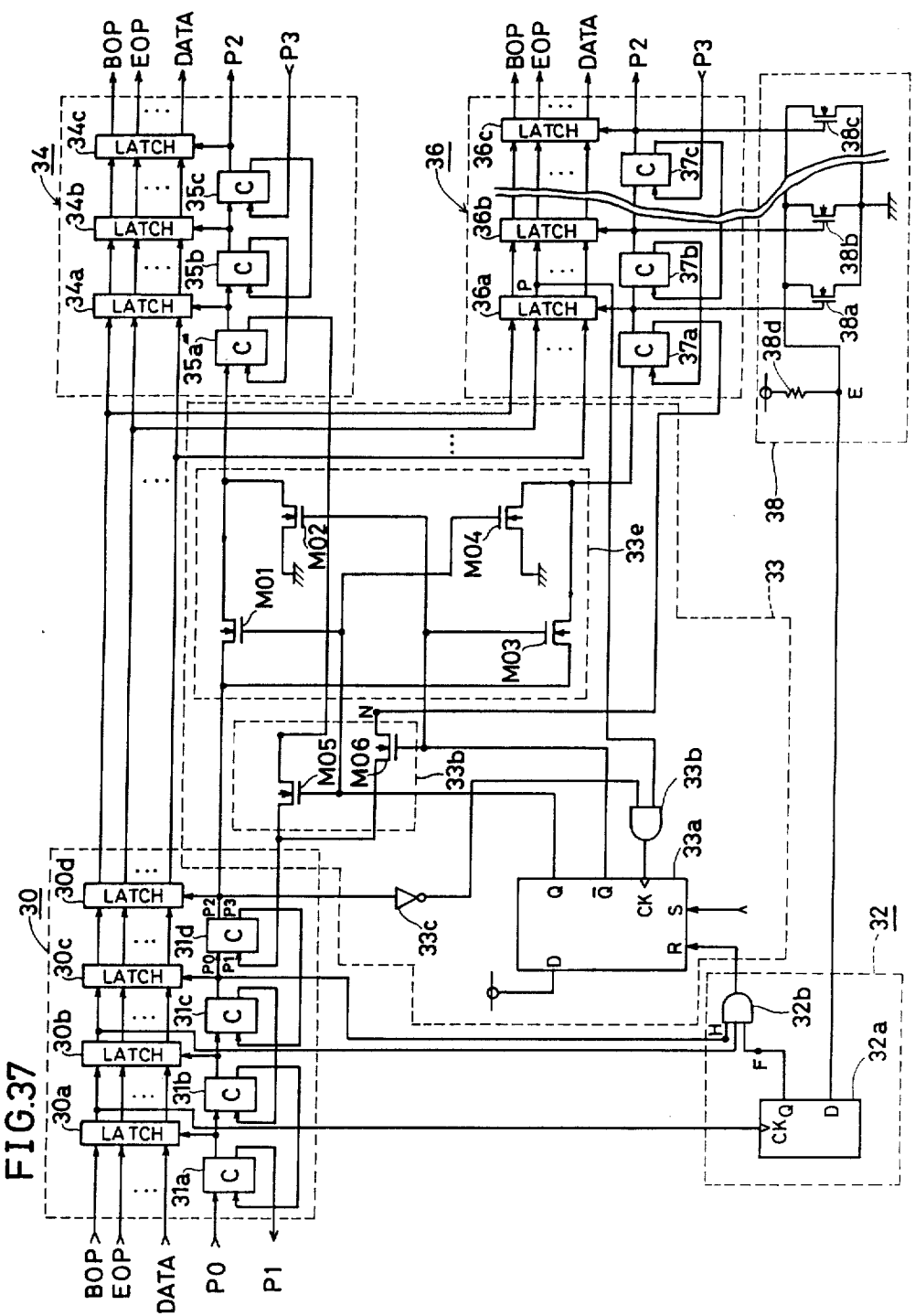
FIG. 37 is a concrete block diagram of the embodiment shown in FIG. 36.

FIG. 37 is a concrete block diagram of a data transmission system having a branching function and formed by using MOS transistors. First, the construction thereof will be described. The input data transmission line 30 comprises data latches 30a to 30d and C elements 31a to 31d. The data latches 30a to 30d and the C elements 31a to 31d re the same as shown in FIG. 35. The output data transmission line 34 comprises data latches 34a to 34c and C elements 35a to 35c, which are also the same as shown in FIG. 35. In addition, the branching data transmission line 36 comprises data latches 36a to 36c and C elements 37a to 37c, which are also the same as shown in FIG. 35.

The branching control circuit 33 comprises an SR flip-flop 33a, and AND gate 33b, an inverter 33c, a selector 33d and a multiplexer 33e. The SR flip-flop 33a stores the packet data arriving at the input data transmission line 30, based on the detection signal from the data arrival verifier 32. The selector 33d comprises MOS transistors M05 and M06 so that based on the output of the SR flip-flop 33a, either the control signal P3 from the C element 35a included in the output data transmission line 34 or the control signal P3 from the C element 37a included in the branching data transmission line 36 is supplied as the control signal P1 to the C element 31d included in the input data transmission line 30. The multiplexer 33e comprises MOS transistors M01 to M03 so that based on the output of the SR flip-flop 33a, the control signal P2 from the C element 31d of the input data transmission line 30 is supplied to the output data transmission line 34 or the branching data transmission line 36.

The input data arrival verifier 32 comprises a D-flip-flop 32a and a three-input AND gate. The empty buffer verifier 38 comprises N channel MOS transistors 38a to 38c and a pull-up resistor 38d. The respective gates of the MOS transistors 38a to 38c receive the control signals P2 from the C elements 37a to 37c included in the branching data transmission line 36. The drains of the MOS transistors 38a to 38c are connected by wired-OR connection and the pull-up resistor 38d is connected to each point of connection thereof. The wired-OR output is supplied to the D-flip-flop 32a of the input data arrival verifier 32.

Now, the operation of the data transmission system shown in FIG. 37 will be specifically described in the following. First, packet data of two words reaches the input data transmission line 30 and is latched in the data latch 30a. At this time, if no data is latched in the data latches 36a to 36c of the branching data transmission line 36, a detection signal of "1" is provided from the empty buffer verifier 38 so as to be received by the D input end of the D-flip-flop 32a of the input data arrival verifier 32. Then, with the timing for latching BOP in the data latch 30a in the input data transmission line 30, the D-flip-flop 32a latches the empty buffer detection signal. That is, at the time when the first word of the packet data arrives at the data latch 30a, permission of branching is decided.

Subsequently, when the first word of the packet data arrives at the data latch 30b, the BOP output of the data latch 30b becomes "1" and by inversion of the control signal P2 provided from the C element 31c from "0" to "1", the AND gate 32b is opened. Thus, a reset signal of "1" is supplied from the AND gate 32b to the SR flip-flop 33a. As a result, the SR flip-flop 33a set by the initialization signal is reset so that the Q output becomes "0" and the $\overline{Q}$ output becomes "1". The Q output is supplied to the gate of the N channel MOS transistor M05 of the selector and to the respective gates of the N channel MOS transistors M01 to M04 of the multiplexer 33e.

The $\overline{Q}$ output of the SR flip-flop 33a is supplied to the gate of the N channel MOS transistor M06 of the selector 33d and to the respective gates of the N channel MOS transistors M02 and M03 of the multiplexer 33e. Since the $\overline{Q}$ of the SR flip-flop 33a is "1", the MOS transistors M06, M02 and M03 are conducted so that the control signal P2 provided from the C element 31d of the input data transmission line 30 is supplied to the C element 37a of the branching data transmission line 36 and the input end of the control signal P0 of the C element 35a in the output data transmission line 34 is grounded. As a result, the input data transmission line 30 is disconnected from the output data transmission line 34 and connected to the branching data transmission line 36. In consequence, the packet data transmitted on the input data transmission line 30 is successively branched to the branching data transmission line 36.

When the packet data is transmitted to the branching data transmission line 36, the empty buffer verifier 38 provides a detection signal of "0". Then, when the last word of packet data arrives at the branching data transmission line 36 and is latched in the data latch 36a, the EOP bit output of the data latch 36a becomes "1" and the control signal P2 of the C element 31d in the last stage of the input data transmission line 30 becomes "0", whereby the AND gate 33b is opened. As a result, a clock signal is supplied to the SR flip-flop 33a so that the Q output of the SR flip-flop 33a changes from "0" to "1" and the $\overline{Q}$ output thereof changes from "1" to "0". Thus, as the Q output and the $\overline{Q}$ output of the SR flip-flop 33a are inverted respectively, the selector 33d and the multiplexer 33e disconnect the branching data transmission line 36 from the input data transmission line 30 and connect again the output data transmission line 34 to the input data transmission line 30. As a result, the packet data transmitted to the input data transmission line 30 is transmitted again to the output data transmission line 34.

Figure 38:
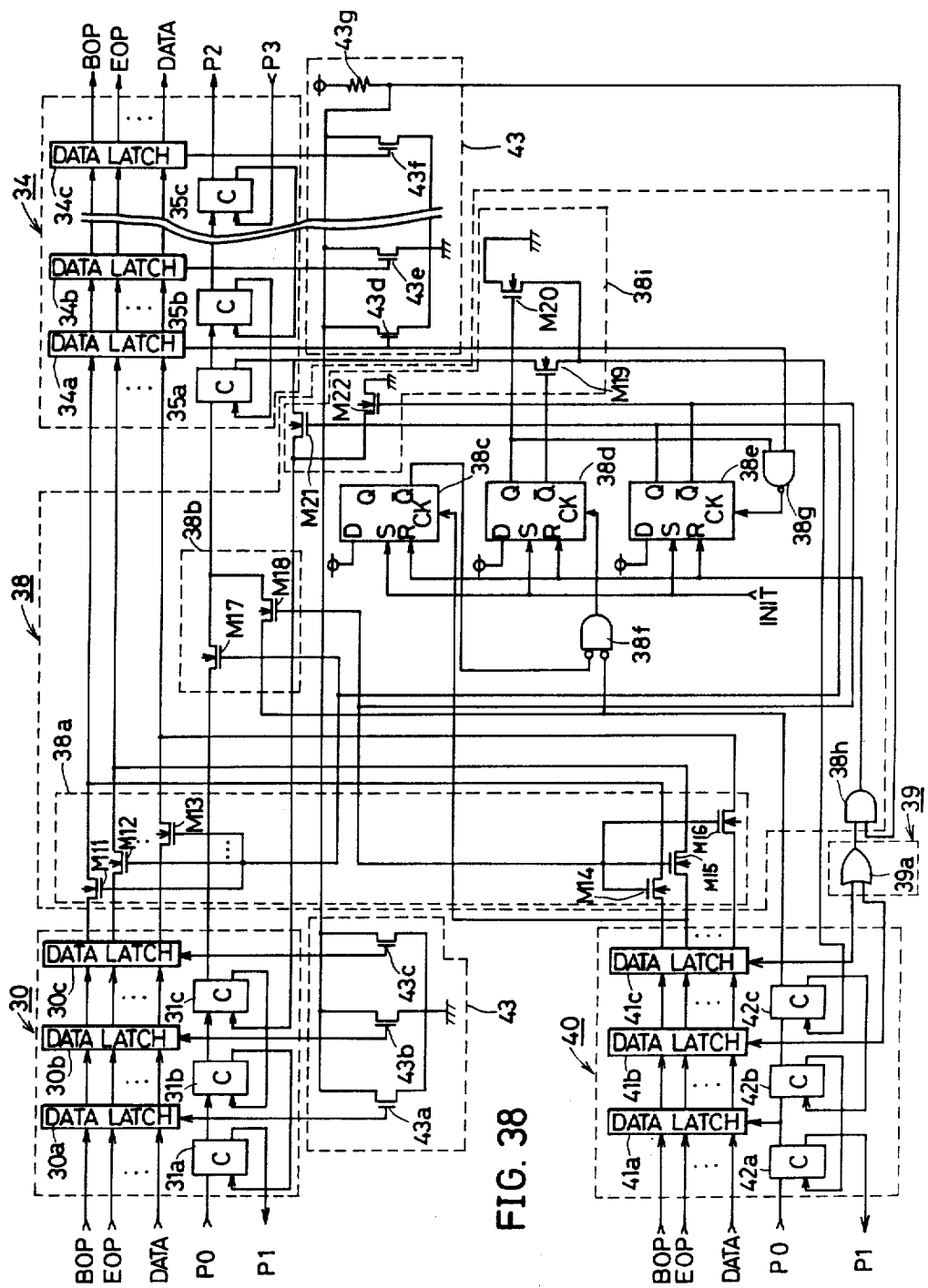
FIG. 38 is a concrete block diagram of a data transmission system having a jointing function formed by MOS transistors.

FIG. 38 is a concrete block diagram showing an example of a data transmission system having a jointing function formed by using MOS transistors. First, the construction thereof will be described. The input data transmission line 30 and the output data transmission line 34 are formed by asynchronous free-running shift registers in the same manner as described above with reference to FIG. 37. It is to be noted however that data is not latched in the data latches 30a to 30c and 34a to 34c of the input data transmission line 30 and the output data transmission line 34 respectively and there is provided an empty buffer verifier 43 for detecting an empty buffer. The empty buffer verifier 43 comprises MOS transistors 43a to 43f and a pull-up resistor 43g.

More specifically, the respective gates of the MOS transistors 43a of 43f receive the control signals P2 from the C elements 31a to 31c included in the input data transmission line 30 and from the C elements 35a to 35c included in the output data transmission line 34. The drains of the MOS transistors 43a to 43f are connected by wired-OR connection and to each point of connection, the pull-up resistor 43g is connected. The wired-OR output is supplied to the AND gate 38h included in the jointing control portion 38.

The jointing data transmission line 40 comprises data latches 41a to 41c and 42a to 42c. The jointing data transmission line 40 is also formed by using MOS transistors as shown in FIG. 35 in the same manner as in the input data transmission line 30 and the output data transmission line 34. In association with the jointing data transmission line 40, a jointing data arrival verifier 39 is provided. The jointing data arrival verifier 39 comprises a two-input OR gate 39a. The respective inputs of the two-input OR gate 39a receive the control signals P2 from the C elements 42b and 42c included in the jointing data transmission line 40. The output of the OR gate 39a is supplied to the other input end of the above described two-input AND gate 38h.

The jointing control portion 38 comprises selectors 38a and 38b, SR flip-flop 38c to 38e, a gate circuit 38f, a NAND gate 38g and the above described AND gate 38h and multiplexer 38i. The selector 38a selects either the packet data transmitted from the input data transmission line 30 or the packet data transmitted from the jointing data transmission line 40 and supplies the selected packet data to the outout data transmission line 34. For this purpose, the selector 38a comprises N channel MOS transistors M11 to M16. The selector 36b selects either the C element 31a of the input data transmission line 30 or the C element 42c of the jointing data transmission line 40 to connect the selected element to the C element 35a of the output data transmission line 34. For this purpose, the selector 38b comprises two N channel MOS transistors M17 and M18.

The SR flip-flop 38c stores the arrival of the jointing data at the jointing data transmission line 40. The SR flip-flop 38d stores the output of the last word of the packet data from the jointing data transmission line 40. The SR flip-flop 38e stores the latching of the last word of the data in the data latch 34a of the output data transmission line 34. The multiplexer 38i comprises MOS transistors M19 to M22 and connects the C elements 42c of the input data transmission line 40 to the C element 35a of the output data transmission line 34 when the last word of the packet data to be jointed is latched in the data latch 41c of the jointing data transmission line.

In the following, the operation of the above described data transmission system will be described. In the initial state, the SR flip-flop 38c to 38e are set by an initialization signal. By the setting of the SR flip-flop 38e, the Q output thereof becomes "1" so that the MOS transistors M11 to M13 of the selector 38e and the MOS transistor M17 in the selector 38b are conductive. On the other hand, the $\bar{Q}$ output of the SR flip-flop 38e becomes "0" so that the MOS transistors M14 to M16 of the selector 38a and the MOS transistor M18 of the selector 38b are brought into a non-conductive state. As a result, the input data transmission line 30 is in a state connected to the output data transmission line 34 so that the data transmitted to the input data transmission line 30 is transmitted to the output data transmission line 34.

When there is no data in the input data transmission line 30 and in the output data transmission line 34, the MOS transistors 43a to 43f of the empty buffer verifier 43 are respectively brought into a non-conductive state so that the detection signal changes to "1" and is supplied to one input end of the the AND gate 38h. In this state, when the packet data to be jointed arrives at the jointing data transmission line 40, the jointing data arrival verifier 39 detects the arrival and supplies the detection signal of "1" to the other input end of the AND gate 38h. As a result, the output of the AND gate 38h becomes "1" so that the SR flip-flops 38c to 38e are reset.

By the resetting of the SR flip-flop 38e, the Q output thereof becomes "0" and the $\bar{Q}$ output thereof become "1". As a result, the MOS transistors M11 to M13 of the selector 38a are not conductive and the MOS transistors M14 to M16 are conductive. At the same time, the MOS transistor M17 of the selector 38b is not conductive and the MOS transistor M18 is conductive. In consequence, the input data transmission line 30 is disconnected from the output data transmission line 34 and the jointing data transmission line 40 is connected to the output data transmission line 34. Thus, the packet data arriving at the jointing data transmission line 40 is jointed to the output data transmission line 34. When the last word of the jointing packet data is latched in the data latch 41c in the last stage of the jointing data transmission line 40, the EOP bit becomes "1" and the SR flip-flop 38c is set. Accordingly, the SR flip-flop 38c stores the arrival of the last word of the jointing data at the jointing transmission line 30.

When the $\bar{Q}$ output of the SR flip-flop 38c becomes "0" and the control signal P2 at the output of the C element 42c of the jointing data transmission line 40 becomes "0", the second SR flip-flop 38d is set. Thus, the second SR flip-flop 38d stores the output of the last word of the packet data from the jointing data transmission line 40.

In addition, when the second SR flip-flop 38d is set, the MOS transistors M20 included in the multiplexer 38i is conductive and the MOS transistor M19 is not conductive. As a result, the C element 42c of the jointing data transmission line 40 is disconnected from the C element 35a of the output data transmission line 34 and even if the subsequent packet data to be jointed arrives continuously, this packet data can be prevented from being jointed to the output data transmission line 34.

As described above, the last word of the packet data provided from the jointing data transmission line 40 is latched in the data latch 34a of the output data transmission line 34. Then, when the control signal P2 of the C element 35a of the output data transmission line 34 changes from "1" to "0", the NAND gate 38g is opened and the third flip-flop 38b is set. Thus, the third flip-flop 38e stores the transmission of the last word of the packet data to the output data transmission line 34. When the third SR flip-flop 38e is set, the MOS transistor M21 of the multiplexer 38i is conductive and the MOS transistor M22 is not conductive. At the same time, the MOS transistors M11 to M13 of the selector 38a are conductive, while the MOS transistors M14 to M16 are not conductive. In addition, the MOS transistor M17 of the selector 38b is conductive and the MOS transistor M18 is not conductive. In consequence, the jointing data transmission line 40 is disconnected from the output data transmission line 34 and the input data transmisson line 30 is connected again to the output data transmission line 34.

Figure 39:
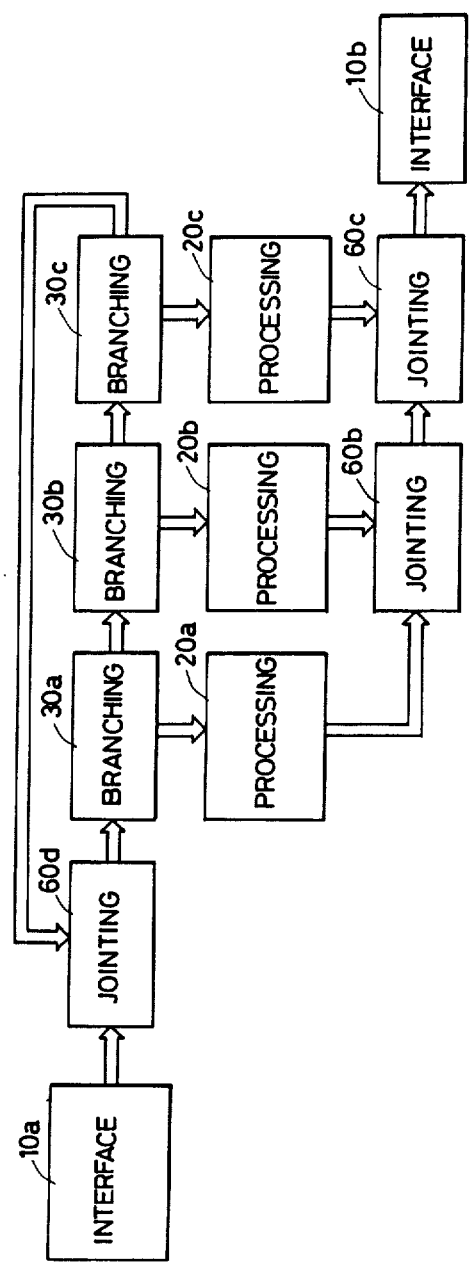
FIG. 39 is a block diagram showing another example of a data processing unit formed by using a data transmission system in accordance with the present invention.

FIG. 39 is a diagram showing an example of a network system formed by branching portions and jointing portions using the above described MOS transistors shown in FIGS. 36 to 38. In the network system shown in FIG. 39, a jointing portion 60a and branching portions 30a to 30c constitute a ring-like data transmission line. Thus, the packet data entered from the exterior through an interface 10a is transmitted successively in the ring-like transmission line including the jointing portion 60a and the branching portions 30a to 30c. The data branched by the branching portion 30a is processed by a processing portion 20a, the data branched by the branching portion 30b is processed by a processing portion 20b and the data branched by the processing portion 30c is processed by a processing portion 20c. Then, the data processed by the processing portion 20a and the data processed by the processing portion 20b are jointed by a jointing portion 60b and the data processed by the processing portion 20c is further jointed by a jointing portion 60c, so that the jointed data is provided to the exterior through an interface 10b.

As described above, using the branching portions 30a to 30c and the jointing portions 60a to 60c which are capable of branching and jointing data as required, a network system having extensive flexibility can be obtained.

Figure 40:
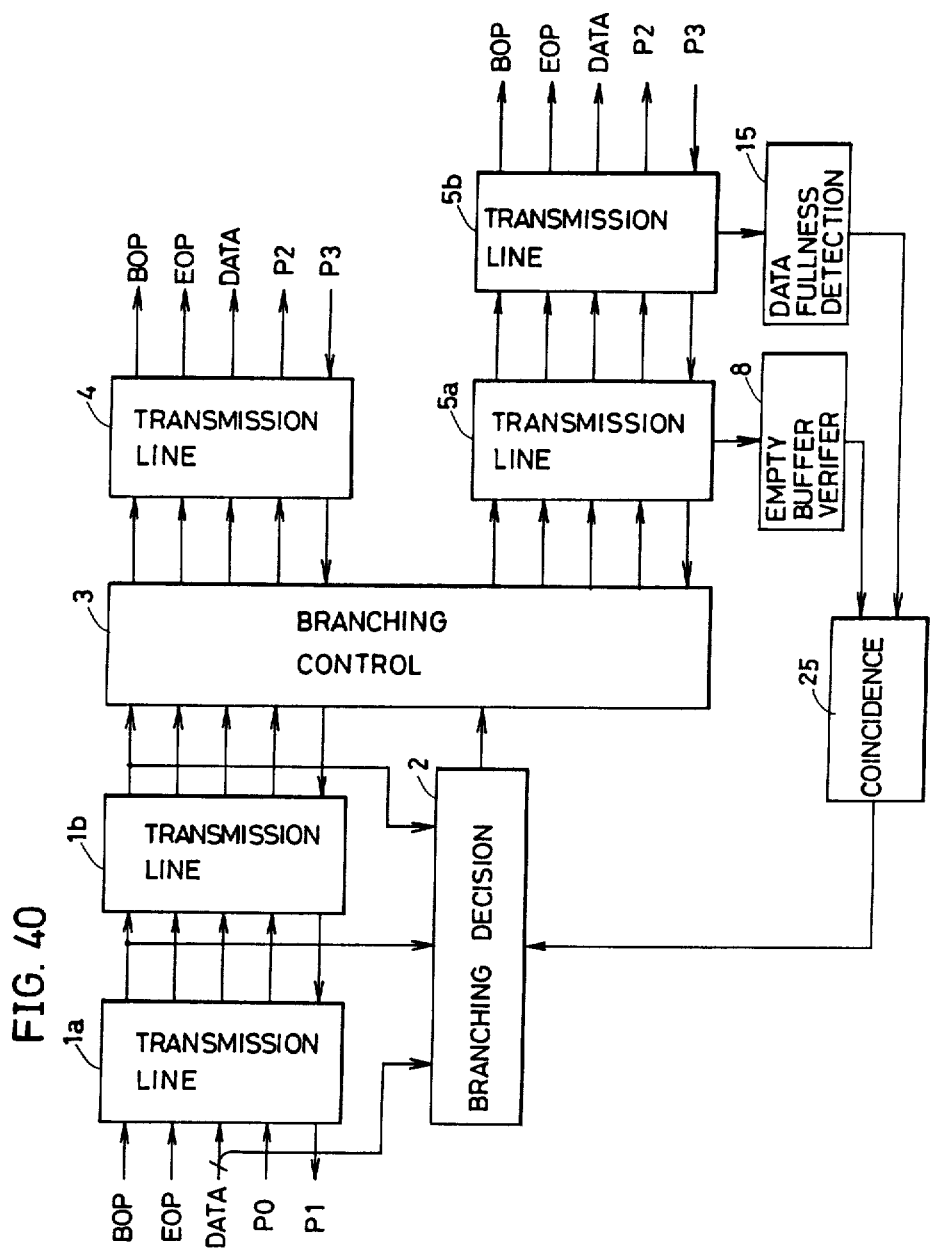
FIG. 40 is a schematic block diagram of a data transmission system having a branching decision function and comprising an empty buffer verifier and a data fullness detector.

FIG. 40 is a schematic block diagram of a data transmission system comprising a branching decision circuit, an empty buffer verifier and a data fullness detection circuit. The data transmission system shown in FIG. 40 comprises input data transmission lines 1a and 1b, a branching decision circuit 2, a branching control portion 3, an output data transmission line 4, branching data transmission lines 5a and 5b, an empty buffer verifier 8, a data fullness detection circuit 15 and a coincidence circuit 25. The input data transmission line 1a is formed in the same manner as the above described input data transmission line 9 shown in FIG. 14 and the input data transmission line 1b, the branching control portion 3, the output data transmission line 4 and the branching data transmission lines 5a and 5b are the same as shown in FIG. 8.

The branching decision circuit 2 is the same as shown in FIG. 20; the empty buffer verifier 8 is the same as shown in FIG. 10; and the data fullness detection circuit 15 is the same as shown in FIG. 20. A coincidence in the outputs of the empty buffer verifier 8 and the data fullness detection circuit 15 is obtained in the coincidence circuit 25 and the coincidence signal is supplied to the branching decision circuit 2. The coincidence circuit 25 is formed by using an EXOR gate for example.

Now, the operation of the data transmission system shown in FIG. 40 will be briefly described. When packet data is transmitted to the input data transmission line 1a, decision of branching is made in the same manner as described previously in connection with FIG. 8. At the same time, in the branching data transmission lines 5a and 5b, an empty state and a data fullness state are detected by the empty buffer verifier 8 and the data fullness detection circuit 15, respectively, so that the detection signals are supplied to the coincidence circuit 25. Upon detection of nonexistence of data in the branching data transmission line 5a by the empty buffer verifier 8 and no fullness of data in the branching data transmission line 5b by the data fullness detection circuit 15, the coincidence circuit 25 provides a coincidence signal to the branching decision circuit 2.

When the branching decision circuit 2 decides that the data transmitted to the input data transmission lines 1a and 1b is data to be branched and it receives the coincidence signal from the coincidence circuit 25, it provides a branching permission signal to the branching control circuit 3. Upon receipt of the branching permission signal, the branching control circuit 3 branches the data transmitted to the input data transmission lines 1a and 1b to the branching data transmission lines 5a and 5b.

Figure 41:
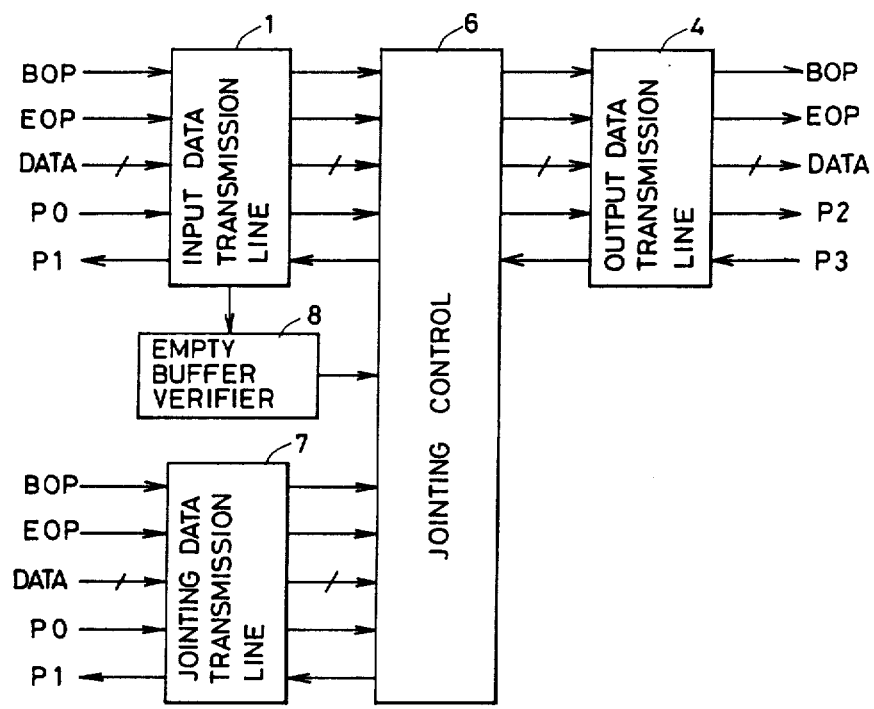
FIG. 41 is a schematic block diagram showing another example of a data transmission system having a jointing function.

FIG. 41 is a schematic block diagram showing another example of a data transmission system having a jointing function.

The previously described data transmission system having a jointing function shown in FIG. 9 joints data upon detection of nonexistence of data in both the input data transmission line 1 and the output data transmission line 4. On the other hand, in the example shown in FIG. 41, the empty buffer verifier 8 verifies only the empty state of the input data transmission line 1 as the succeeding portion of the jointing control portion 6, and when an empty buffer of a predetermined number of words is verified in the input data transmission line 1, jointing of data is permitted regardless of the state of the output data transmission line 4. This is based on the condition that the data transmitted to the input data transmission line 1 is sent to the output data transmisson line 4 without interruption. Thus, the empty buffer of only the input data transmission line 1 is verified, whereby the circuit construction can be made simple as compared with the previously stated example shown in FIG. 9.

Figure 42:
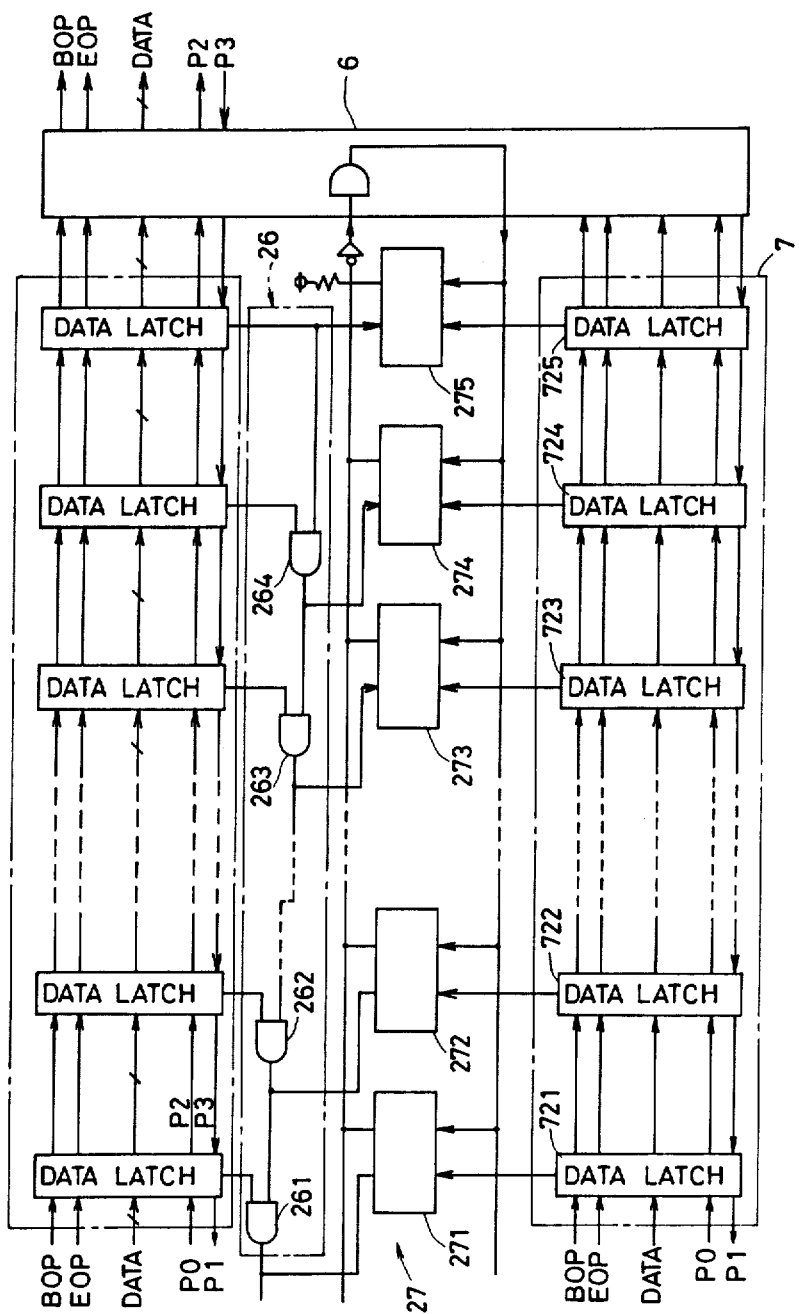
FIG. 42 is a concrete block diagram showing another example of a data transmission system having a jointing function.

FIG. 42 is a block diagram showing an essential part of another example of a data transmission system having a jointing function. In the previously described data transmission system having a jointing function shown in FIG. 30, data is jointed upon detection of the last word of the packet data to be jointed arriving at the jointing data transmission line 7. However, if jointing of data is completed by the passage of a period from the arrival of the first word to the arrival of the last word, the first word has advanced by the number of stages corresponding to that period and accordingly, the buffer function of the main data transmission line is occupied for a long time by the data of one packet, causing the buffer capacity of the main data transmission line to be substantially decreased.

Therefore, the embodiment shown in FIG. 42 is adapted so that the packet data having a variable length of words can be jointed rapidly without obstructing the flow of data in the main data transmission line.

First, referring to FIG. 42, the construction thereof will be described. The input data transmission line 1 is the same as shown in FIG. 10 and the respective transmission lines are formed by asynchronous free-running shift registers. Similarly, the jointing data transmission line 7 is the same as shown in FIG. 10 and the transmisson lines 721 to 725 are formed by asynchronous free-running shift registers. In association with the input data transmission line 1, an empty buffer verifier 26 is provided. The empty buffer verifier 26 verifies an empty state of the input data transmission line 1 and provides an empty buffer detection signal. The empty buffer verifier 26 comprises two-input AND gates 261 to 264. To one input end of each of the AND gates 261 to 264, a signal obtained by inversion of the control signal P2 provided from the C elements of the respective transmission lines is supplied and to each other input end, an output signal of the AND gate in the succeeding state is supplied.

By thus forming the empty buffer verifier 26, a length of an empty space in the transmission line, that is, the number of empty buffer stages is detected. Jointing permission control circuits 271 to 275 are provided corresponding to the respective transmission lines in the input data transmission line 1 and the jointing data transmission line 7. The jointing permission control circuits 271 to 275 comprise trap setting means and jointing permission signal generating means. The trap setting means sets a trap according to the packet length of the packet data to be jointed. The jointing permission signal generating means detects the last word of the packet by the trap thus set and supplies a jointing permission signal to the jointing control circuit 6 upon receipt of an empty buffer detection signal from the empty buffer verifier 26. Instead of the above described two-input AND gate 627 shown in FIG. 10, a three-input AND gate 627 is provided and one of the input ends thereof receives the jointing permission signal. The output of the AND gate 627 is supplied as a jointing decision signal to the respective jointing permission control circuits 271 to 275.

Figure 43:
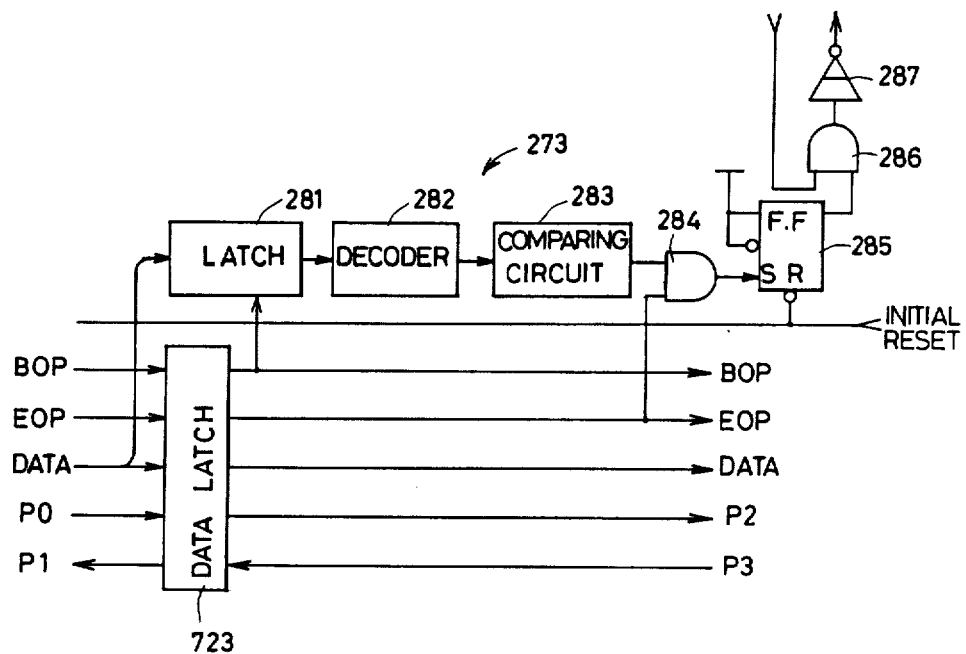
FIG. 43 is a concrete block diagram of the jointing permission control circuit shown in FIG. 42.

FIG. 43 is a concrete block diagram of a jointing permission control circuit shown in FIG. 42. In the following, the construction of the jointing permission control circuit will be described. Although the jointing permission control circuits 271 to 275 are formed in the same manner, FIG. 43 shows only the jointing permission control circuit 273 as an example. The jointing permission control circuit 273 comprises a latch 281, a decoder 282, a comparing circuit 283, AND gate 284 and 286, an SR flip-flop 285 and an open collector type inverter 287. A trap is set by the latch 281, the decoder 282 and the comparing circuit 283 and a jointing permission signal is generated by the AND gates 284 and 286, the SR flip-flop 285 and the open collector type inverter 287. The output of the inverter 287 is connected by wired-OR connection with the inverter outputs of the other jointing permission control circuits 272 to 275 and an inverted signal thereof is received by the AND gate 627 of the jointing control circuit 6.

Now, referring to FIGS. 42 and 43, the operation till the issue of the permission for jointing will be described in more detail. It is assumed that in a predetermined bit field in the first word of the packet data, data indicating the number of words of the packet data is inserted. When the packet data is transmitted to the jointing data transmission line 7 and the first word thereof arrives at the stage of the transmission line 723 for example, the BOP output of this stage changes from "0" to "1". Accordingly, the data in the first word indicating the number of words of the packet data is latched in the latch 281. The latched data is decoded by the decoder 282 and supplied to the comparing circuit 283. In the comparing circuit 283, data for comparison is preset. This data for comparison and the above described data indicating the number of words are compared and if these data are coincident, a coincidence signal of "1" is provided so that a trap is set in this stage.

Thus, in this example, a trap is set in the jointing permission control circuit 273 shown in FIG. 42. In this state, if the output of the AND gate 263 becomes "1", that is, if an empty space corresponding to the jointing permission control circuit 273 set by the trap is detected, jointing of data is not permitted.

Then, when the last word of the packet data arrives at the stage of the transmission line 273, the EOP output changes from "0" to "1". As a result, the two inputs of the AND gate 284 becomes "1" and the output thereof also becomes "1", whereby the SR flip-flop 285 is set. In this state, if an empty buffer corresponding to the number of stages of the three transmission lines 723 to 725 exists in the main data transmission line, a jointing permission signal of "0" is provided through the AND gate 286 and the inverter 287. The output obtained by inversion of this signal is applied to the AND gate 627 of the jointing control circuit 6, so that jointing control operation is performed in the same manner as described previously in connection with FIG. 10.

When jointing of data starts, a jointing decision signal from the jointing control circuit 6, that is, the inverted signals of the output of the AND gate 627 is supplied to the respective jointing permission control circuits 271 to 275, whereby the Sr flip-flop 285 of the jointing permission control circuit 273 is reset.

As described above, in this embodiment, jointing of data is permitted only when the arrival of the last word of the packet data at a predetermined position is detected and existence of an empty space corresponding to the position of the last word, that is, the packet length is verified in the main data transmission line. As a result, the packet data is jointed in a packed state and thus, jointing can be performed rapidly and the flow of data in the main data transmission line can be prevented from being obstructed.

In addition, in this embodiment, a trap is set for the smallest number of words in a position corresponding to the content of the first word when the first word of the packet data passes through the jointing data transmission line 7. Accordingly, packet data having a variable length of words can be jointed in the same manner as described above with each packet data being a packed state.

Although in the above described embodiment, the number of stages in the jointing data transmission line 7 and that in the input data transmission line 1 of the main line are set with a relation of 1 to 1, it is not necessarily needed to set the numbers in such a manner. Considering that the packet in the jointing line is packed and that the packet data in the main line is transmitted with a considerably large spacing being kept between the respective words, the number of stages in the jointing line and that in the main line may be set with a relation of 1 to 2 for example.

Figure 44:
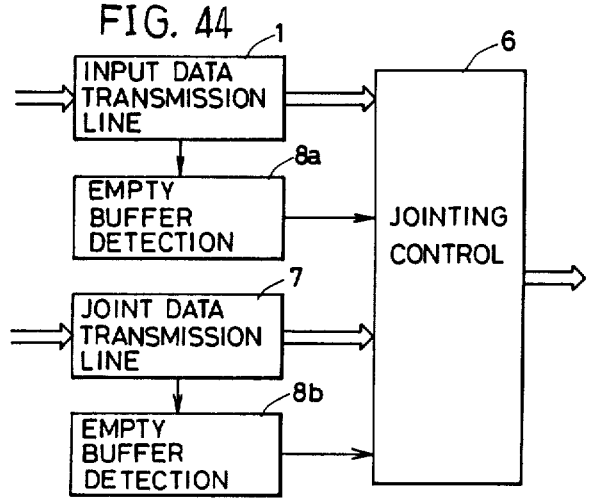
FIG. 44 is a schematic block diagram showing another example of a data transmission system having a jointing function.

FIG. 44 is a schematic block diagram showing another example of a data transmission system having a jointing function. In the above described respective data transmission system having a jointing function shown in FIGS. 9, 21, 25, 30 and 42, the input data transmission line 1 serving as the main line is selected preferentially out of the two input data transmission lines, so that the packet data from the jointing data transmission line 7 is jointed only when there is no data in the input data transmission line 1. However, if a preferential order cannot be given to the two input data transmission lines, jointing of the data from the jointing data transmission line 7 will not be started a long while if the density of the data flow in the main data transmission line is large. As a result, the flow of data in the jointing data transmission line 7 is stopped to worsen the balance of processing in the entire system. Moreover, since the necessary data does not flow, there is a fear of causing a system deadlock. For the purpose of solving those problems, the embodiment shown in FIGS. 44 joints alternately the packet data transmitted on the input data transmission line 1 and the packet data transmitted on the jointing data transmission line 7.

Therefore, in this embodiment, an empty buffer verifier 8a is provided corresponding to the input data transmission line 1 and an empty buffer verifier 8b is provided corresponding to the jointing data transmission line 7.

Figure 45:
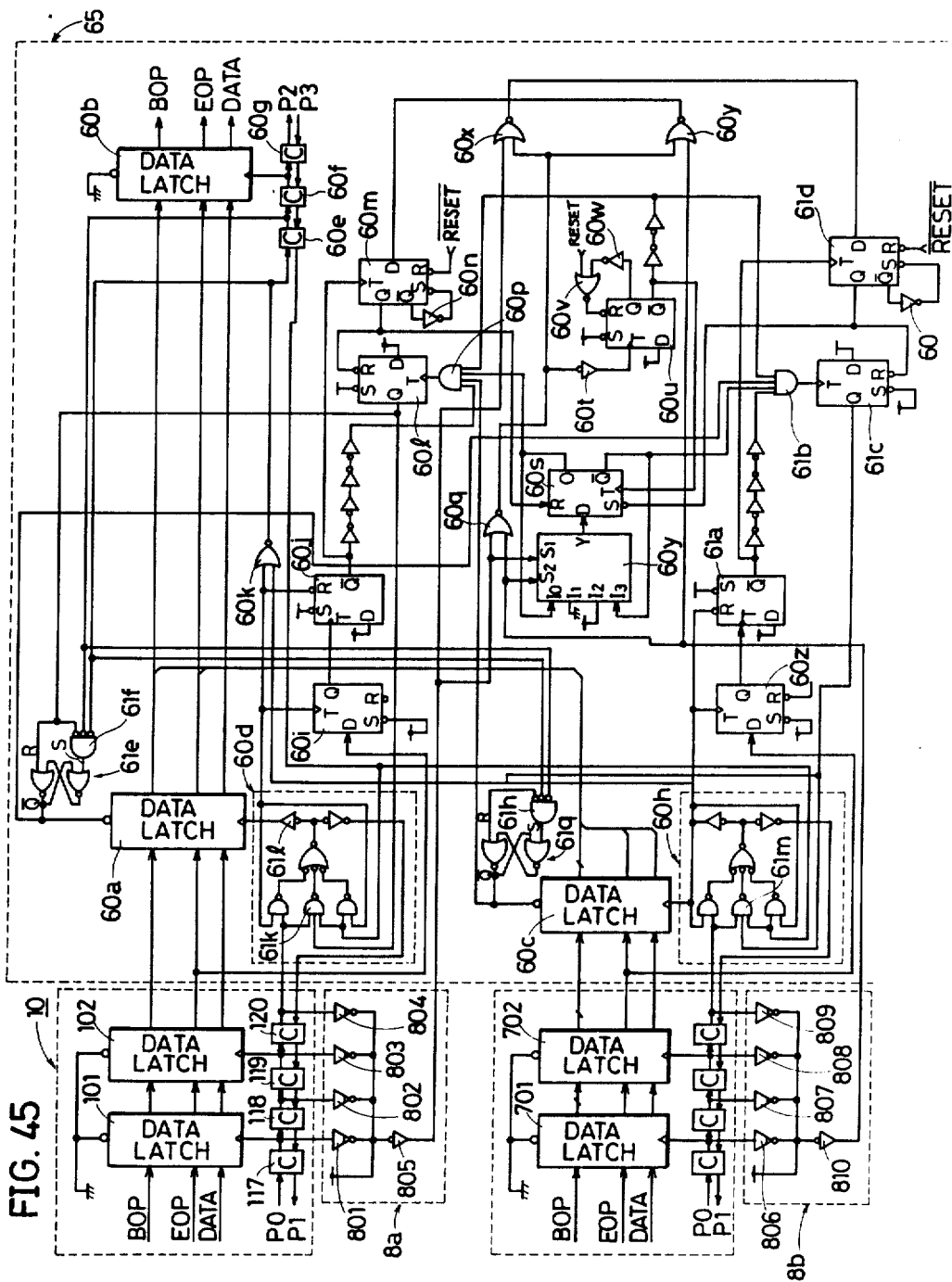
FIG. 45 is a concrete block diagram of the embodiment shown in FIG. 44.

FIG. 45 is a block diagram showing a specific construction of the embodiment shown in FIG. 44.

Now, referring to FIG. 45, the construction will be described. The input data transmission line 1 comprises data latches 101 and 102 and C elements 117 to 120 in the same manner as in the above described embodiments. These C elements 117 to 120 are each formed by two stages, that is, the first stage and the second stage. The empty buffer verifier 8a comprises open collector type inverters 801 to 804, the respective inputs thereof receiving the control signals P2 from the C elements 117 to 120. The outputs of the inverters 801 to 804 are connected by wired-OR connection and are led to the jointing control portion 65 through the inverter 805.

The jointing data transmission line 7 comprises data latches 701 and 702 and C elements 715 to 718 in the same manner as in the input transmission line 1. The empty buffer verifier 8b comprises open collector type inverters 806 to 809, the respective inputs thereof receiving the control signals P2 from the C elements 715 to 718. The outputs of these inverters 806 to 809 are connected by wired-OR connection and led to the jointing control portion 65 through the inverter 810.

The jointing control portion 65 mainly comprises data latches 60a to 60c, C elements 60d to 60h, a selector 60r, D-flip-flop 60i, 60l, 60j, 60m, 60s, 60u, 70z, 61a, 61c and 61d and SR flip-flops 61e and 61g etc.

Now, referring to FIGS. 44 and 45, a more specific construction as well as the operation will be described. First, when no data exists in both the input data transmission line 10 and the jointing data transmission line 70, packet data arrives at the input data transmission line 10 and the packet data is transmitted to the output data transmission line 4. In this case, the empty buffer verifiers 8a and 8b detect respectively an empty buffer, so that the wired-OR output becomes "1". The wired-OR output is inverted by the inverters 805 and 810 so as to be applied to the two-input NOR gate 60q. The NOR gate 60q provides an output of "1".

At this time, when the packet data arrives at the input data transmission line 10, the empty buffer verifier 8a provides a detection output of "1" and the NOR gate 60q provides an output of "0". This output of the NOR gate 60q is supplied and inverted in the inverter 60t so that the signal of "1" is supplied to the D-flip-flop 60u as a trigger signal. As a result, the $\overline{Q}$ output of the D-flip-flop 60u becomes "0". Since the Q output of the D-flip-flop 60u is supplied to the reset input end of this D-flip-flop through the inverter 60w and the gate 60v, the $\overline{Q}$ output returns to "1" after a lapse of a predetermined time. Accordingly, from the $\overline{Q}$ output of the D-flip-flop 60u, a one-shot pulse of "0" is provided.

On the other hand, since the detection signal of the empty buffer verifier 8a is "1" and the detection signal of the empty buffer verifier 8b is "1" at the selection inputs S0 and S1 of the four-input selector 60r respectively, the four-input selector 60r selects the input I₂ set to "1" and provides the output from the output end Y. The output end Y is connected to the D input of the D-flip-flop 60s. To the input end T, the one-shot pulse of "0" is supplied from the above stated D-flip-flop 60u. In consequence, a signal of "1" is provided from the Q output and a signal of "0" is provided from the $\overline{Q}$ output with the timing of the rise of the one-shot pulse. The one-shot pulse provided from the D-flip-flop 60u is delayed by the inverters 60i and 60j and received by the four-input AND gate 60p. With the timing of the rise of the delayed one-shot pulse, the other three input ends of the four-input NAND gate 60p are fixed to "1" including the Q output of the D-flip-flop 60s.

As a result, with the timing of the rise of the delayed one-shot pulse, a trigger signal is supplied to the D-flip-flop 60l and the Q output becomes "1". This Q output is supplied to the SR flip-flop 61e as a reset signal. When the SR flip-flop 61e is reset, the $\overline{Q}$ output thereof becomes "0" to bring the data latch 60a into an enabled state. In addition, since the second input of the three-input NAND gate 61k of the C element 60d becomes "1" by the Q output of the D-flip-flop 60l, the control signal P2 provided from the C element 120 of the input data transmission line 10 is received by the C element 60d.

Accordingly, the packet data transmitted from the input data transmission line 10 is latched in the data latch 60a and the packet data is supplied to the data latch 60b. Then, the control signal P2 is transmitted from the C element 60d to the C elements 60e to 60g through the OR gate 60k and the packet data provided from the data latch 60a is latched in the data latch 60b so as to be transmitted to the output data transmission line 4.

Now, let us consider a case in which a data packet exists in the jointing data transmission line 70 at the time of completion of the jointing of the data packet from the input data transmission line 10 by the above described transmission of the data packet from the input data transmission line 10 to the output data transmission line 4. In this case, when the data latch 60a latches the last word of the data packet transmitted from the input data transmission line 10, the output of the inverter 61l included in the C element 60d changes from "0" to 37 1". Since this output of the inverter 61l is supplied to the D-flip-flop 60i is connected to the EOP output of the data latch 102 included in the input data transmission line 10, the D-flip-flop 60i latches the EOP bit of the last word according to the change of the output of the inverter 61l. As a result, the Q output of the D-flip-flop 60i changes from "0" to "1". Since the Q output is supplied to the D-flip-flop 60j as the trigger signal, the $\overline{Q}$ output of the D-flip-flop 60j becomes "0" by this trigger signal.

Subsequently, after the above described last word has been provided, the output of the inverter 61l changes from "1" to "0" whereby the D-flip-flop 60j is reset and the $\overline{Q}$ output thereof becomes "1". At this time, if a data packet exists in the jointing data transmission line 70, the empty buffer verifier 8b provides a detection output of "1", which is received by the NOR gate 60y. As a result, the output of the NOR gate 60y becomes "0". On the other hand, the $\overline{Q}$ output of the D-flip-flop 60j is supplied to the D-flip-flop 60m as a trigger signal and according to the change of the $\overline{Q}$ output of the D-flip-flop 60j from "0" to "1", the D-flip-flop 60m latches the output of "0" from the NOR gate 70y and the Q output thereof is changed from "1" to "0".

Since the $\overline{Q}$ output of the D-flip-flop 60m is received by the set input end through the inverter 60n, the Q output returns to "1" after a lapse of a predetermined time. Accordingly, from the Q output of the D-flip-flop 60m, a one-shot pulse of "0" is provided. The one-shot pulse of "0" is supplied to the respective reset input ends of the D-flip-flops 60l and 60s, whereby the flip-flops 60l and 60s are reset. As a result, the Q output of the D-flip-flop 60l becomes "0" and the second input of the three-input NAND gate 61k of the C element 60d becomes "0". Consequently, if the control signal P2 of the C element 120 in the input data transmission line 10 becomes "1", the output of the C element 60d in the jointing control portion 65 can be prevented from changing to "1" and thus, the data transmitted from the input data transmission line 10 can be prevented from being jointed to the output data transmission line 4.

In addition, since the signal of "0" as the Q output of the D-flip-flop 60l is supplied to the first input end of the three-input NOR gate 61f and to the reset input end of the SR flip-flop 61e, the set input end of the SR flip-flop 61e becomes "1" when the data provided from the data latch 60a is latched in the data latch 60b, that is, when the control signals P2 of the C elements 60d and 60f are both "0". As a result, the $\overline{Q}$ output of the SR flip-flop 61e changes to "1" and the output of the data latch 60a becomes high impedance.

On the other hand, the pulse of "0" provided from the D-flip-flop 60m is supplied to the reset input end of the D-flip-flop 60s to reset the D-flip-flop 60s, whereby the Q output becomes "0" and the Q̄ output becomes "1". At this time, since the four inputs of the four-input AND gate 61b are all "1", the output of the four-input AND gate 61b changes from "0" to "1" so as to be supplied to the D-flip-flop 61c as a trigger signal.

As a result, the Q output of the D-flip-flop 61c changes from "0" to "1". The Q output of the D-flip-flop 61c is supplied to the SR flip-flop 61g as a reset signal so that the SR flip-flop 61g is reset. Then, the Q̄ output of the SR flip-flop 61g becomes "0" to bring the data latch 60c into an enabled state. In addition, the Q output of the D-flip-flop 61c is supplied as the second input of the three-input NAND gate 61m in the C element 60h so that the control signal P2 of the jointing data transmission line 718 is received by the C element 60h. Thus, the data packet transmitted to the jointing data transmission line 70 is latched in the data latch 60c so as to be transmitted to the output data transmission line 4.

Although in the foregoing, only the two operation modes were described, since the jointing control portion 65 on the side facing the input data transmission line 10 and that on the side facing the jointing data transmission line 70 are formed symmetrically, the same operation can be performed in the case opposite to the above described case.

Figure 46:
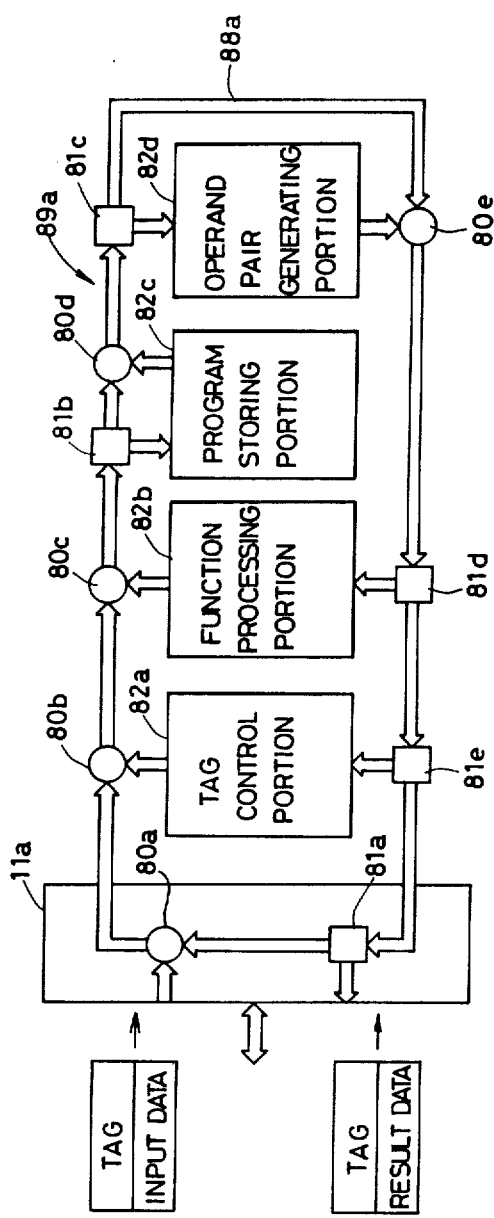
FIG. 46 is a schematic block diagram showing an example of a calculator formed by using a data transmission system in accordance with the present invention.

FIG. 46 is a diagram showing an example of a calculator formed by using a data transmission system in accordance with the present invention. First, referring to FIG. 46, the construction thereof will be described. Jointing portions 80a, 80b and 80c, a branching portion 81b, a jointing portion 80d, a branching portion 81c, a jointing portion 80e and branching portions 81d, 81e and 81a are connected in a ring form to constitute a ring-like transmission line 89a. The jointing portion 80a and the branching portion 81a are included in an interface 11a. The jointing portion 81a joints the data supplied from the exterior to the ring-like transmission line 89a and the branching portion 81a branches the data from the ring-like transmission line 89a to the exterior. Between the branching portion 81e and the jointing portion 80b, a tag control portion 82a is connected; a function processing portion 82b is connected between the branching portion 81d and the jointing portion 80c; a program storing portion 82c is connected between the branching portion 81b and the jointing portion 80d; and an operand pair generating portion 82d is connected between the branching portion 81c and the jointing portion 80e.

Now, the operation of the above described calculator will be described. The data packet entered from the exterior through the interface 11a comprises generally a word 1 forming a tag including a pointer address for the memory of the program storing portion 82c and a word 2 as operand data for calculation. This data packet is jointed to the ring-like transmission line 89a by the jointing portion 80a and transmitted to the branching portion 81b through the jointing portions 80b and 80c so that the data packet is branched to the program storing portion 82c by the branching portion 81b. In the program storing portion 82c, an instruction code for calculation in the function processing portion 82b and a pair of pointer addresses for the program storing portion 82c are fetched and stored in the tag of the packet. After that, the above described data packet is transmitted to the jointing portion 80d. The jointing portion 80d joints the packet to the ring-like transmission line 89a. If the instruction included in the packet is a two-operand instruction, the packet is branched by the branching portion 81c to the operand pair generating portion 82d so that an operand pair is generated.

If the instruction code in the packet is a one-operand instruction (for example, a one-bit shift instruction), the packet data circulates in the ring-like transmission line 89a so as to be branched to the function processing portion 82b by the branching portion 81d. Also in the case of the packet data having a two-operand instruction code, an operand pair is generated and stored in the data portion of the packet and after that, the packet reaches the branching portion 81d through the ring-like transmission line 89a.

The packet data, processed according to the instruction code by the function processing portion 82b, is jointed to the ring-like transmission line 89a by the jointing portion 80c and then branched again by the branching portion 81b so as to be supplied to the program storing portion 82c. By repeating the above described operation a predetermined number of times, execution of the program is completed. Then, the result data is provided to the exterior through the interface 11a.

Thus, the ring-like transmission line 89a is formed by the branching portions 80a to 80e and the jointing portions 81a to 81e and the packet data entered from the exterior is branched and processed in the processing portions 82a to 82d and then jointed again to the ring-like transmission line 89a. In this manner, the packet data can be processed separately.

The calculator shown in FIG. 46 has a feature that the processing speed of the operand pair generating portion 82d is generally slower than the function processing portion 82b and the program storing portion 82c. In consequence, if the processing amount comes near to the limit amount of the calculator, it sometimes happens that the packet data to be supplied to the operand pair generating portion 82d cannot be branched by the branching portion 81c and circulates repeatedly in the ring-like transmission line 89a. For the purpose of buffering the packet data thus overflowing transitionally, an asynchronous free-running redundant transmission line 88a is provided in the ring-like transmission line 89a.

However, as is clear from the foregoing description, if such a buffer transmission line 88a is provided, an instruction of one operand for example, which must pass through this transmission line 88a, will have a long length as a transmission line for the packet and a delay time in the execution of the instruction will be unnecessarily long. In a highly active state as in a case where the transitionally overflowing packet data passes through the buffer transmission line 88a, there will be no problem because other instructions are being processed and the throughput of the system is not lowered. However, in case where such a one-operand instruction is a critical instruction in the execution of the program, that is, an instruction by which the shortest execution time of the program is determined, the above described delay time will considerably long, causing lowering of the throughput of the system.

Therefore, a data transmission system in which the above described delay time can be avoided even with a small flow amount of data will be given in the following.

Figure 47:
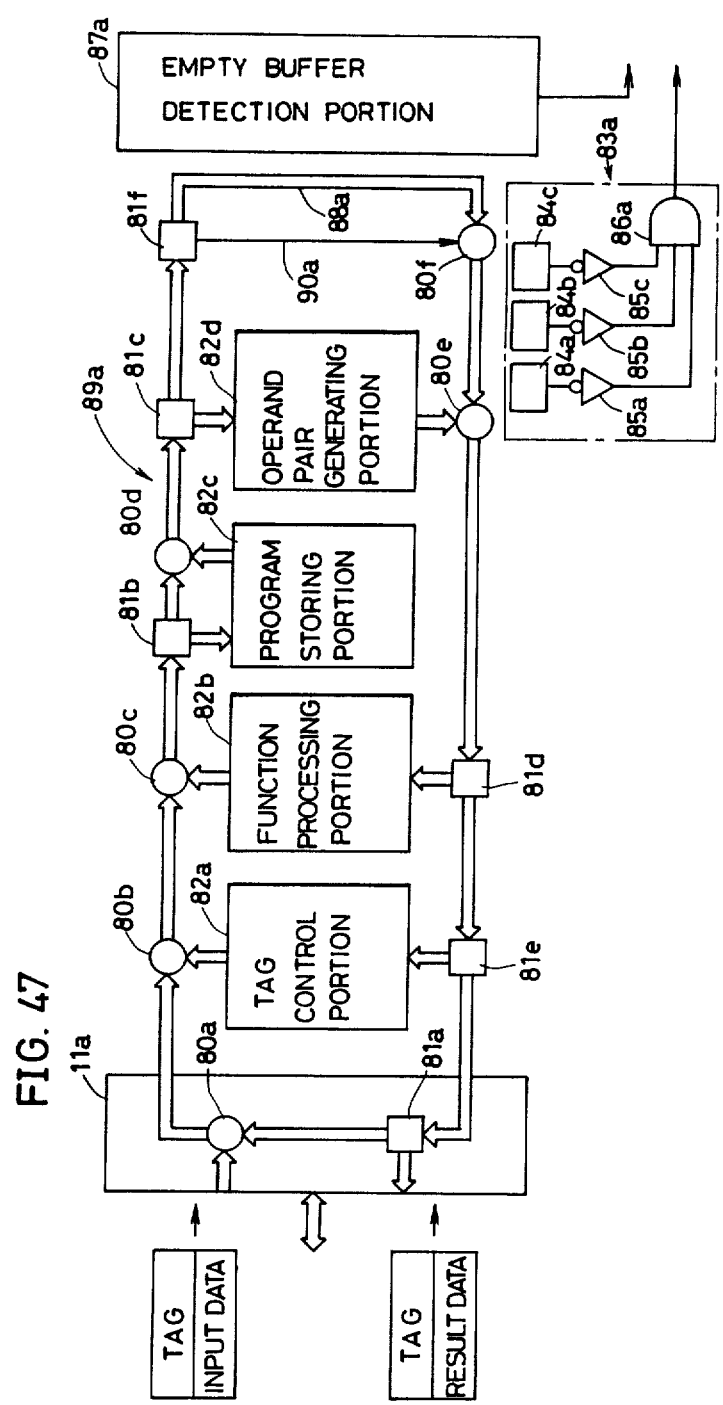
FIG. 47 is a schematic block diagram showing an example of a further improved calculator formed by using a data transmission system in accordance with the present invention.

FIG. 47 is a schematic block diagram showing an example of a further improved calculator using a data transmission system in accordance with the present invention.

First, referring to FIG. 47, the construction thereof will be described. The calculator shown in FIG. 47 has the below described element in addition to the above described calculator shown in FIG. 46. That is, a bypass line 90a for bypassing the buffer transmission line 88a of the ring-like transmission line 89a is provided. A branching portion 81f for branching packet data to the bypass line 90a and a jointing portion 80f for jointing the packet data branched by the bypass line 90a again to the ring-like transmission line 89a are inserted in the ring-like transmission line 89a. In addition, there are provided an empty buffer detection portion 87a for detecting a state empty of packet data in the buffer transmission line 88a and a data density detection portion 83a for detecting the data density of the packet data between the jointing portions 80f and 80e.

The empty buffer detection portion 87a is formed in the same manner as the above described empty buffer verifier 8 shown in FIG. 10. The data density detection portion 83a comprises emptiness detection circuits 84a to 84c, inverters 85a to 85c and a three-input AND gate 86a. The emptiness detection circuit 84a to 84a detect an empty state in the state transmission line 89a between the jointing portions 80f and 80e and formed in the same manner as the empty buffer detection portion 87a. The outputs of these emptiness detection circuits 84a to 84c are inverted by the inverters 85c respectively so as to be received by the three-input AND gate 86a. The outputs of the data density detection portion 83a and the empty buffer detection portion 87a are supplied to the branching portion 81f and the jointing portion 80f.

Now, the operation of the calculator shown in FIG. 47 will be described. This calculator operates in the same manner as in the above described calculator shown in FIG. 46 if a large amount of data flows. However, if the amount of data flowing in the ring-like transmission line 89a is small and the amount of packet data between the jointing portions 80f and 80e is decreased, the emptiness detection circuits 84a to 84c of the data density detection portion 83a detect such decrease and provide outputs of "1". These detection signals are inverted by the inverters 85a to 85c and supplied to the three-input AND gate 86a so that the output of the AND gate 86a becomes "0". In addition, when the empty buffer detection portion 87a detects emptiness of data in the buffer transmission line 88a, the branching portion 81f branches the data transmitted to the ring-like data transmission line 89a to the bypass line 90a and the jointing portion 80f joints the branched packet data again to the ring-like data transmission line 89a.

Thus, if the flow amount of data is small, the packet data flowing in the buffer transmission line 88a is bypassed to the bypass line 90a, whereby unnecessary delay can be avoided.

On the other hand, if the amount of data circulating in the ring-like data transmission line 89a is increased, the outputs of the emptiness detection circuits 84a to 84c of the data density detection portion 83a become all "0" and the output of the data density detection portion 83a becomes "1". Consequently, the branching portion 81f transmits the packet data to the buffer transmission line 88a without branching the data transmitted to the ring-like data transmission line 89a.

Although in the above described embodiment, the respective detection outputs of the data density portion 83a and the empty buffer detection portion 87a are also supplied to the jointing portion 80f, the jointing portion 80f may be adapted to control jointing only by detection of the packet data transmitted to the bypass line 90a, not based on the above described detection signals.

In the foregoing embodiments, the case of applying the present invention to an asynchronous data transmission system was described. The present invention is, however, not limited thereto and is applicable to a synchronous-type data transmission system. In the case of applying the present invention to a synchronous-type data transmission system, the C elements are made to be synchronized with the synchronizing clock pulse.

Figure 48:
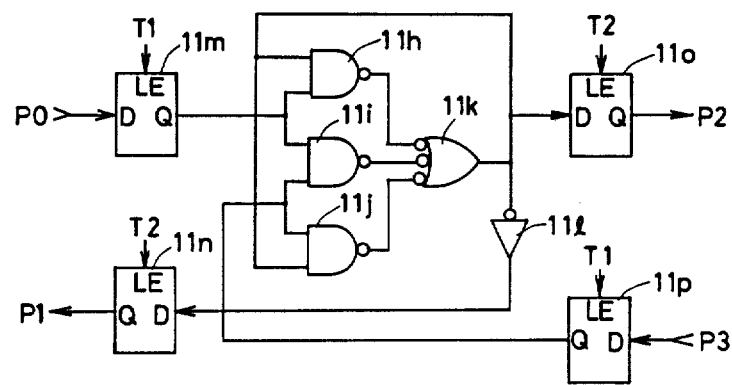
FIG. 48 is an electrical circuit diagram of the C elements used in a synchronous-type data transmission system.
Figure 49:
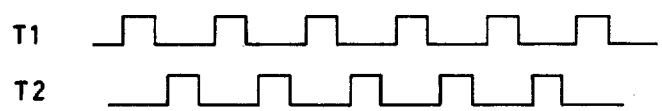
FIG. 49 is a waveform diagram of the synchronizing clock pulses.

FIG. 48 is an electrical circuit diagram of the C elements used in a synchronous-type data transmission system and FIG. 49 is a waveform diagram of the synchronizing clock pulses.

The C elements shown in FIG. 48 are provided in a manner in which the respective input and output ends of the above described C elements shown in FIG. 7C are connected with transparent latches 11m to 11p, the synchronizing clock pulse T1 shown in FIG. 49 being applied to the transparent latches 11m and 11p and the synchronizing clock pulse T2 being applied to the transparent latches 11n and 11c. By thus constructing the C elements, data for one stage can be transmitted in a one-clock cycle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission system for transmitting data synchronously or asynchronously, comprising:
   an input data transmission line for transmitting data and for holding the data;
   an output data transmission line for outputting the data transmitted by said input data transmission line and for holding the data;
   a branching data transmission line, having a branching end, for outputting branched data from the data transmitted by said input data transmission line and for holding the data;
   branching decision means for deciding whether the data transmitted by said input data transmission line is to be branched;
   empty branching end detecting means for detecting emptiness of data at the branching end of said branching data transmission line;
   branching control means for controlling branching of the data transmitted by said input data transmission line to provide the data to said output data transmission line unless the data to be transmitted by said input data transmission line is to be branched to said branching data transmission line and for branching the data to produce branched data in response to the decision by said branching decision means, said branching control means comprising means for branching data to said branching data transmission line when said empty branching end detecting means detects the emptiness of data at the branching end of said branching data transmission line; and
   data transfer means for providing connections between said input, output and branching data transmission lines, said branching decision means, said empty branching end detecting means and said branching control means.

2. A data transmission system in accordance with claim 1, wherein
said branching data transmission line comprises a plurality of stages of transfer control means for controlling transfer of data along said branching data transmission line; and
said empty branching end detecting means comprises:
open collector/drain elements having outputs, each having an input connected to one of the stages of said transfer control means of said branching data transmission line; and
logical OR means, connected between the outputs of said open collector/drain elements and said data transfer means, for providing an indication of the emptiness of data to said branching decision means.

3. A data transmission system in accordance with claim 2, wherein
said transfer control means comprises a plurality of first and second stages, each of the first and second stages including a transfer control portion having an output connected to a subsequent stage,
said open collector/drain elements comprise:
first open collector/drain elements having outputs and each having an input connected to the output of the transfer control portion in a corresponding first stage, the outputs of said first open collector/drain elements being connected by wired-OR connection; and
second open collector elements having outputs and each having an input connected to the output of the transfer control portion in a corresponding second stage, the outputs of said second open collector/drain elements being connected by wired-OR connection, and
said logical OR means comprises an OR element, connected between the outputs of said first and second open collector/drain elements and said data transfer means, for calculating a logical OR of the outputs of said first and second open collector/drain elements.

4. A data transmission system in accordance with claim 8, wherein
said first and second open collector/drain elements comprise MOS transistors, each connected to the output of one of the transfer control portions of said transfer control means in said branching data transmission line and to said OR element by wired OR-connection.

5. A data transmission system for transmitting data synchronously or asynchronously, comprising:
an input data transmission line for transmitting data and for holding the data;
an output data transmission line for outputting the data transmitted by said input data transmission line and for holding the data;
a branching data transmission line for outputting branched data from the data transmitted by said input data transmission line and for holding the data;
branching decision means for deciding whether the data transmitted by said input data transmission line is to be branched;
branching control means for controlling branching of the data transmitted by said input data transmission line to provide the data to said output data transmission line unless the data to be transmitted by said input data transmission line is to be branched to said branching data transmission line and for branching the data to produce branched data in response to the decision by said branching decision means;
branching condition changing means for changing a branching condition in said branching decision means when specific data including a predetermined identifier is transmitted on said input data transmission line;
specific data clear means for clearing the specific data previously defining the branching condition when said branching condition changing means changes the branching condition; and
data transfer means for providing connections between said input, output and branching data transmission lines, said branching decision means, said branching control means, said branching condition changing means and said specific data clear means.

6. A data transmission system for transmitting data synchronously or asynchronously, comprising:
a main data transmission line for transmitting main data and for holding the main data;
a jointing data transmission line for transmitting to said main data transmission line additional data to be jointed to the main data;
arrival detecting means for detecting arrival of the additional data on said jointing data transmission line;
jointing control means for controlling jointing of the main data on said main data transmission line with the additional data arriving on said jointing data transmission line when said arrival detecting means detects the arrival of the additional data on said jointing data transmission line; and
data transfer means for providing connections between said main data transmission line, said jointing data transmission line, said arrival detecting means and said jointing control means.

7. A data transmission system in accordance with claim 6, wherein
said main data transmission line is formed as a loop.

8. A data transmission system in accordance with claim 6, wherein
said main data transmission line comprises:
a plurality of registers connected in series, each of said registers comprising a shift register for transferring the main data to a subsequent register; and
means, connected to said registers, for detecting emptiness in the subsequent register and controlling the transferring of the data from each preceding register to be subsequent register on condition that the subsequent register is empty.

9. A data transmission system in accordance with claim 8, wherein
said main data transmission line further comprises transfer control means, connected in series and to said registers, respectively, for controlling transfer of the main data by said registers, each of said transfer control means controlling writing of the main data in the shift register corresponding thereto in response to a control signal provided from an adjacent one of said transfer control means.

10. A data transmission system in accordance with claim 9, wherein said transfer control means is formed of stages and comprises transfer control portions connected in series and to said registers, adjacent first and second stages of said transfer control means communicating via said transfer control portions corresponding thereto, said transfer control portion in the second stage controlling writing of the main data in the shift register corresponding thereto in response to the control signal provided from the transfer control portion in the first stage adjacent thereto.

11. A data transmission system in accordance with claim 6, wherein
said jointing data transmission line comprises:
a plurality of registers connected together, each of said registers comprising a shift register for transferring the additional data to a subsequent register; and
means, connected to said registers, for detecting emptiness in the subsequent register and controlling the transferring of the data from each preceding register to the subsequent register on condition that the subsequent register is empty.

12. A data transmission system in accordance with claim 6, wherein
said main data transmission line includes input and jointing ends connected to said jointing control means via said data transfer means, the input end supplying the main data to said jointing control means and the jointing end receiving the main and additional data from said jointing control means,
said data transmission system further comprises empty jointing end detecting means, connected to said data transfer means, for detecting emptiness of data at the jointing end of said main data transmission line, and
wherein said jointing control means comprises means, connected via said data transfer means to the output end of said main data transmission line and said empty jointing end detecting means, for jointing the additional data to the main data on said main data transmission line when said empty jointing end detecting means detects the emptiness of data at the jointing end of said main data transmission line.

13. A data transmission system in accordance with claim 12, wherein
said system further comprises empty input end detecting means, connected via said data transfer means to the input end of said main data transmission line, for detecting emptiness of data at the input end of said main data transmission line, and
said jointing control means comprises means, connected via said data transfer means to said empty input end detecting means and the input and jointing ends of said main data transmission line, for jointing the additional data to said main data transmission line when said empty input end detecting means detects the emptiness of data at the input end of said main data transmission line.

14. A data transmission system in accordance with claim 12, wherein
said jointing control means comprises means, connected via said data transfer means to said arrival detecting means and the input and jointing ends of said main data transmission line, for jointing the additional data to said main data transmission line by stopping transmission of the main data to the jointing end of said main data transmission line when said arrival detecting means detects the arrival of the additional data.

15. A data transmission system in accordance with claim 14, wherein
said jointing data transmission line has a jointing end connected to said jointing control means via said data transfer means,
said arrival detecting means comprises last word detecting means, connected via said data transfer means to said jointing data transmission line and said jointing control means, for detecting the arrival of a last word of the additional data at a position corresponding to a predetermined number of words counted from the jointing end of said jointing data transmission line, and
said jointing control means comprises means, connected via said data transfer means to said empty jointing end detecting means, said last word detecting means, the input and jointing ends of said main data transmission line and the jointing end of said jointing data transmission line, for jointing the additional data to said main data transmission line in response to detection by said empty jointing end detecting means of emptiness in said main data transmission line and detection by said last word detecting means of the last word of the additional data.

16. A data transmission system in accordance with claim 14, wherein
said arrival detecting means comprises means, connected via said data transfer means to said jointing data transmission line and said jointing control means, for detecting the arrival of a predetermined number of words of the additional data from a first word to a last word,
said system further comprises empty input end detecting means, connected via said data transfer means to the input end of said main data transmission line and said jointing control means, for detecting emptiness of the predetermined number of words of the main data at the input end of said main data transmission line, and
said jointing control means comprises means, connected via said data transfer means to said arrival detecting means, said empty input end detecting means, said jointing data transmission line and the input and jointing ends of said main data transmission line, for jointing the additional data to said main data transmission line when said empty input end detecting means detects emptiness of the predetermined number of words of the main data at the input end of said main data transmission line and the arrival of the first word through the last word of the additional data is detected.

17. A data transmission system in accordance with claim 16, wherein
said main data transmission line comprises a plurality of stages of transfer control means for controlling transfer of data along said main data transmission line, and
said empty input end detecting means comprises open collector/drain elements having outputs, each having an input connected via said data transfer means to one of the stages of said transfer control means of said main data transmission line, the outputs of said open collector/drain elements being connected by wired-OR connection.

18. A data transmission system in accordance with claim 17, wherein the stages of said transfer control means each comprises a transfer control portion with an output in one of a first stage and a second stage, said open collector/drain elements of said empty input end detecting means comprise:

first open collector/drain elements, having outputs and each having an input connected to the output of a corresponding transfer control portion in one of the first stages, the outputs of said first open collector/drain elements being connected by wired-OR connection; and second open collector/drain elements, having outputs, each having an input connected to the output of a corresponding transfer control portion in one of the second stages, the outputs of said second open collector/drain elements being connected by wired-OR connection, and said empty input end detecting means further comprising a logical OR element, connected to the outputs of said first and second open collector/drain elements and via said data transfer means to said jointing control means, for calculating a logical OR of the outputs of said first and second open collector/drain elements.

19. A data transmission system in accordance with claim 6, wherein said jointing data transmission line comprises:

a plurality of registers connected in series, each of said registers comprising a shift register;

a plurality of transfer control means, connected in series and to said registers, respectively, for controlling transfer of the additional data in said registers, each of said transfer control means writing the additional data in the shift register corresponding thereto in response to a control signal provided from an adjacent transfer control means.

20. A data transmission system in accordance with claim 19, wherein each of said transfer control means comprises a transfer control portion connected to a corresponding shift register and at least one adjacent transfer control portion, adjacent first and second shift registers in said jointing data transmission line communicating via said transfer control portions corresponding thereto, said transfer control portion corresponding to the second shift register controlling writing of the additional data in the second shift register in response to the control signal provided from the transfer control portion in the first shift register.

21. A data transmission system for transmitting data synchronously or asynchronously, comprising:

a main data transmission line, having an input end and a jointing end, for transmitting main data and for holding the main data;

a branching data transmission line for outputting branched data branched from said main data transmission line and for holding the branched data;

a jointing data transmission line for transmitting additional data to be jointed to said main data transmission line and for holding the additional data;

branching decision means, connected to the input end of said main data transmission line for deciding whether the main data transmitted by said main data transmission line is to be branched;

empty jointing end detecting means, connected to the jointing end of said main data transmission line, for detecting nonexistence of data at the jointing end of said main data transmission line;

branching control means, connected to the input end of said main data transmission line, said branching data transmission line and said branching decision means, for controlling branching of the main data to be branched to said branching data transmission line, the main data being branched from the input end of main data transmission line when said branching decision means detects the main data to be branched; and jointing control means, connected to the jointing end of said main data transmission line, said jointing data transmission line and said empty jointing end detecting means, for jointing the additional data from said jointing data transmission line to the jointing end of said main data transmission line when said empty jointing end detecting means detects emptiness of data at the jointing end of said main data transmission line.

22. A data transmission system in accordance with claim 21, wherein said main data transmission line is formed as a loop.

23. A data transmission system in accordance with claim 22, wherein said branching data transmission line has a branching end connected to said branching control means, said system further comprises empty branching end detecting means, connected to the branching end of said branching data transmission line and said branching control means, for detecting emptiness of data at the branching end of said branching data transmission line, and said branching control means comprises means, connected to the input end of said main data transmission line and said empty branching end detecting means, for branching said main data to be branched to said branching data transmission line when said empty branching end detecting means detects the emptiness of data at the branching end of said branching data transmission line.

24. A data transmission system in accordance with claim 21, wherein said system further comprises empty input end detecting means, connected to the input of said main data transmission line and said jointing control means, for detecting emptiness of data at the input end of said main data transmission line, and said jointing control means comprises means, connected to the input and jointing ends of said main data transmission line, said jointing data transmission line and said empty input end detecting means, for jointing the additional data to the jointing end of said main data transmission line when said empty input end detecting means detects the emptiness of data at the input end of said main data transmission line.

25. A data transmission system in accordance with claim 21, wherein said system further comprises arrival detecting means, connected to said jointing data transmission line and said jointing control means, for detecting arrival of the additional data on said jointing data transmission line, and said jointing control means comprises jointing operation means, connected to the jointing end of said main data transmission line, said jointing data transmission line and said arrival detecting means, for jointing the additional data to said main data transmission line from said jointing data transmission line when said arrival detecting means detects the arrival of the additional data at said jointing data transmission line.

26. A data transmission system in accordance with claim 25, wherein
said jointing control means further comprises transmit stop means, connected to the input and jointing ends of said main data transmission line and said arrival detecting means, for stopping the main data transmitted from the input end of said main data transmission line when said arrival detecting means detects the arrival of the additional data.

27. A data transmission system in accordance with claim 26, wherein
said system further comprises empty jointing end detecting means, connected to the jointing end of said main data transmission line and said jointing operation means, for detecting emptiness of data at the jointing end of said main data transmission line,
said jointing data transmission line has a jointing end connected to said jointing control means,
said arrival detecting means comprises last word detecting means, connected to said jointing data transmission line, said jointing operation means and said transmit stop means, for detecting arrival of the last word of the additional data at a position corresponding to a predetermined number of words counted from the jointing end of said jointing data transmission line, and
said jointing operation means comprises means, connected to the jointing end of said jointing data transmission line, the jointing end of said main data transmission line, said empty jointing end detecting means and said last word detecting means, for jointing the additional data to said main data transmission line in response to detection of emptiness of data by said empty jointing end detecting means and detection of the last word by said last word detecting means.

28. A data transmission system in accordance with claim 26, wherein
said arrival detecting means comprises jointing words detecting means, connected to said jointing data transmission line, said jointing operation means and said transmit stop means for detecting arrival of a predetermined number of words of the additional data from a first word to a last word,
said data transmission system further comprises empty input end detecting means, connected to the input end of said main data transmission line and said jointing operation means, for detecting emptiness of the predetermined number of words of the main data at the input end of said main data transmission line, and
said jointing operation means comprises means, connected to said jointing data transmission line, the jointing end of said main data transmission line, said empty input end detecting means and said jointing words detecting means, for jointing the additional data to said main data transmission line when said empty input end detecting means detects the emptiness of the predetermined number of words of the main data at the input end of said main data transmission line and the arrival of the predetermined number of words from the first word to the last word of the additional data is detected by said jointing words detecting means.

29. A data transmission system for transmitting data, comprising:
a ring-like data transmission line comprising a plurality of data storing means for storing data and transfer control means, connected to said data storing means, for controlling transfer of data between said data storing means, each of said transfer control means corresponding to one of said data storing means and controlling the storing of data in the corresponding data storing means in response to a control signal from an adjacent transfer control means;
a bypass line, connected to said ring-like data transmission line, for bypassing a predetermined portion of said ring-like data transmission line;
data branching means, connected to said ring-like data transmission line, for branching selected data from said ring-like data transmission line to said bypass line;
data jointing means, connected to said ring-like data transmission line, for jointing the selected data from said bypass line to said ring-like data transmission line;
data density detection means, connected to said ring-like data transmission line, for detecting density of the data in said ring-like data transmission line following said data jointing means;
emptiness detecting means, connected to said ring-like data transmission line, for detecting an empty state in at least part of the predetermined portion in said ring-like data transmission line, and
branching/jointing control means, connected to said ring-like data transmission line, said bypass line, said data branching means, said data jointing means, said data density detection means and said emptiness detecting means, for instructing said data branching means to branch the data from said ring-like data transmission line to said bypass line when the density of the data detected by said data density detecting means is lower than a predetermined density and the empty state is detected by said emptiness detecting means.

30. A data transmission system in accordance with claim 29, wherein
said branching/jointing control means comprises means, connected to said data jointing means, for causing said data jointing means to joint the selected data from said bypass line to said ring-like data transmission line.

31. A data transmission system comprising:
first and second input data transmission lines, each comprising a plurality of data storing means, connected in series, for storing input data and transfer control means, connected to said first and second input data transmission lines, for controlling transfer of the input data between said data storing means, each of said transfer control means corresponding to one of said data storing means and controlling the storing of the input data in the corresponding data storing means in response to a control signal from an adjacent transfer control means;
first and second emptiness detecting means, connected to said first and second input data transmission lines, for detecting emptiness in the data storing means of said first and second input data transmission lines, respectively; and jointing control means, connected to said first and second input data transmission lines and said first and second emptiness detecting means, for jointing the input data from said first input data transmission line and the input data from said second data input line equally by providing input data from one of said first and second input data transmission lines until the corresponding one of said first and second emptiness detecting means detects the emptiness of data and after a predetermined amount of data has been provided from the one of said first and second input data transmission lines without detection of the emptiness of data, the input data from the other of said first and second input data transmission lines is then provided regardless of the detection of the emptiness of data by the one of said first and second emptiness detecting means.

* * * * *

UNITED STATES PATENT AND TRADEMARK OFFICE
CERTIFICATE OF CORRECTION

PATENT NO. : 4,881,196

DATED : November 14, 1989

INVENTOR(S) : Terada et al.

It is certified that error appears in the above-identified patent and that said Letters Patent is hereby corrected as shown below:

| | |
|---|---|
| Col. 2, | line 67, "inpute" should be --input--. |
| Col. 7, | line 47, "P$\downarrow$" should be --P1$\downarrow$--; |
| | line 49, before "from" insert --and--. |
| Col. 8, | line 19, "111j" should be --11j--. |
| Col. 11, | line 21, "11" should be --111--. |
| Col. 12, | line 13, delete "37". |
| Col. 13, | line 9, "process" should be --processing--; |
| | line 36, "9a-9b" should be --9a-9g--. |
| Col. 18, | line 66, "leftas" should be --left as--. |
| Col. 24, | line 55, "222" should be 22--. |
| Col. 26, | line 33, "that" (first occurrence) should be --the--; |
| | line 62, "re" should be --are--. |

UNITED STATES PATENT AND TRADEMARK OFFICE
CERTIFICATE OF CORRECTION

PATENT NO. : 4,881,196

DATED : November 14, 1989

INVENTOR(S) : Terada et al.

It is certified that error appears in the above-identified patent and that said Letters Patent is hereby corrected as shown below:

Col. 27, line 2, "and" (first occurrence) should be --an--.

Col. 29, line 10, "36b" should be --38b--.

Col. 33, line 7, "gate" should be --gates--;

line 60, "Sr" should be --SR--.

Col. 35, line 37, ""1"" should be --"0"--.

Col. 36, line 15, "37 1"." should be --"1".--.

Col. 39, line 29, "85c" should be --85a to 85c--.

Col. 47, line 49, "means" should be --means,--.

Signed and Sealed this

Twenty-ninth Day of January, 1991

Attest:

HARRY F. MANBECK, JR.

*Attesting Officer*  *Commissioner of Patents and Trademarks*